(12) United States Patent
Sternberg et al.

(10) Patent No.: US 11,903,048 B2
(45) Date of Patent: Feb. 13, 2024

(54) CONNECTING TO VIRTUALIZED MOBILE CORE NETWORKS

(71) Applicant: InterDigital Patent Holdings, Inc., Wilmington, DE (US)

(72) Inventors: Gregory S. Sternberg, Mount Laurel, NJ (US); Michael F. Starsinic, Newtown, PA (US); Catalina Mihaela Mladin, Hatboro, PA (US); Rocco DiGirolamo, Laval (CA); Hongkun Li, Malvern, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 60 days.

(21) Appl. No.: 17/169,819

(22) Filed: Feb. 8, 2021

(65) Prior Publication Data

US 2021/0212134 A1    Jul. 8, 2021

Related U.S. Application Data

(63) Continuation of application No. 15/593,895, filed on May 12, 2017, now Pat. No. 10,986,675.
(Continued)

(51) Int. Cl.
*H04W 76/11* (2018.01)
*H04L 12/46* (2006.01)
(Continued)

(52) U.S. Cl.
CPC ......... *H04W 76/11* (2018.02); *H04L 12/4641* (2013.01); *H04L 41/0896* (2013.01);
(Continued)

(58) Field of Classification Search
CPC . H04W 76/11; H04W 12/062; H04W 12/069; H04W 72/048; H04W 84/042;
(Continued)

(56) References Cited

U.S. PATENT DOCUMENTS

2008/0107084 A1    5/2008 Pichna et al.
2009/0248575 A1*  10/2009 Dipl. Ing. Proidl ........................
                                            H04N 21/44222
                                                    705/40
(Continued)

FOREIGN PATENT DOCUMENTS

CN      102160450 A    8/2011
CN      103152775 A    6/2013
(Continued)

OTHER PUBLICATIONS

3rd Generation Partnership Project; 3GPP TR 23.799, V0.4.0, Technical Specification Group Services and System Aspects; Study on Architecture for Next Generation System (Release 14), Apr. 2016, 96 pages.
(Continued)

*Primary Examiner* — Walter J Divito
*Assistant Examiner* — Anthony Luo
(74) *Attorney, Agent, or Firm* — BakerHostetler

(57) ABSTRACT

A 5G Network Architecture uses virtualization and network slicing. The user equipment (UE) interacts with an underlay network that interacts with virtual network slices. The UE interacts with the underlay network (ULN) to establish a connection to a virtual network slice. Procedures are defined to assign a new slice instance to a UE (UE initiated and ULN initiated); to change a UE Profile (UE initiated and ULN Initiated); and to change a UE's assigned slice instance (ULN Initiated).

20 Claims, 48 Drawing Sheets

Related U.S. Application Data

(60) Provisional application No. 62/335,511, filed on May 12, 2016.

(51) Int. Cl.
| | |
|---|---|
| *H04L 41/0896* | (2022.01) |
| *H04W 12/062* | (2021.01) |
| *H04W 12/069* | (2021.01) |
| *H04W 84/04* | (2009.01) |
| *H04L 67/303* | (2022.01) |
| *H04W 12/75* | (2021.01) |
| *H04W 72/51* | (2023.01) |

(52) U.S. Cl.
CPC ....... *H04W 12/062* (2021.01); *H04W 12/069* (2021.01); *H04W 72/51* (2023.01); *H04W 84/042* (2013.01); *H04L 67/303* (2013.01); *H04W 12/75* (2021.01)

(58) Field of Classification Search
CPC .. H04W 72/51; H04W 12/75; H04L 12/4641; H04L 41/0896; H04L 67/303
See application file for complete search history.

(56) References Cited

U.S. PATENT DOCUMENTS

| | | | |
|---|---|---|---|
| 2010/0074109 A1 | 3/2010 | Klingenbrunn et al. | |
| 2011/0202600 A1* | 8/2011 | Ramamoorthy | H04L 67/306 709/203 |
| 2013/0208587 A1* | 8/2013 | Bala | H04W 72/0446 370/278 |
| 2014/0133456 A1 | 5/2014 | Donepudi et al. | |
| 2015/0296456 A1* | 10/2015 | Kaikkonen | H04W 76/14 370/311 |
| 2015/0333930 A1 | 11/2015 | Aysola et al. | |
| 2016/0021635 A1 | 1/2016 | Lee et al. | |
| 2016/0112943 A1* | 4/2016 | Horn | H04W 48/20 370/329 |
| 2016/0134929 A1 | 5/2016 | Robii et al. | |
| 2016/0135040 A1* | 5/2016 | Suzuki | H04W 8/205 455/422.1 |
| 2016/0286567 A1* | 9/2016 | Zander | H04B 7/15542 |
| 2017/0054595 A1 | 2/2017 | Zhang et al. | |
| 2017/0070892 A1* | 3/2017 | Song | H04W 48/20 |
| 2017/0086118 A1 | 3/2017 | Vrzic | |
| 2017/0141973 A1 | 5/2017 | Vrzic | |
| 2017/0215065 A1* | 7/2017 | Vamanan | H04W 60/00 |
| 2017/0289265 A1 | 10/2017 | Faccin et al. | |
| 2017/0318450 A1* | 11/2017 | Salkintzis | H04W 8/02 |

FOREIGN PATENT DOCUMENTS

| | | |
|---|---|---|
| EP | 2993930 A1 | 3/2016 |
| JP | 2018-538752 A | 12/2018 |
| WO | 2014/186968 A1 | 11/2014 |
| WO | 2015/126999 A1 | 8/2015 |
| WO | 2016/010760 A1 | 1/2016 |
| WO | 2016/014516 A1 | 1/2016 |
| WO | 2016/060897 A1 | 4/2016 |
| WO | 2017/098442 A1 | 6/2017 |

OTHER PUBLICATIONS

ZTE, S2-161418, NG Core Architecture solution for sharing Network Func across multiple NS, 3GPP TSG SA WG2 #114, 3GPP, Apr. 1, 2016.

CATT, NEC, Sprint, KDDI, CMCC, Group B based network slice architecture, 3GPP TSG-SA WG2#114 S2-161969.

ITU-T Focus Group, IMT-2020 Deliverable, online, 2017, <URL>https://www.itu.int/dms_pub/itu-t/opb/tut/T-TUT-IMT-2017-2020-PDF-e.pdf.

3rd Generation Partnership Project (3GPP), SP-140703, TSG SA Meeting #66, Updated WID for Flexible Mobile Service Steering (FMSS), Dec. 10-12, 2014, 6 pages.

3rd Generation Partnership Project (3GPP), SP-160227, New Study on Architecture and Security for Next Generation System, Mar. 9-11, 2016, 6 pages.

3rd Generation Partnership Project (3GPP), TR 23.718 V13.0.0., Technical Specification Group Services and Systems Aspects; Architecture Enhancement for Flexible Mobile Service Steering, (Release 13), Sep. 2015, 38 pages.

ETSI GS NFV 002 V1.2.1., Network Functions Virtualisation (NFV), Architectural Framework, Dec. 2014, 6 pages.

Halpern J et al: "Service Function Chaining (SFC) Architecture, rfc7665.txt", Service Function Chaining (SFC) Architecture; RFC7665. txt, Internet Engineering Task Force, IETF; Standard, Internet Society (ISOC) 4, Rue Des Falaises CH-1205 Geneva, Switzerland, Oct. 20, 2015 (Oct. 20, 2015), pp. 1-32, XP015107717.

Network Functions Virtualisation—Introductory White Paper, "SDN and OpenFlow World Congress", Darmstadt Germany, Oct. 22-24, 2012, 16 pages.

Next Generation Mobile Network (NGMN) Alliance, "Description of Network Slicing Concept", v1.0, Jan. 2016, 7 pages.

NTT DOCOMO et al: "Update of solution for support of multiple connections to multiple Network Slices", 3GPP Draft; S2-162259_E-Mail_REV2_S2-162148—WAS2009-WAS1431—Update Solution Multiple Network Slice Connection, 3rd Generation Partnership Project (3GPP), Mobile Competence Centre; 650, Route Des Lucioles, vol. SA WG2, No. Sophia Antipolis, France; Apr. 11, 2016-Apr. 15, 2016 Apr. 22, 2016 (Apr. 22, 2016), XP051091864.

Oasis Advanced Message Queuing Protocol (AMQP) Version 1.0, Oct. 29, 2012, 125 pages.

Oasis MQTT V3.1.1 Committee Specification 01, May 18, 2014, 3 pages.

Qualcomm Incorporated, 3GPP SA SG2 Meeting #144 S2-162159, "Solution X for Key Issue 4 on Session Management" Apr. 2016, 8 pages.

Quinn et al., IETF, Network Working Group, Internet-Draft, Network Service Header, Jan. 12, 2013, 22 pages.

ZTE: "NextGen Core Architecture solution for sharing Network Function across multiple Network Slices", 3GPP Draft; S2-162260_E-Mail_REV1_S2-162149 WAS 2010 WAS 1679_ZTE_Network Slicing Architecture, 3rd Generation Partnership Project (3GPP), Mobile Competence Centre; 650, Route Des Lucioles; F-06921, vol. SA WG2, No. Sophia Antipolis; Apr. 11, 2016-Apr. 15, 2016 Apr. 22, 2016 (Apr. 22, 2016), XP051091863.

ZTE: "NextGen Core Architecture solution for sharing Network Function across multiple Network Slices", 3GPP Draft; S2-16XXXX ZTE Network Slicing Solution D2, 3rd Generation Partnership Project (3GPP), Mobile Competence Centre; 650, Route Des Lucioles; F-06921 Sophia-Antipolis Cedex; France, vol. SA WG2, No. Sophia Antipolis; Apr. 11, 2016-Apr. 15, 2016 Apr. 1, 2016 (Apr. 1, 2016), XP051086379.

China Mobile et al., "Network Slicing Architecture and High-Level Function Definition", SA WG2 Meeting #114 S2-161423, Apr. 2016, pp. 3.

* cited by examiner

CONNECTING TO VIRTUALIZED MOBILE CORE NETWORKS

CROSS-REFERENCE TO RELATED APPLICATIONS

This Application is a continuation of U.S. patent application Ser. No. 15/593,895 filed May 12, 2017 which claims the benefit of U.S. Provisional Patent Application Ser. No. 62/335,511, filed May 12, 2016, the disclosures of which are hereby incorporated by reference as if set forth in their entireties.

BACKGROUND

The term (S)Gi-LAN refers to the packet data network that sits between the GGSN or P-GW of the Mobile Core network and the Internet. The (S)Gi-LAN is under control of the Mobile Network Operator (MNO). When uplink data packets leave the (S)Gi-LAN, they are no longer under control of the MNO and can be generally considered to have gone to the public internet. This is shown in FIG. 1.

The (S)Gi-LAN may include Value Added Services (VAS) 2052. Examples of VAS 2052 are NATs, Firewalls, Video Compression, Data Compression, load balancers, HTTP Header Enrichment functions, TCP optimizers, etc. Generally, Deep Packet Inspection (DPI) techniques determine if each VAS 2052 should operate on a data flow.

Traffic may be routed to/from the (S)Gi-LAN and Servers in the public Internet such as an M2M Server. Moreover, the M2M server may be deployed inside the (S)Gi-LAN by the operator or service provider to provision a set of value added services for M2M/IoT use cases.

The IETF has developed an architecture framework for efficiently deploying VAS's, or "Service Functions". The architecture framework is described in IETF, Service Function Chaining Working Group, Internet Draft, Service Function Chaining (SFC) Architecture. The framework allows traffic to be "steered" through just the services that apply to each individual flow rather than requiring that all traffic be serially routed through all service functions. The terms "Service Function" and "Value Added Service" can be used interchangeably.

FIG. 2 shows a diagram of the main components of the IETF's SFC architecture framework.

The Service Classification Function (SCF) accepts input packets. In a traditional (S)Gi-LAN, input packets may be IP packets from the P-GW/GGSN or the Internet. The SCF may encapsulate the input packets with another header, determine what Service Functions that packet should be routed through, the order that the packet should be routed through the service functions, and attach metadata to the packet to assist the service functions.

The Service Function Forwarder (SFF) will accept packets from SCF and route them through the Service Functions. Once a packet has been routed through its service path, the SFF will forward the packet to an egress node. The Egress node will remove any extra header information that was inserted by the SCF, SFF, or a service function and send the packet out of the (S)Gi-LAN and into the P-GW/GGSN or public Internet.

The Network Services Header (NSH) was developed by the IETF's Service Function Chaining (SFC) WG and is defined in IETF, Network Working Group, Internet-Draft, Network Service Header. The NSH contains metadata and service path information. The metadata and service path information are used in the services plane to steer traffic through network services.

FIG. 3 shows where the NSH sits relative to the IP Datagram.

FIG. 4 shows the format of the NSH. The Base Header includes:
 A version field
 A 'C' Bit to indicate that critical metadata is present in the Network Services Header
 A length field to indicate the total length of the NSH.
 A Meta Data Type field to indicate the format of the Meta Data
 A Next Protocol Field to indicate the format of the original payload.
The Service Path Header includes:
 A Service Path ID which is a 24 bit field that indicates the service path that should be selected for the packet.
 A Service Index that is used to indicate the packets location in the service path.

The Context Headers can all be in one of two formats, depending on how the Meta Data Type field is set in the Base Header. The context header values can all be of fixed length or they may contain variable length values. For the case of variable length headers, IETF, Network Working Group, Internet-Draft, Network Service Header describes how to format the metadata and how to indicate the length of each value in the context header.

When the Meta Data Type field indicates that metadata is variable length, it is formatted as shown in FIG. 5.

The TLV Class field describes the scope of the Type field. In other words, it identifies the vendor or standards body who allocated the type field.

The Type field indicates the type of information that is in the metadata. The MSB of the type field is used to indicate whether or not it is mandatory for an entity who processes the NSH to understand the metadata value.

The R bits are reserved for future use.

The Len field indicates the length of the metadata in 4-byte word.

Service aware nodes are permitted to perform header related actions such as inserting the header, removing the header, selecting the service path, updating context headers, and policy selection based on the header contents. Of course, service aware nodes are also able to inspect as well as modify more than just the NSH header. Service nodes such as NATs, Firewalls, HTTP header enrichment can inspect and modify the IP, UDP/TCP/application data as well.

The 3GPP SA2 Working Group has a work item called Flexible Mobile Service Steering (FMSS). The objective of this work item is to define service requirements to enable the 3GPP Core Network to define and modify traffic steering policies that will be used to select required service enablers of the operator deployed (S)Gi-LAN. The aim is to realize efficient and flexible mobile service steering in the (S)Gi-LAN.

The most recent output of this work item is captured in 3GPP TR 23.718, Architecture Enhancements for Flexible Mobile Service Steering.

FIG. 6 is a representation of how the 3GPP architecture that is proposed in TR 23.718 would be applied to the architecture that is proposed by the IETF in IETF, Service Function Chaining Working Group, Internet Draft, Service Function Chaining (SFC) Architecture. The green shaded boxes are standardized by 3GPP and owned by the MNO.

The Orange boxes are not standardized by 3GPP, but they are typically deployed in the (S)Gi-LAN and owned by the MNO.

IETF, Service Function Chaining Working Group, Internet Draft, Service Function Chaining (SFC) Architecture proposes an St reference point that allows the PCRF to provide traffic steering policies to the SCF in the (S)Gi-LAN. TR 23.718 also proposes that the Sd interface with the TDF may be used to provide traffic steering policies to the TDF. The TDF may then be used to apply packet markings (i.e. an NSH) to the traffic based on the detected application, user, etc. TR 23.718 also proposes that the P-GW apply packet markings (i.e. an NSH) based on policies from the PCRF.

IT services can be deployed on varying operational environments (hardware platforms, operating systems, etc.). Message Based Middleware provides a "message layer" between communicating services, thus abstracting the underlying operational environment that each service runs on. In other words, the "message layer" acts as a middleman in exchanging messages between services.

FIG. 7 shows a high level representation of message based middleware. In this example, 4 services communicate via a common middleware platform. Each service may run on varying different platforms (i.e. hardware platforms, operating systems, etc.). The middleware abstracts the underlying operational environment of each service so that they can communicate via some defined messaging protocol.

There are many well-known message based middleware architectures. The following sub-sections will give an overview of some key message based middleware concepts and terms.

A middleware layer can be based on the concept of a message Queue as shown in the example of FIG. 8. In this example, there is a dedicated Queue that can be used to send messages to Service 1. Services 2, 3, and 4 are able to submit messages to the Service 1 Queue and the messages will be delivered to Service 1 in a first-in first-out (FIFO) manner.

Notice that each service may communicate via a different transport layer protocol, the details of which are abstracted by the middleware.

Queue based middleware architecture can take many different forms; there may be a single shared queue that is used to send messages to all services, a dedicated Queue for each service to receive messages from (shown in FIG. 8), a dedicated Queue for each service to send messages to, etc.

In a Publish/Subscribe model, messages are sent (published) to a destination in the middleware. The destination depends on the message "topic" (sometimes called channel). Services that want to receive messages related to a particular topic "subscribe" to the topic.

FIG. 9 shows an example of a publish/subscribe system where:

Service 1, 2, and 3 publish to Topic 1.
Service 2 and 3 publish to Topic 2.
Service 1 subscribes to Topics 1 and 2.
Service 2 subscribes to Topic 2.

Topics can be based on any number of factors. Topics could be related to the message type (debug, alarm, warning, task request, etc.).

The term message broker commonly refers to entity that receives all messages and distributes all messages as shown in FIG. 10. The broker may be implemented with a number of queues, as a publish/subscribe architecture with a number of topics, etc.

Messages sent to and from a middleware broker may be characterized in several different ways. Four common types of messages are.

Non-Confirmable and Non-blocking Request Messages—Messages that are simply sent to a broker by a service. Once the service sends the message to the broker, the service expects no response; execution of the service continues.

Confirmable and Blocking Request Messages—Blocking messages are messages that will cause the service to pause (block) until the service receives the message. For example, if a service attempts to read a message from a broker, or queue, and the message is not ready, then the service's execution will block.

Confirmable and Non-Blocking Messages—Non-blocking messages are messages that will not cause the service to pause (block) until the message is ready. For example, if a service attempts to read a message from a broker, or queue, and the message is not ready, then the service's execution continue until the message is ready. When a service attempts a non-blocking read, it may provide the broker with a callback function that may be called when the message is ready.

Notifications—Notification messages are messages that the broker sends to a service as a result of some previous request. For example, the previous request may have been a non-blocking read attempt or a subscribe request.

Advanced Message Queuing Protocol (AMQP) [OASIS Advanced Message Queueing Protocol (AMQP)] is a message bus protocol. A message bus is a type of middleware.

FIG. 11 shows the relationship between AMPQ Exchanges and Queues. An AMQP Exchange accepts messages from a service and routes the message to one or more Queue. The Exchange can be designed to route the message based on a static rule (i.e. all send the message to these 5 services), based one whatever queues bind themselves to the exchange, based on the message topic, or based on values in the message header.

Message Queuing Telemetry Transport (MQTT) [OASIS MQTT V3.1.1 Committee Specification 01, 18 May 2014] is another message bus protocol. A message bus is a type of middleware.

MQTT is a message based middleware protocol was initially developed by IBM and Eurotech in the late 1990s; it was submitted to the OASIS standards body in 2013 for formal adoption (process ongoing) and further development. MQTT is a low overhead message queuing and transport protocol tailored for constrained devices and low bandwidth networks that is most famously deployed in the Facebook Messenger mobile app. It uses a publish/subscribe model as shown in FIG. 12.

The core elements of MQTT are clients (which can be both publisher and subscriber), servers (also referred to as brokers), sessions, subscriptions and topics. These are shown in FIG. 13.

Like HTTP, the MQTT protocol is asymmetric in that it distinguishes between two different roles: client and server.

In MQTT terms, a Client is a program or device that uses MQTT. It always establishes the Network Connection to the Server. A Client can Publish application messages that other Clients might be interested in.
Subscribe to request application messages that it is interested in receiving.
Unsubscribe to remove a request for application messages.

Disconnect from the Server.

An MQTT Server is an entity that accepts connections from Clients. Unlike HTTP it generally does not run any application logic, instead an MQTT Server acts as an intermediary between Clients publishing application messages and the Clients which have subscribed to receive them.

Topics are the "Q" in MQTT—they are named message queues maintained by the server in order to link publishers with subscribers. An MQTT Client assumes the role of publisher when it issues a PUBLISH message to an MQTT Server (i.e., an instruction to deliver the opaque message payload to any Client subscribed to the supplied Topic Name), and assumes the role of subscriber when it issues a SUBSCRIBE message to the MQTT Server (i.e., an instruction to receive any PUBLISH messages that match the supplied Topic Filter). A Topic Filter is an expression contained in a Subscription, to indicate an interest in one or more topics. A Topic Filter may include wildcard characters. PUBLISH messages are delivered with one of three QoS levels of assurance (at-most-once, at-least-once, exactly-once).

Sessions and subscriptions represent two levels of attachment between a Client and a Server. A session is a stateful interaction (i.e., an active TCP/IP network connection) between a Client and a Server, and is identified by a unique Client Identifier. A session can be established only by a Client sending a CONNECT message to a Server. Flags in the CONNECT, PUBLISH and SUBSCRIBE messages determine how session state is maintained if a session is disconnected.

Network Function Virtualization (NFV) aims to transform the way that network operators architect networks by evolving standard IT virtualization technology to consolidate many network equipment types onto industry standard high volume servers, switches and storage, which could be located in Data centers, Network Nodes and in the end user premises. It involves the implementation of network functions (e.g., mobility management, session management, QoS) in software that can run on a range of industry standard server hardware, and that can be moved to, or instantiated in, various locations in the network as required, without the need for installation of new equipment. An illustrative example, copied from ETSI GS NFV 002, Network Functions Virtualization (NFV); Architectural Framework, is shown in FIG. 14.

NFV is applicable to any data plane packet processing and control plane function in mobile and fixed networks. Potential examples may include:

Switching elements: BNG, CG-NAT, routers.

Mobile network nodes: HLR/HSS, MME, SGSN, GGSN/PDN-GW, RNC, eNodeB.

Functions contained in home routers and set top boxes to create virtualized home environments.

Converged and network-wide functions: AAA servers, policy control and charging platforms.

Application-level optimization: CDNs, Cache Servers, Load Balancers, Application Accelerators.

Security functions: Firewalls, virus scanners, intrusion detection systems, spam protection.

Application of NFV brings many benefits to network operators, contributing to a dramatic change in the telecommunications industry landscape. NFV could bring the following benefits:

Reduced equipment costs and reduced power consumption through consolidating equipment and exploiting the economies of scale of the IT industry.

Increased velocity of Time to Market by minimizing the typical network operator cycle of innovation.

The possibility of running production, test and reference facilities on the same infrastructure provides much more efficient test and integration, reducing development costs and time to market.

Targeted service introduction based on geography or customer sets is possible. Services can be rapidly scaled up/down as required.

Enabling a wide variety of eco-systems and encouraging openness.

Optimizing network configuration and/or topology in near real time based on the actual traffic/mobility patterns and service demand.

Supporting multi-tenancy thereby allowing network operators to provide tailored services and connectivity for multiple users, applications or internal systems or other network operators, all co-existing on the same hardware with appropriate secure separation of administrative domains.

Reduced energy consumption by exploiting power management features in standard servers and storage, as well as workload consolidation and location optimization.

European Telecommunications Standards Institute (ETSI) has formed a specification group "Network Functions Virtualization" to publish some white papers, and to produce several more in-depth materials, including standard terminology definitions and use cases for NFV that act as references for vendors and operators considering implementing NFV.

ETSI GS NFV 002, Network Functions Virtualization (NFV); Architectural Framework is an ETSI publication that establishes an Architectural Framework for applying NFV concepts to the Mobile Core Network.

FIG. 15 is an exemplary end-to-end Network Service with VNFs and nested forwarding graphs copied from ETSI GS NFV 002. This figure illustrates the concept of a Virtualized Network Function Forwarding Graph (VNF-FG). A VNF-GW describes how a set of VNF's are connected to provide a service.

Network Slicing, such as described in Next Generation Mobile Network (NGMN) Alliance, "Description of Network Slicing Concept", is a mechanism that could be used by mobile network operators to support multiple 'virtual' networks behind the air interface across the fixed part of the mobile operator's network, both backhaul and core network. This involves 'slicing' the network into multiple virtual networks to support different RANs or different service types running across a single RAN. Network slicing enables the operator to create networks customized to provide optimized solutions for different market scenarios which demands diverse requirements, e.g. in the areas of functionality, performance and isolation. FIG. 16 shows a conceptual architecture of network slicing. Different colors are used to indicate the different network slice instances or sub-network slice instances.

3GPP is designing a 5G network and is considering to incorporate the network slicing technology, which is a good fit for the 5G network. Because the 5G use cases (e.g., massive IoT, critical communications, and enhanced mobile broadband) demand very diverse and sometimes extreme requirements. The current architecture utilizes a relatively monolithic network and transport framework to accommodate a variety of services such as mobile traffic from smart phones, OTT content, feature phones, data cards, and embedded M2M devices. It is anticipated that the current architecture is not flexible and scalable enough to efficiently support a wider range of business need when each has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network.

Network slicing enables the operator to create networks customized to provide optimized solutions for different market scenarios which demands diverse requirements, e.g. in the areas of functionality, performance and isolation. However, there are some challenges and issues to support network slicing in the future 5G network:

How to achieve isolation/separation between network slice instances and which levels and types of isolation/separation will be required;

How and what type of resource and network function sharing can be used between network slice instances;

How to enable a UE to simultaneously obtain services from one or more specific network slice instances of one operator;

What is within 3GPP scope with regards to Network Slicing (e.g. network slice creation/composition, modification, deletion);

Which network functions may be included in a specific network slice instance, and which network functions are independent of network slices;

The procedure(s) for selection of a particular Network Slice for a UE;

How to support Network Slicing Roaming scenarios;

How to enable operators to use the network slicing concept to efficiently support multiple 3rd parties (e.g. enterprises, service providers, content providers, etc.) that require similar network characteristics.

More details (i.e., issues, problems and possible solutions) could be found in 3GPP TR 23.799, Study on Architecture for Next Generation System about how 3GPP applies the network slicing in the 5G network architecture.

To enable a UE to simultaneously obtain services from multiple Network Slices of one network operator, a single set of Control Plane Functions is shared across multiple Core Network Instances as shown in FIG. 17. This figure was copied from 3GPP S2-162259, update of solution for support of multiple connections to multiple network slices.

A Core Network Instance consists of a single set of Control Plane Functions and a single set of User Plane Functions. Moreover, a Core Network Instance is dedicated for the UEs that are belonging to the same UE type. Identifying the UE type is done by using a specific parameter, e.g., the UE Usage Type, and/or an information from the UE's subscription. A set of User Plane Functions in a Core Network Instance is responsible for providing a specific service to the UE and for transports the User Plane data of the specific service. For example, one set of User Plane functions in Core Network Instance #1 provides an enhanced mobile broadband service to the UE, whereas another set of User Plane functions in Core Network Instance #2 provides a critical communication service to the UE. When a UE first connects to the operator's Network, a default Core Network Instance that matches to the UE Usage Type is assigned to the UE. Each UE can have multiple User Plane connections to different sets of User Plane Function that are available at different Core Network Instances simultaneously. Control Plane functions may be shared across network slices.

The Core Network Selection Function (CNSF) is responsible for:

Selecting which Core Network Instance to accommodate the UE by taking into account the UE's subscription and the specific parameter, e.g., the UE Usage Type.

Selecting which Control Plane Functions within the selected Core Network Instance that the Base Station should communicate with. This selection of Control Plane Functions is done by using the specific parameter, e.g., UE Usage Type.

Selecting which set of User Plane Functions that the Base Station should establish the connection for transporting User Plane data of different services. This selection of User Plane Function is done by using the specific parameter, e.g., UE Usage Type and the Service Type.

To enable the interconnection of network functions, the Interconnection & Routing Function (IRF) 2058 is proposed in 3GPP TR 23.799, Study on Architecture for Next Generation System. FIG. 18 and FIG. 19 show the reference models of IRF 2058 for non-roaming and roaming scenarios respectively. The functions of IRF 2058 include:

Stores the binding between UE's identity and the interface layer identity (e.g. instance number) of each serving NF, which has an active session for the UE. For the NFs, which do not interface with the IRF 2058 directly, e.g. in roaming scenario, the IRF 2058 stores the identity of the remote-PLMN's IRF 2058 via which those NFs are reachable.

Updates the binding repository when the identity of the serving NF changes for a given UE, e.g. due to UE mobility, load re-balancing (i.e. scale-in or scale-out of virtual machines) or restoration reasons.

Examines the message header to determine the identity of the UE (for which message is sent) and the destination NF. For UE's identity, looks up the internal binding repository to determine the interface layer identity (e.g. instance number) of the destination NF or the identity of the remote IRF 2058. Routes the message accordingly.

Optionally performs authorization of the message based on the operator's configuration, e.g. if operator's configuration prohibits NF1 from sending certain message (such as "change of UE's APN-AMBR") towards NF4 then the IRF 2058 rejects the corresponding message. Optionally protects NFs during a signaling storm by performing overload control, e.g. pacing of messages sent to a given NF based on its load/overload condition.

Each NF interfaces with the IRF 2058 via a given reference point in its own PLMN. NFs do not interface with each other directly but can communicate (i.e. send request or response message) with each other via IRF 2058. Thus, when required, this model allows any NF to communicate with any other NF directly without involving any other unrelated network functions in the path, e.g. NF1 can send message to NF3 via IRF 2058 without involving NF2 if the involvement of NF2 is not needed.

SUMMARY

A 5G Network Architecture uses virtualization and network slicing. The user equipment (UE) interacts with an underlay network that interacts with virtual network slices. The UE interacts with the underlay network (ULN) to establish a connection to a virtual network slice.

The following procedures can be defined.

Procedures to assign a New Slice Instance to a UE. (UE initiated and ULN Initiated)

Procedures to change a UE Profile. (UE initiated and ULN Initiated)

Procedures to change a UE's assigned Slice Instance. (ULN Initiated)

An embodiment is described where a Network Slice Instance is deployed by connecting Virtualized Network Functions via a Message Broker.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

TABLE 1

Figure 1:
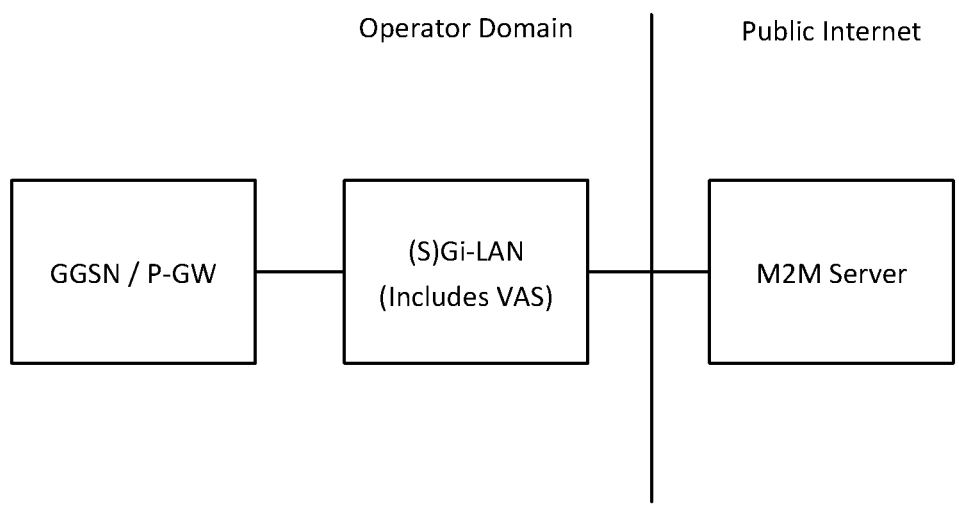
FIG. 1 is a diagram that illustrates an (S)Gi-LAN.
Figure 2:
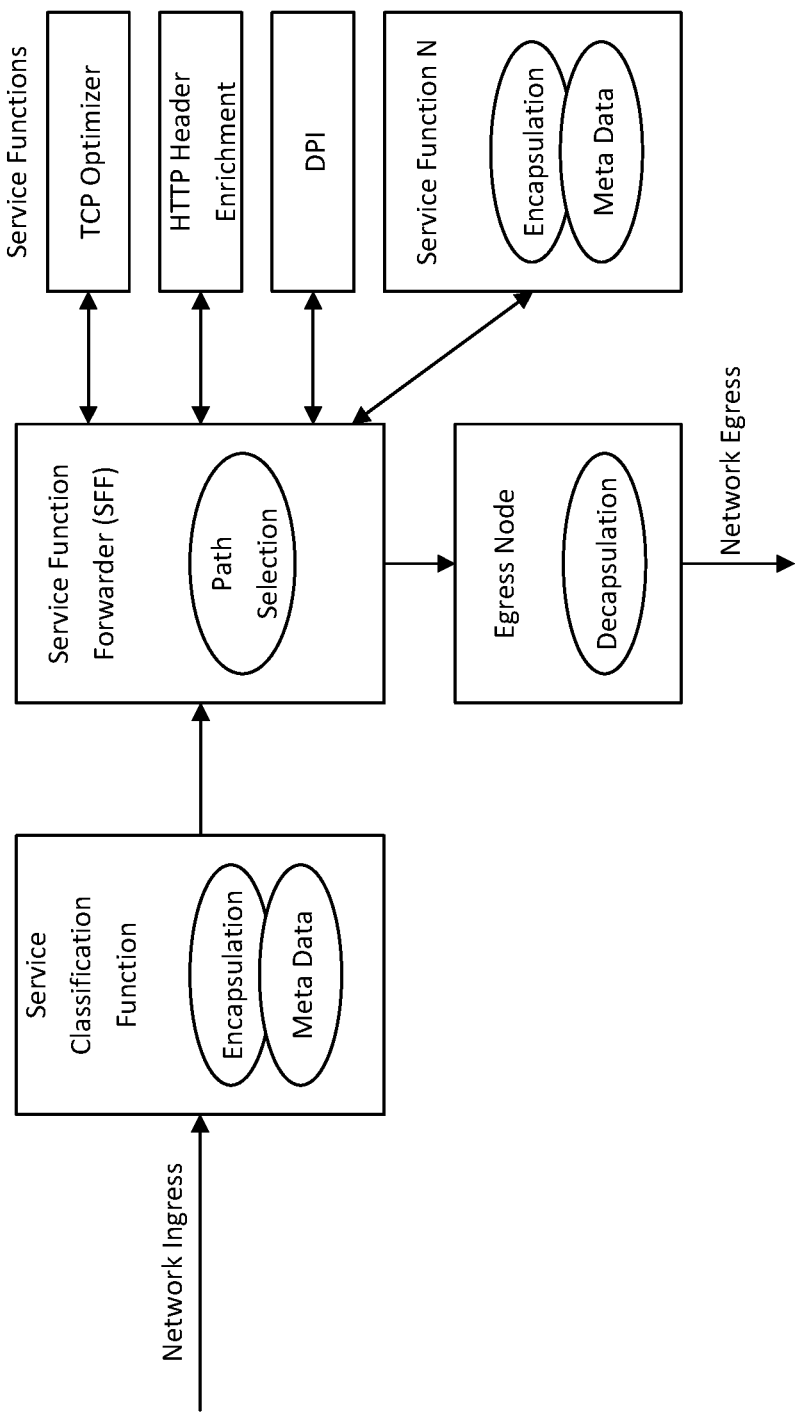
FIG. 2 is a diagram that illustrates the main components of the IETF's SFC architecture framework.
Figure 3:
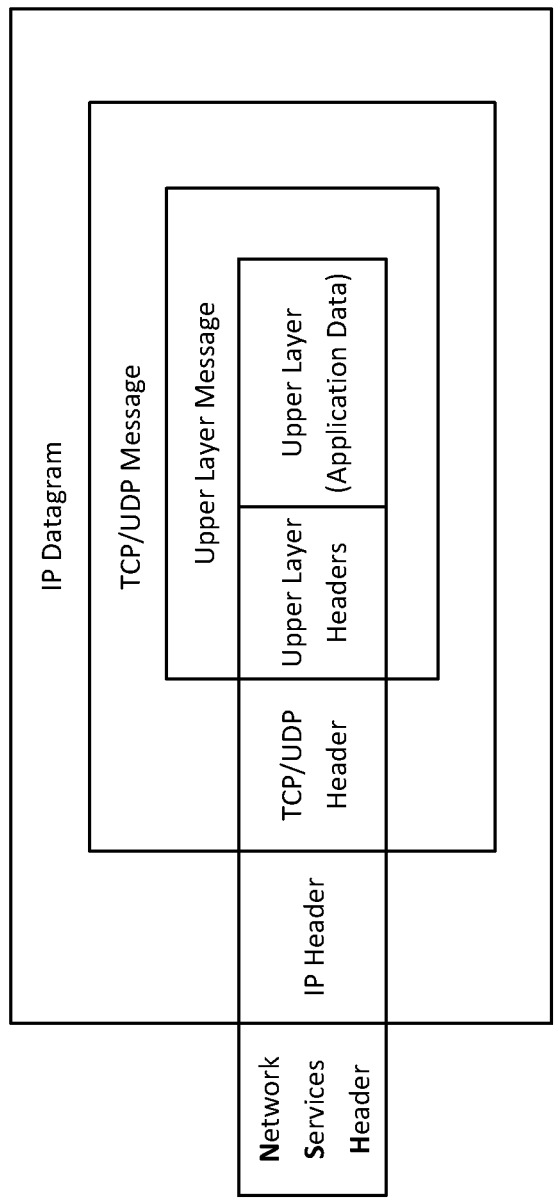
FIG. 3 is a diagram that illustrates NSH encapsulation.
Figure 4:
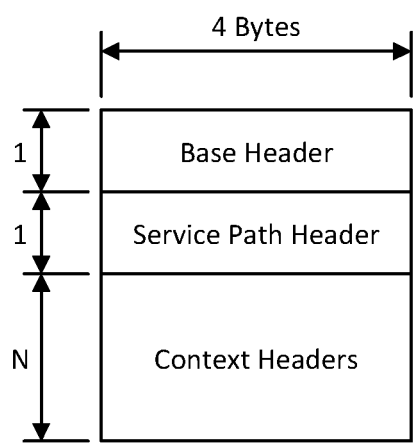
FIG. 4 is a diagram that illustrates the NSH format.
Figure 5:
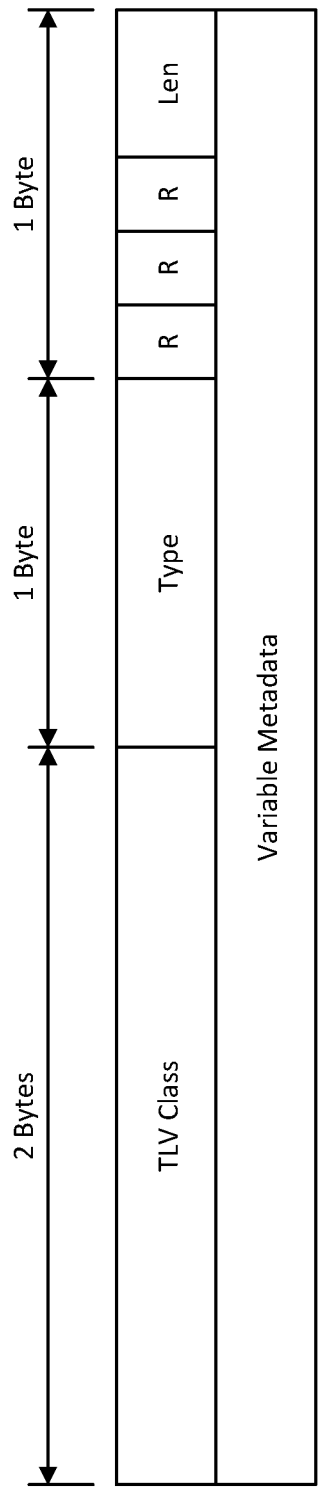
FIG. 5 is a diagram that illustrates variable context headers.
Figure 6:
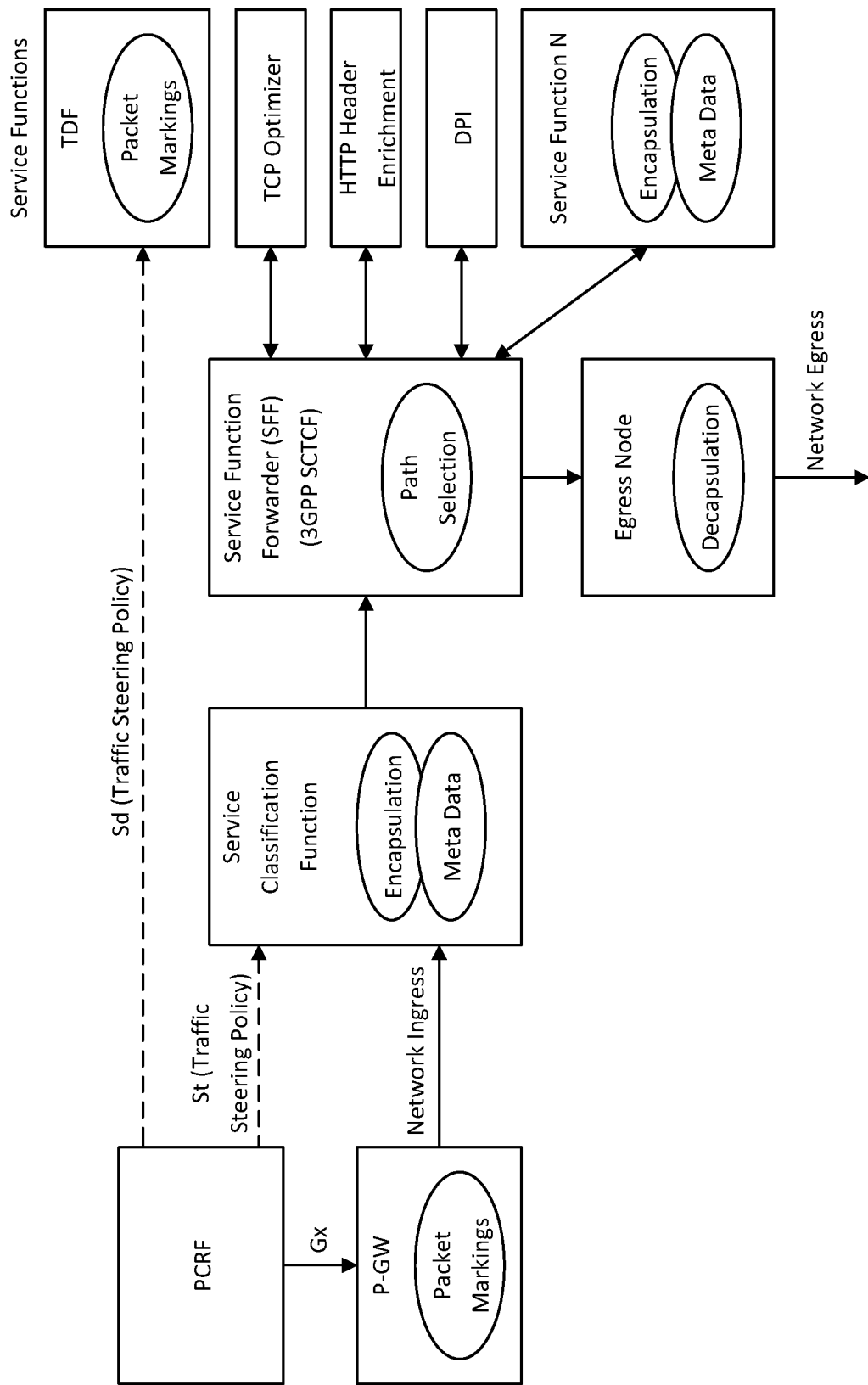
FIG. 6 is a diagram that illustrates a 3GPP architecture applied to the architecture that is proposed by the IETF.
Figure 7:
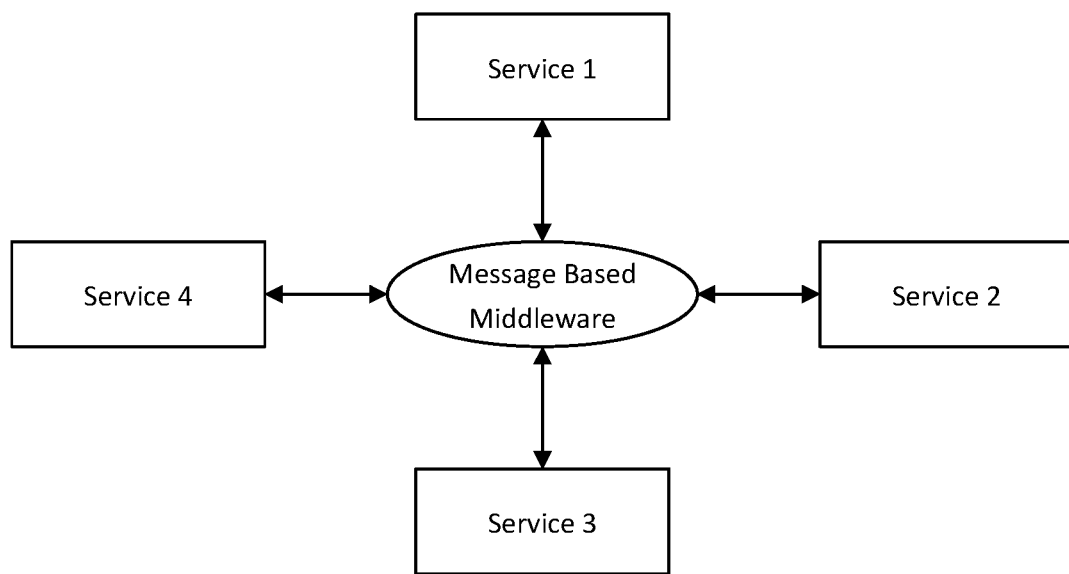
FIG. 7 is a diagram that illustrates a high level representation of message based middleware.
Figure 8:
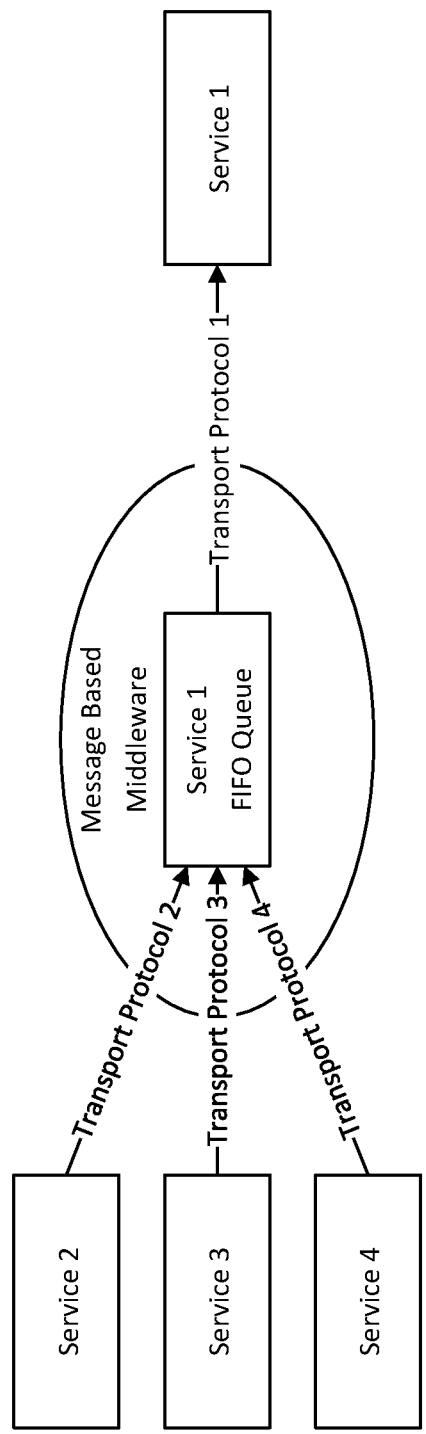
FIG. 8 is a diagram that illustrates queue based middleware.
Figure 9:
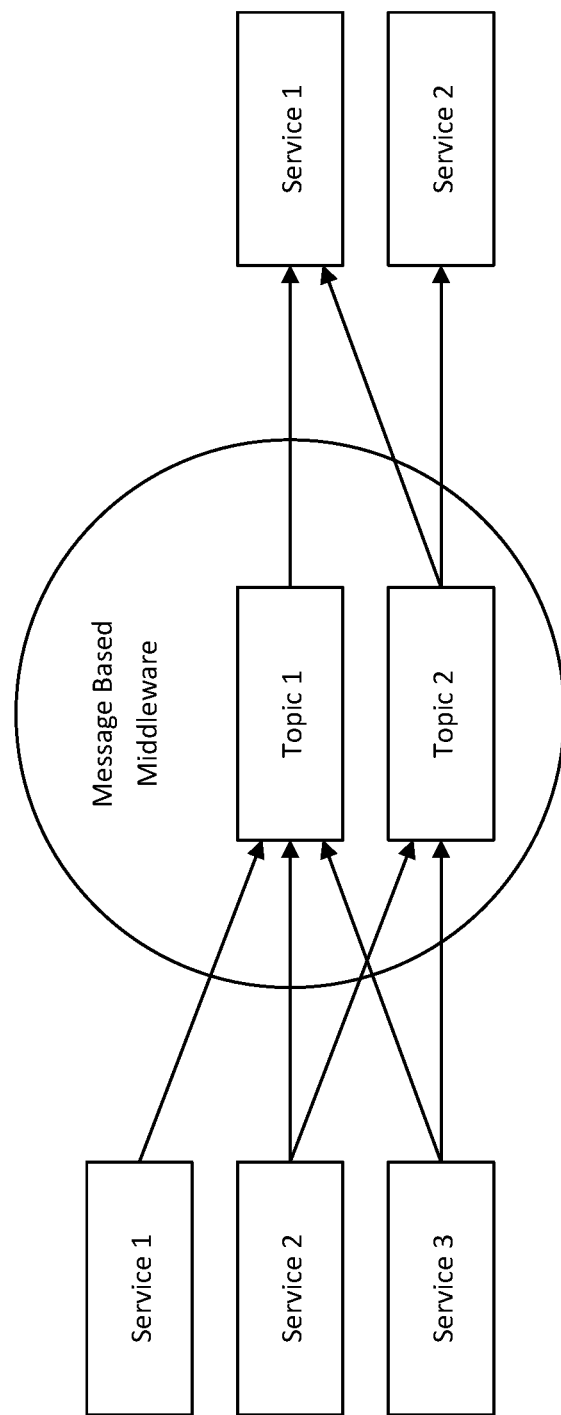
FIG. 9 is a diagram that illustrates an example of a publish/subscribe system.
Figure 10:
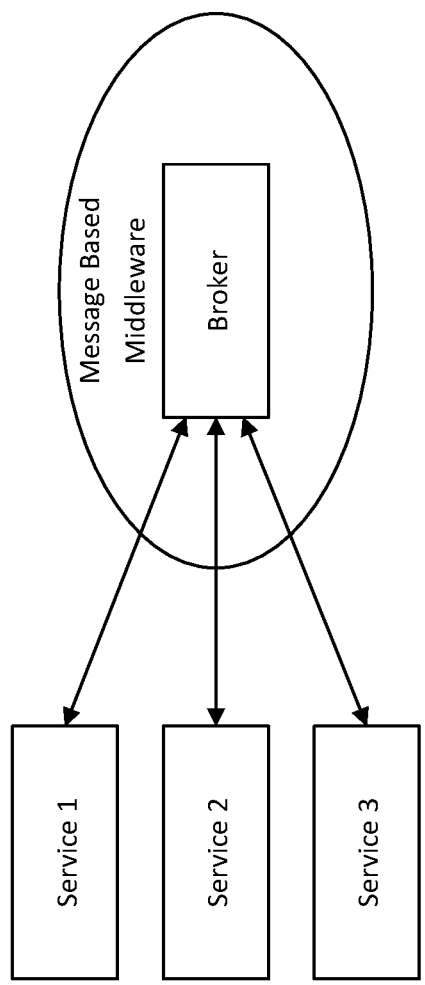
FIG. 10 is a diagram that illustrates a message based middleware broker.
Figure 11:
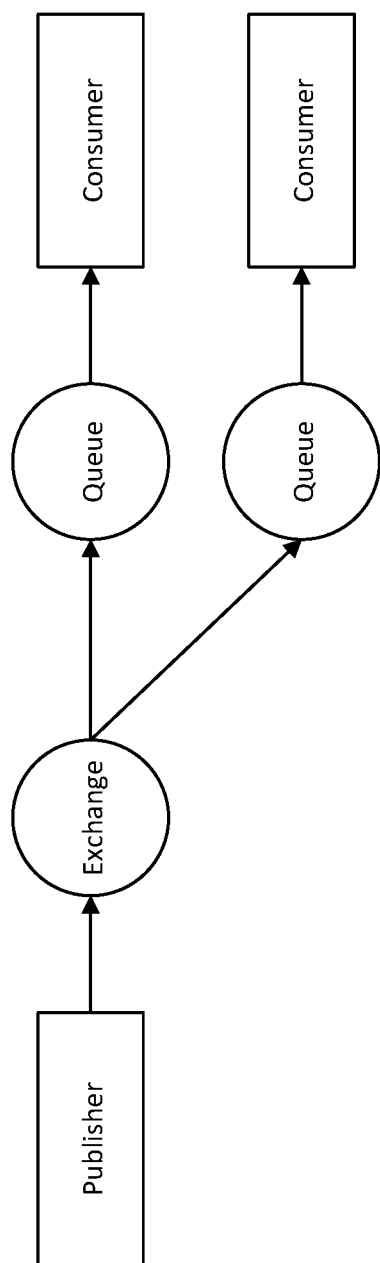
FIG. 11 is a diagram that illustrates the relationship between AMPQ Exchanges and Queues.
Figure 12:
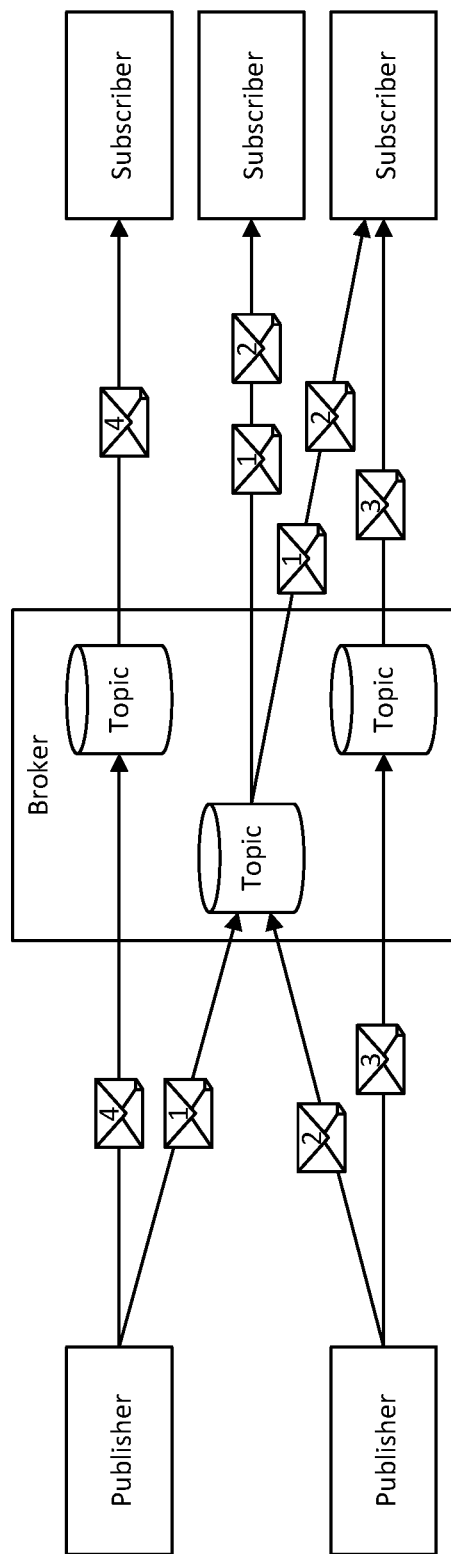
FIG. 12 is a diagram that illustrates an MQTT publish/subscribe model.
Figure 13:
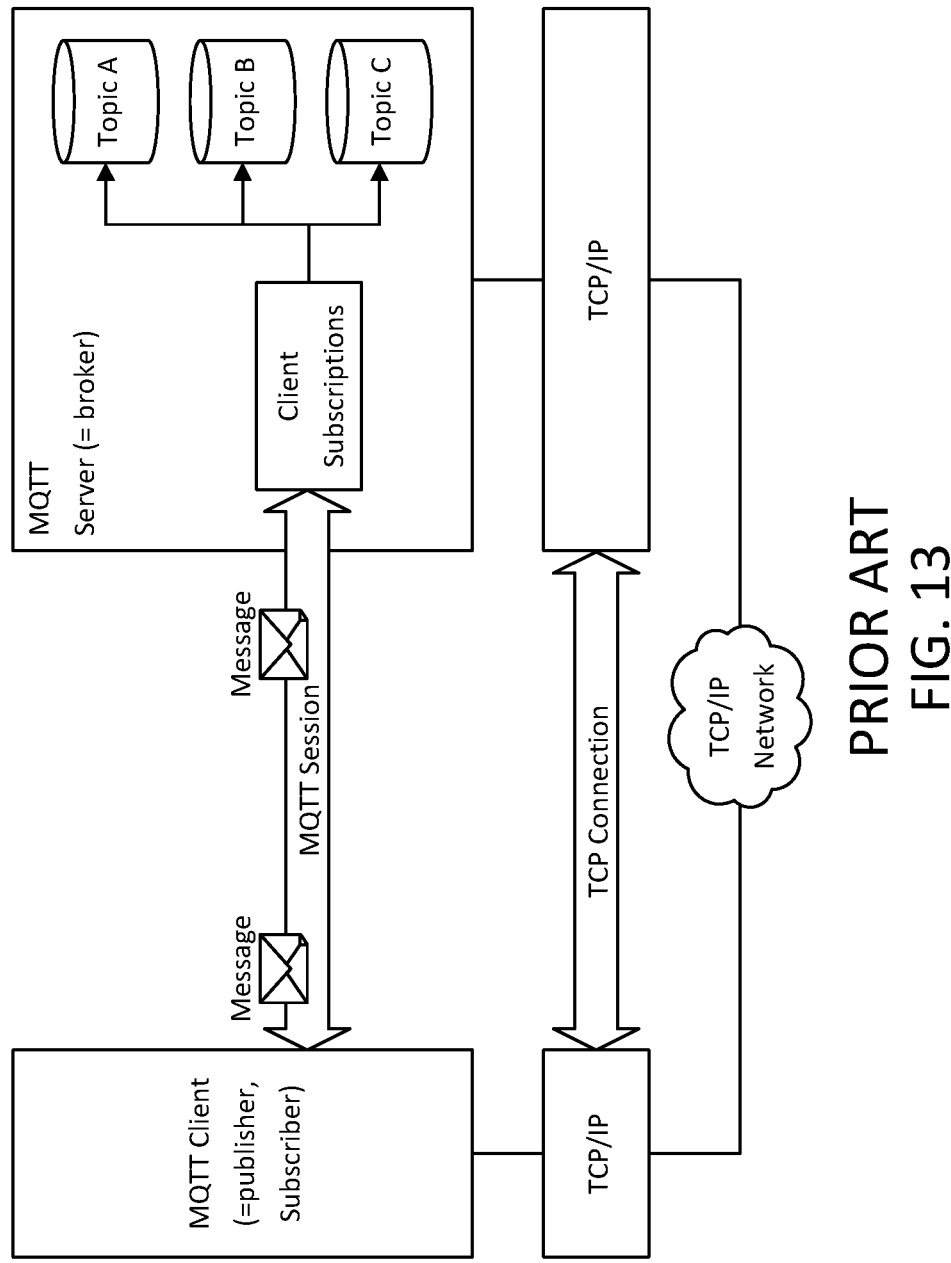
FIG. 13 is a diagram that illustrates an MQTT functional model.
Figure 14:
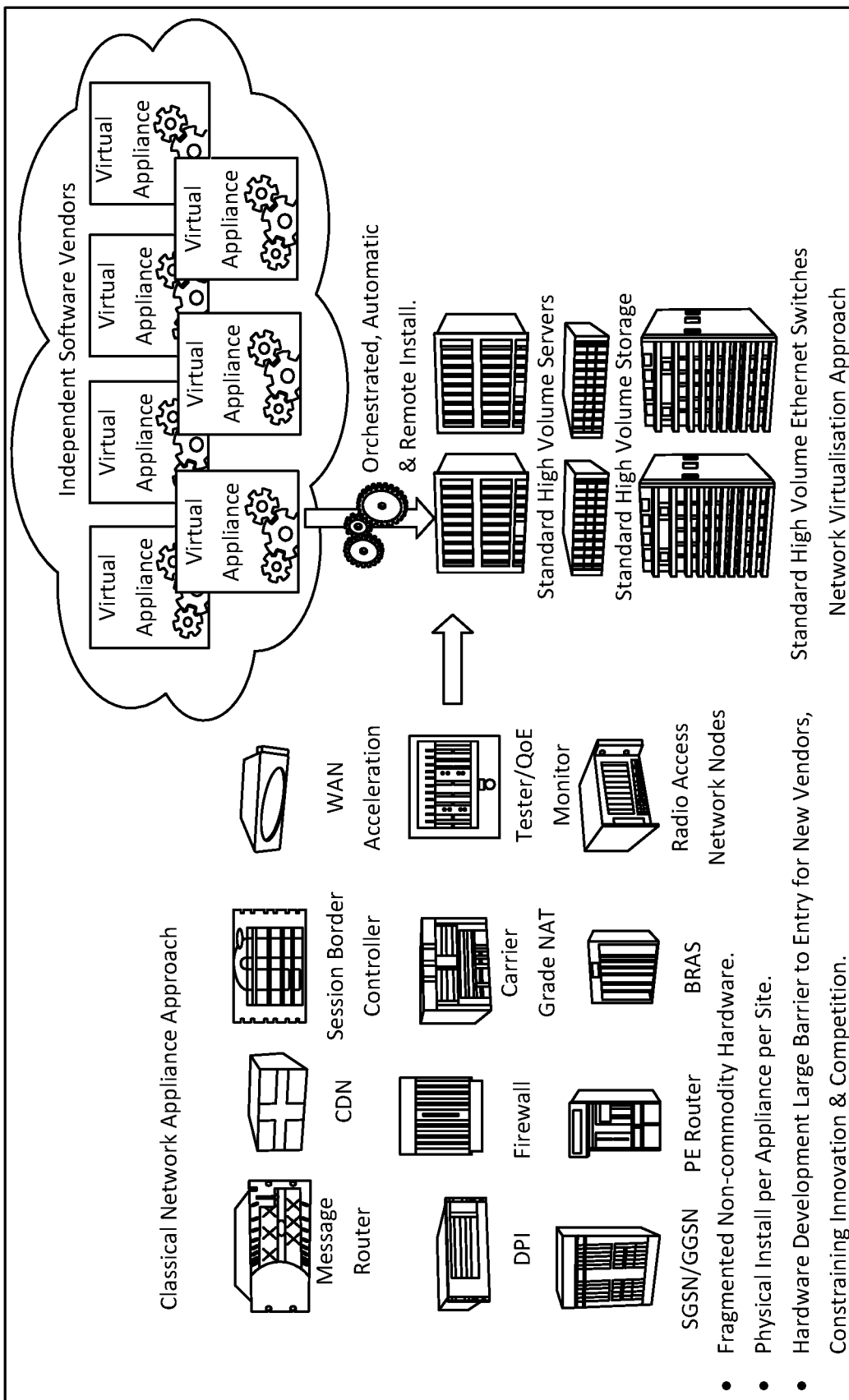
FIG. 14 is a diagram that illustrates Vision for NFV.
Figure 15:
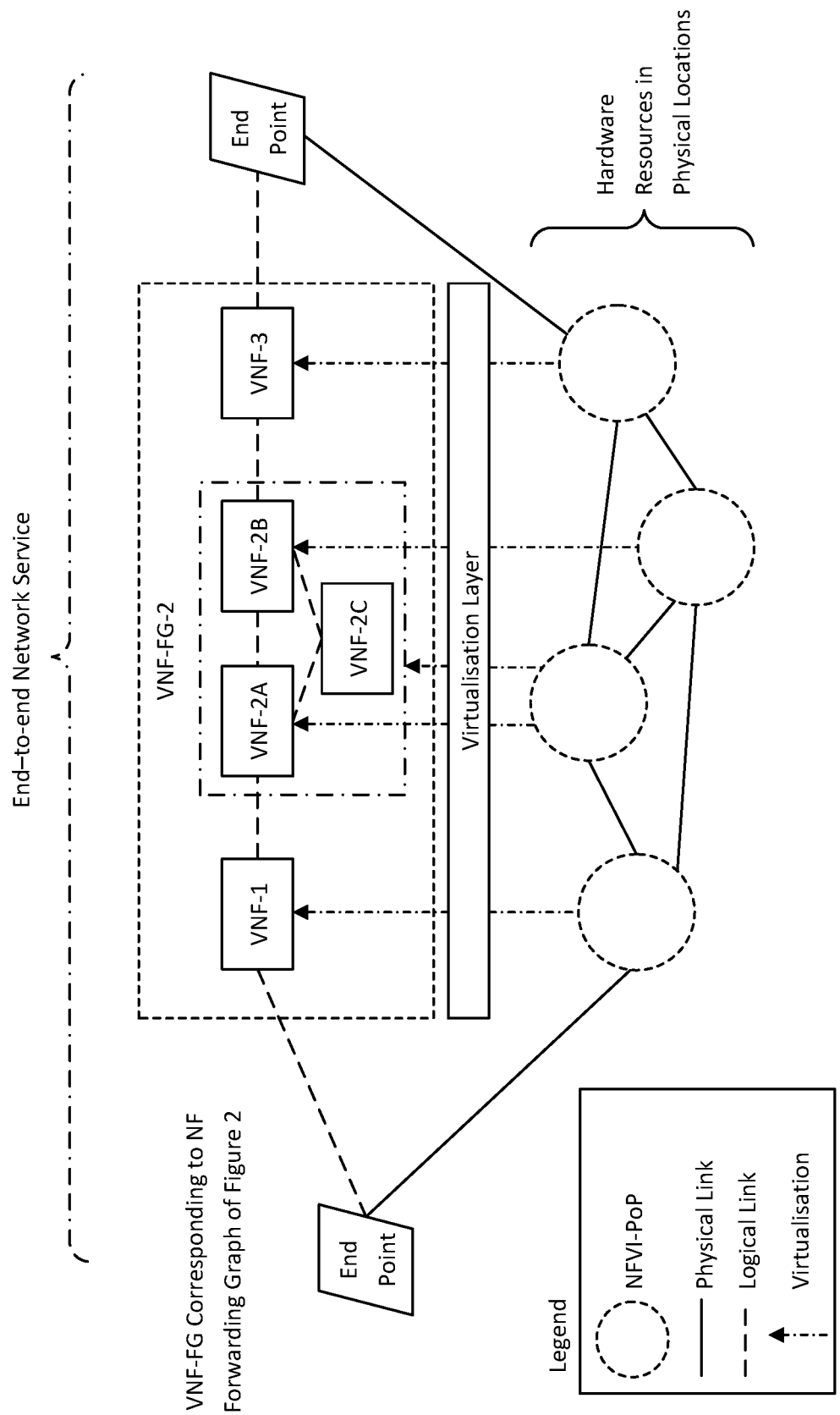
FIG. 15 is a diagram that illustrates the concept of a Virtualized Network Function Forwarding Graph (VNF-FG).
Figure 16:
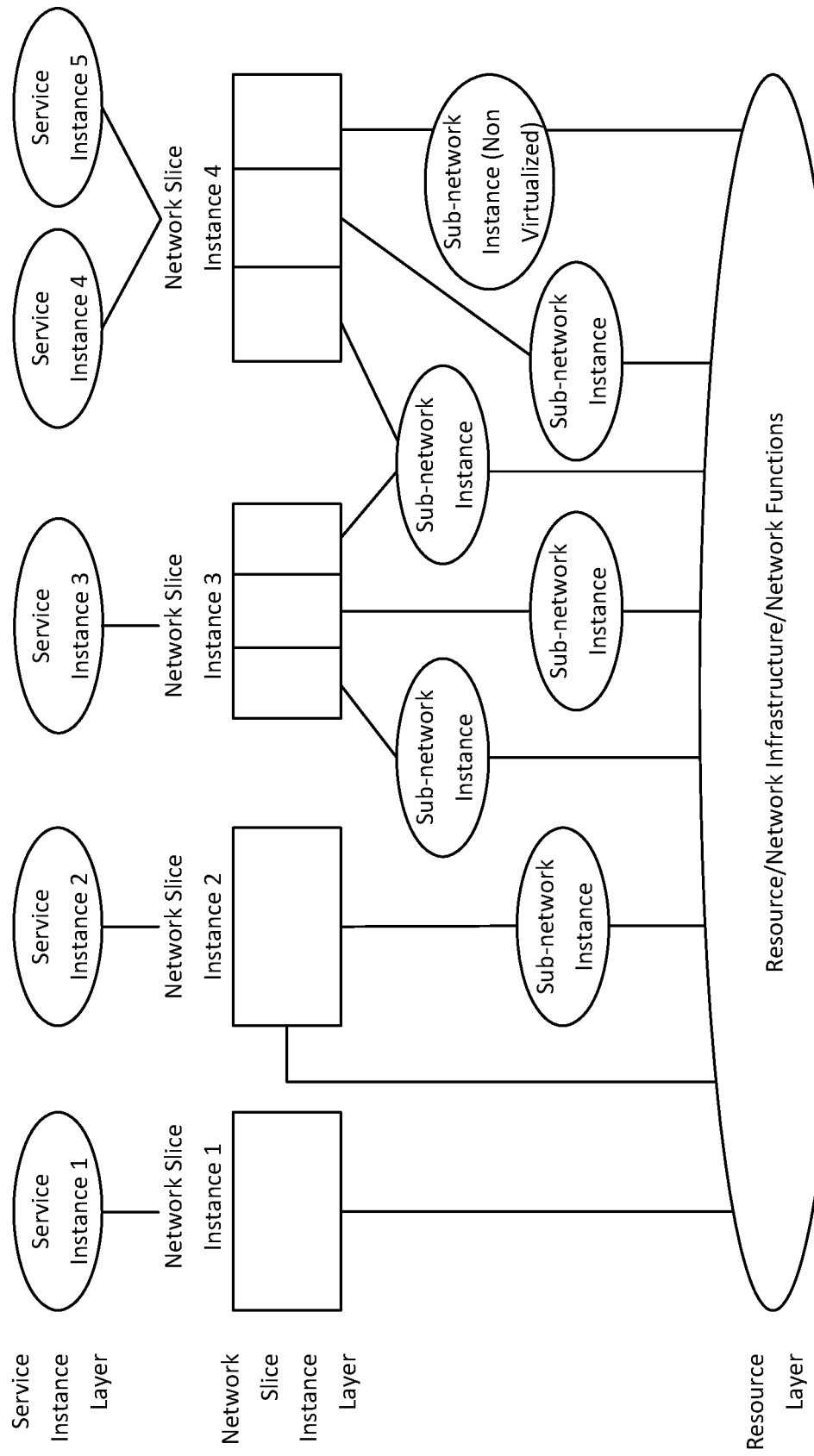
FIG. 16 is a diagram that illustrates a conceptual architecture of network slicing
Figure 17:
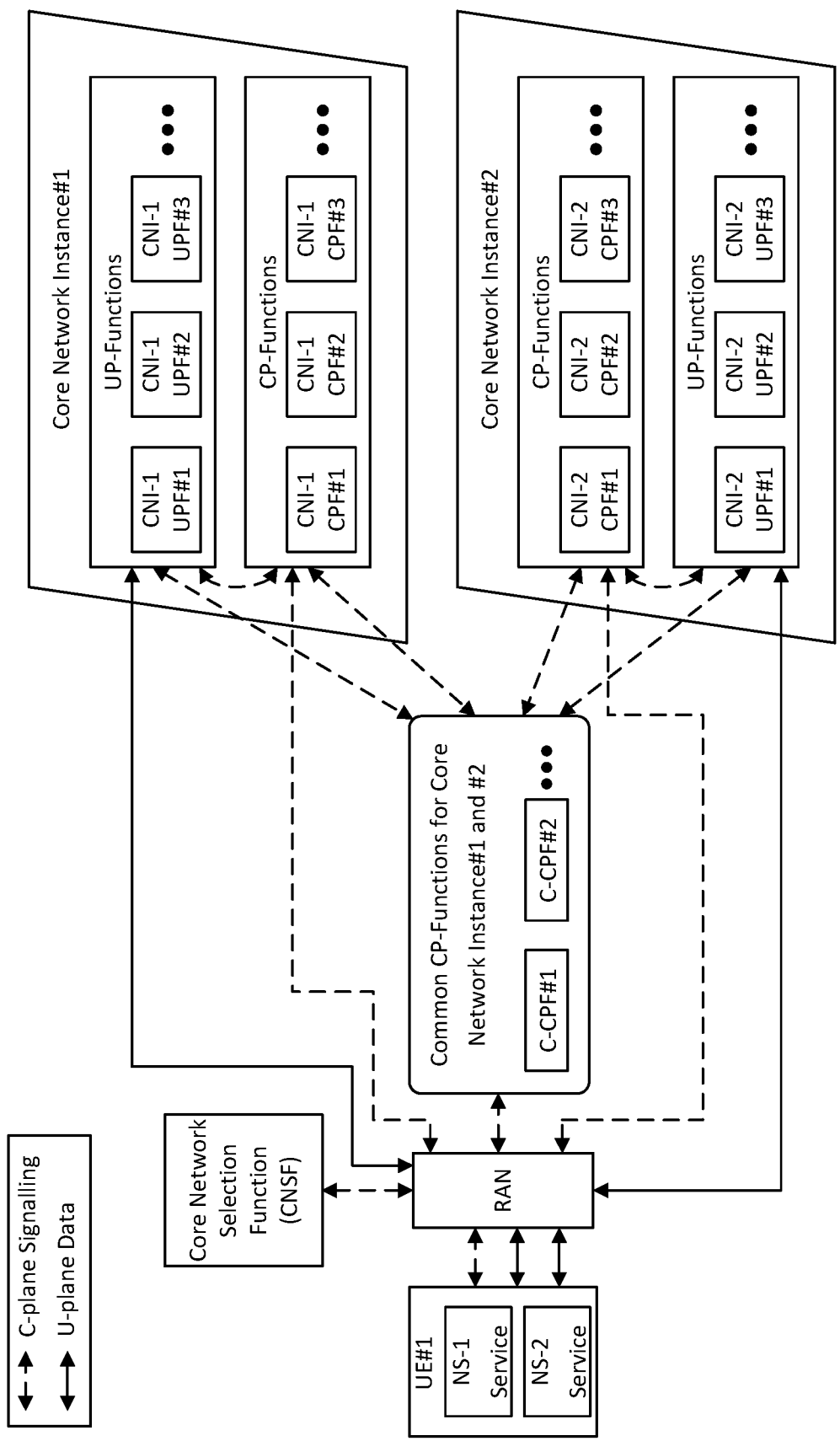
FIG. 17 is a diagram that illustrates CNSF in Selecting Multiple Network Slice Instances.
Figure 18:
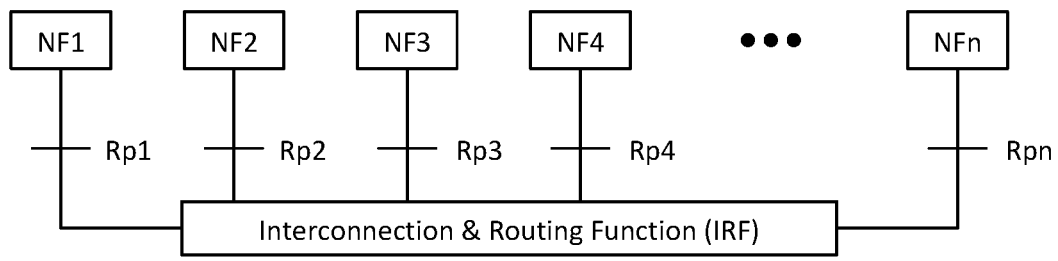
FIG. 18 is a diagram that illustrates a Non-roaming Reference Model for the Interconnection of Network Functions.
Figure 19:
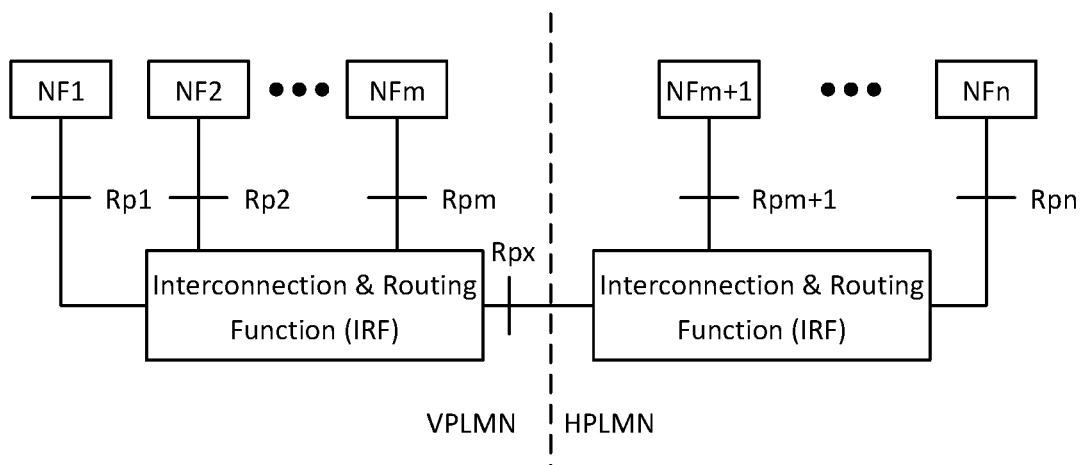
FIG. 19 is a diagram that illustrates a roaming reference model for the interconnection of network functions.

| Abbreviations | |
|---|---|
| AAA | Authentication, Authorization, and Accounting |
| APN | Access Point Name |
| API | Application Program Interface |

TABLE 1-continued

Abbreviations

| | |
|---|---|
| AS | Application Server |
| CN | Core Network |
| CS | Circuit Switched |
| CNEP | Core Network Entry Point |
| DPI | Deep Packet Inspection |
| EPC | Evolved Packet Core |
| EPS | Evolved Packet System |
| GGSN | Gateway GPRS Support Node |
| GPRS | General packet radio service |
| GTP | GPRS Tunneling Protocol |
| HLR | Home Location Register |
| HSS | Home Subscriber Server |
| IE | Information Element |
| IMEI | International Mobile Equipment Identity |
| IMEISV | IMEI Software Version |
| IMSI | International Mobile Subscriber Identity |
| IRF | Interconnection and Routing Function |
| L-GW | Local Gateway |
| LBI | Linked Bearer Id |
| LIPA | Local IP Access |
| LTE | Long Term Evolution |
| LS | Local Server |
| MANO | Management and Orchestration |
| MCN | Mobile Core Network |
| MO | Mobile Originated |
| MM | Mobility Management |
| MME | Mobility Management Entity |
| MOE | Mobile Originated Egress |
| MOI | Mobile Originated Ingress |
| MSC | Mobile Switching Center |
| MT | Mobile Terminated |
| MTE | Mobile Terminated Egress |
| MTI | Mobile Terminated Ingress |
| NAS | Non Access Stratum |
| NF | Network Function |
| NFV | Network Function Virtualization |
| PCRF | Policy and Charging Rules Function |
| PDN | Packet Data Network |
| PLMN | Public Land Mobile Network |
| PS | Packet Switched |
| PTI | Procedure Transaction Identifier |
| P-GW | PDN Gateway |
| PEF | Policy Enforcement Function |
| PMF | Policy Maintenance Function |
| QoS | Quality of Service |
| RAN | Radio Access Network |
| RAT | Radio Access Technology |
| RIF | RAT Interface Function |
| RRC | Radio Resource Control |
| SCS | Service Capability Server |
| SCEF | Service Capability Exposure Function |
| SGSN | Serving GPRS Support Node |
| S-GW | Serving Gateway |
| SISF | Slice Instance Selection Function |
| SIMF | Slice Instance Management Function |
| SM | Session Management |
| SPR | Subscription Profile Repository |
| SSF | Subscription Service Function |
| TAD | Traffic Aggregate Description |
| TDF | Traffic Detection Function |
| TFT | Traffic Flow Template |
| UDR | User Database Repository |
| UE | User Equipment |
| USIM | Universal Subscriber Identity Module |

TABLE 2

Definitions

| | |
|---|---|
| Network Function (NF) | An NF can be a processing function in a network, which has defined functional behavior and defined interfaces. An NF can be implemented either as a network element on a dedicated hardware, or as a software instance running on a dedicated hardware, or as a virtualized function instantiated on an appropriate platform, e.g. on a cloud infrastructure. |
| Network Slice Template | This refers to the set of NW functions and how the network functions are to be configured to support a certain service profile(s). |
| Network Slice or Network Slice Instance | An instantiation of a NW Slice Template. A Network Slice can be composed of all the NFs that are required to provide the required Telecommunication Services and Network Capabilities, and the resources to run these NFs. |
| Underlay Network (ULN) | Network functions or nodes that reside in the core network but do not belong to any specific network slice (instance). Even though the ULN functions do not belong to a specific network slice, they may be virtualized and may be grouped together as a set of common (used by multiple network slice instances) functions. The function in the undelay network may be aligned with the functions that described as Common CP Functions. |
| Underlay Network Signaling | Signaling that occurs between the UE and network elements that exist outside of any network slice or between network elements that exist outside of any network slice |
| UE Context | Is a piece of information about a UE's current state. UE context can come from many different NF's (e.g. Location information from a MM function, what applications are running from a DPI/TDF function, etc.) |
| UE Capability Profile | What the UE is capable of doing. This profile is typically static. For example, if the UE has relay capabilities, the UE's category (e.g. maximum data rate), screen size, voice capable, IMS capable, GPS capable, etc. |

TABLE 2-continued

| | Definitions |
|---|---|
| UE Service Profile | What the UE is trying to do, may try to do, or wants to try to do.<br>A UE's Service Profile defines what services the UE wishes to access. The network may provide these services via one or more network slice instances. A UE's Service Profile may include its location. |

3GPP's SA2 working group is defining a new, 5G, network architecture. The work is taking place under a study item called "Study on Architecture and Security for Next Generation System" (FS_NextGEN). The output of the study is being captured in 3GPP TR 23.799, Study on Architecture for Next Generation System.

The 5G Network Architecture will rely on Network Function Virtualization (NFV) techniques. NFV will allow Mobile Network Operators to dynamically deploy, scale up, and scale down services as they are required, or requested, by their customers. Services will be provided via virtual network functions that are joined to form a slice and provide one or more services to users.

Not all functions can be virtualized. For example, before UE 2006 can connect to a Network Slice 2002 it must form an initial connection with the network. Thus, some basic, non-virtualized, connection with the network must be formed before the network can determine what network slice(s) a UE 2006 should connect to. Another example is that a UE 2006 must form a layer 1 connection with some base station hardware before it can form an initial connection with a network.

In the proposals that have been considered thus far, there has only been limited discussion about how a UE 2006 forms an initial connection with the 5G network and what functions are required to exist outside of any network slice 2002 so that the UE 2006 can form an initial connection with the network. 3GPP S2-162259 and 3GPP S2-162260 are two of the few references that discuss this problem. It should be appreciated that, since the initial connection procedure involves authorizing the UE to receive services from the network, an initial connection procedure may also be called a registration procedure.

5G Network Architecture

Figure 20A:
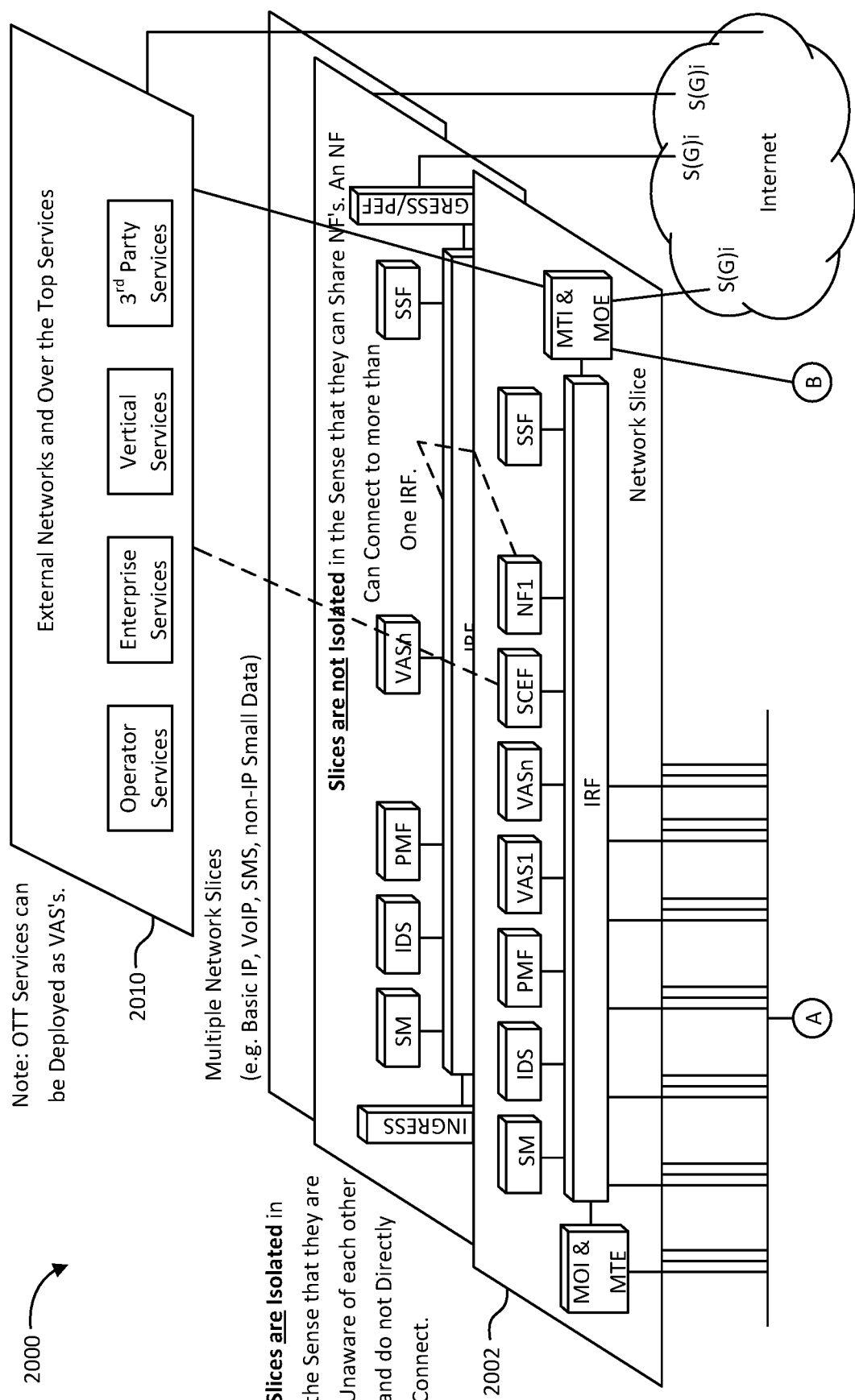
FIG. 20A is a diagram that illustrates a 5G Network Architecture.
Figure 20A:
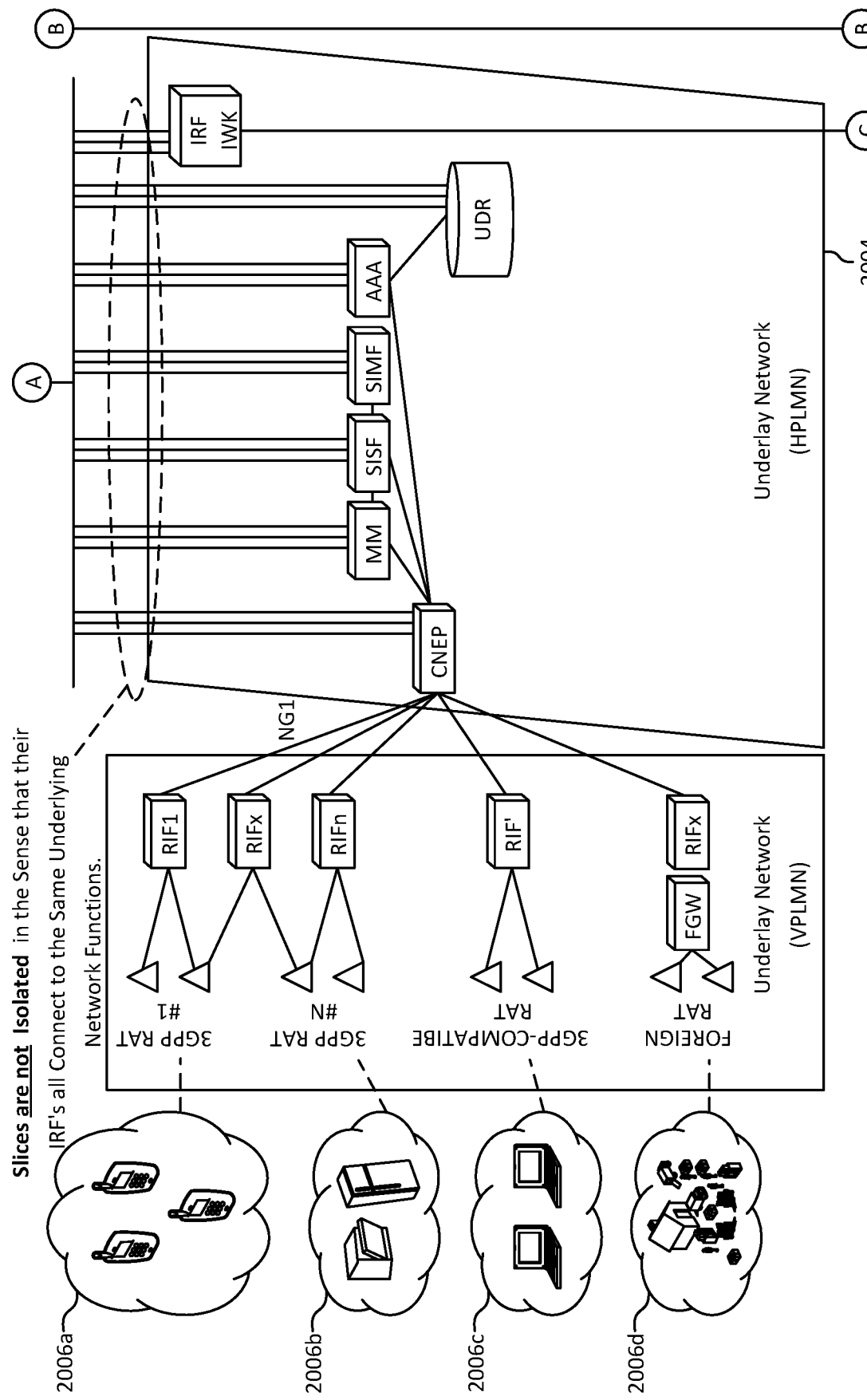
Figure 20A:
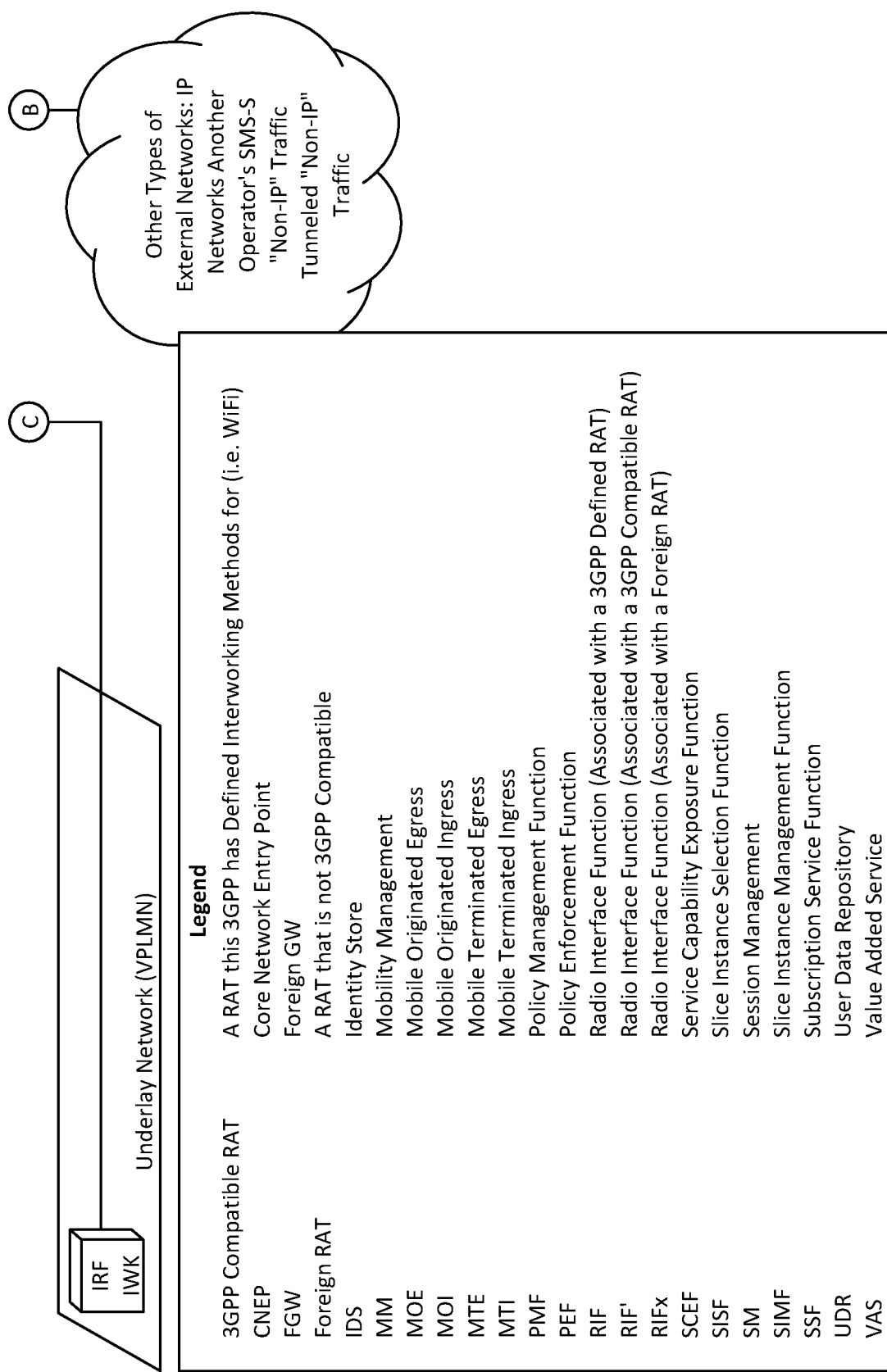
Figure 20B:
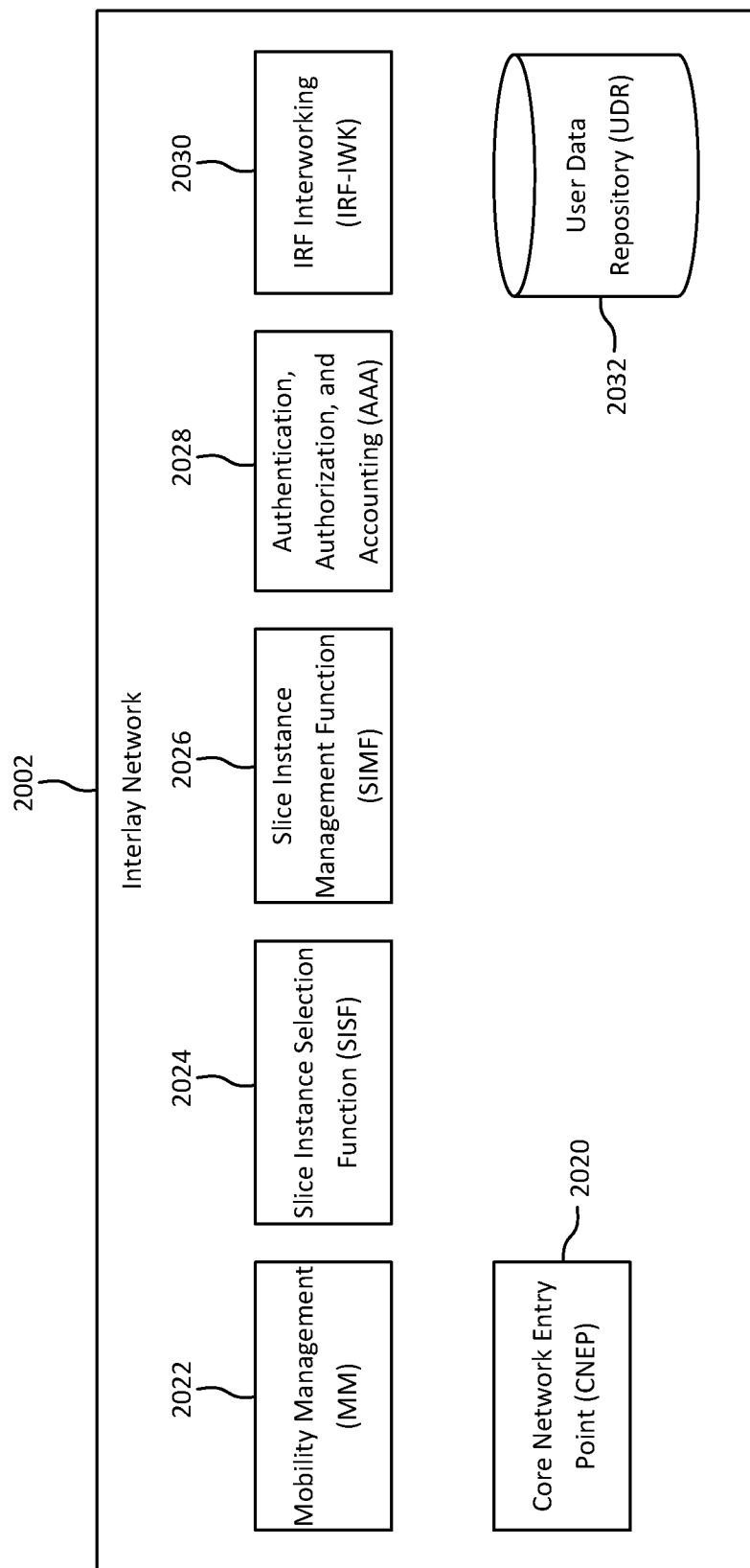
FIG. 20B is a diagram that illustrates an underlay network for the 5G Network Architecture of FIG. 20A.
Figure 20C:
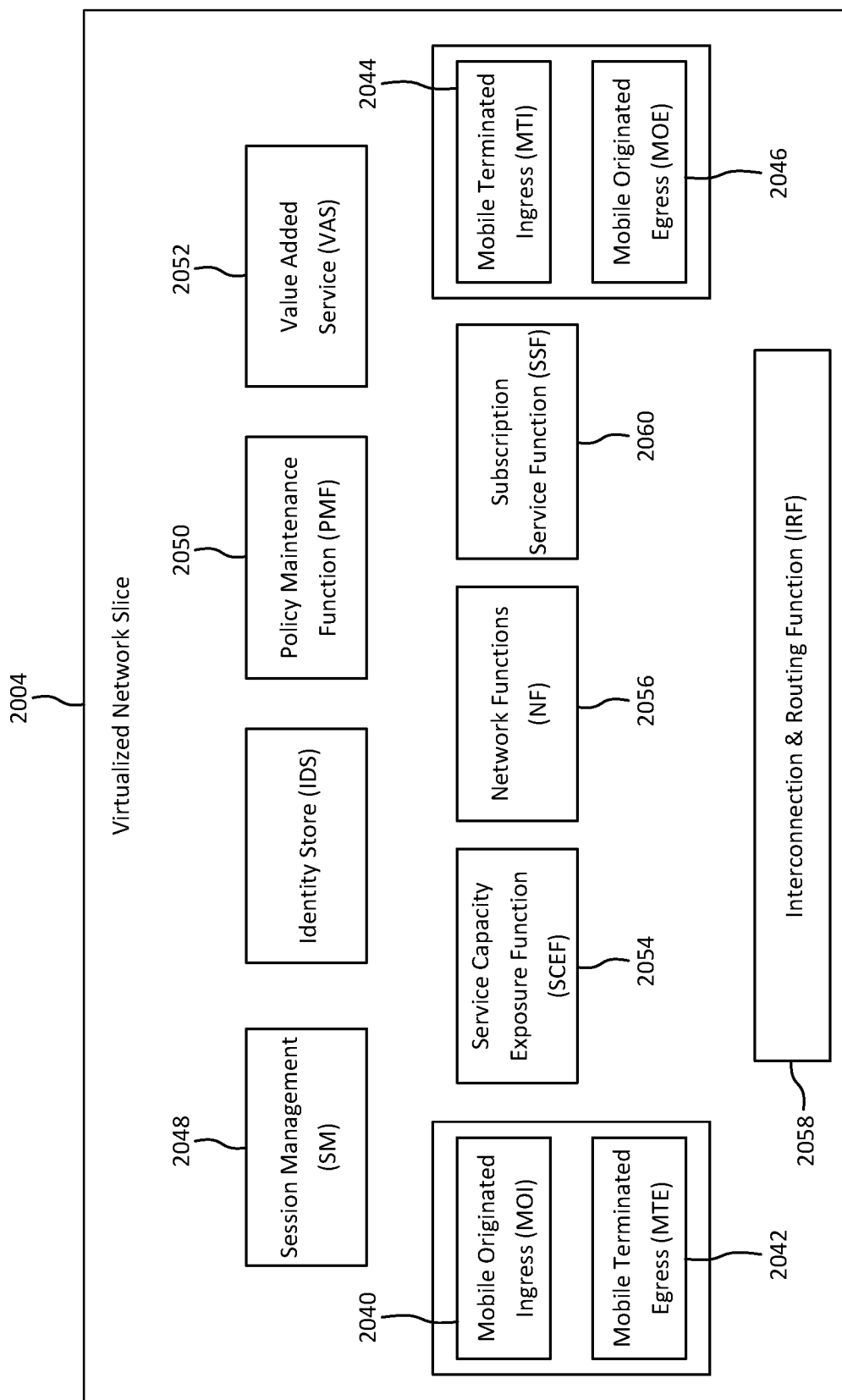
FIG. 20C is a diagram that illustrates a virtual network slice for the 5G Network Architecture of FIG. 20A.

FIG. 20A shows a 5G Network Architecture 2000 with underlay network 2004 and virtual network slice 2002. FIG. 20B is a diagram that illustrates an underlay network 2004 for the 5G Network Architecture of FIG. 20A. FIG. 20C is a diagram that illustrates a virtual network slice 2002 for the 5G Network Architecture of FIG. 20A.

As shown in the figure, it is possible for a variety of UEs 2006a-d to connect to the 5G network via multiple different Radio Access Technologies (RATs). The RATs that are used to connect to the 5G network may or may not be defined by 3GPP. If the RAT is not defined by 3GPP, 3GPP may or may not have defined procedures for the RAT to interface to the 5G network. If 3GPP has not defined procedures for the RAT to interface with the 5G network, then a customized interface could be built based on proprietary solutions that allow the RAT to interface to the 5G network via the 3GPP defined interface to the core network.

A reference point, name NG1, is used to interface a RAT with the 5G core network. The NG1 interface is divided into a user plane reference point and a control plane reference point, NG1-U and NG1-C respectively. The NG reference point is designed such that the signaling on this interface and protocols on this interface are largely RAT independent. However, the interface is expected to be RAT-aware in the sense that the interface should provide the ability to inform the 5G network of the RAT type and RAT abilities. Some examples of RAT abilities maybe minimum or maximum latency, maximum data rate, security capabilities, etc.

FIGS. 20A and 20B shows functions that may be considered part of the underlay network 2004. The underlay network 2004 consists of core network functions that the UE 2006 requires to establish a connection and obtain a minimum level of service. These functions are required before the UE 2006 can be authenticated, authorized, and permitted to receive service. The underlay network 2004 may also consist of functions that should not be virtualized. For example, a user's subscription data should not be virtualized.

The 5G architecture can rely heavily on Network Function Virtualization techniques. Virtualized network functions will be grouped together, via an IRF 2058, into network slices to provide one or more services to a UE 2006 and/or a group of UEs. A UE 2006 may be permitted to simultaneously connect to more than one network slice.

Network Functions 2056 do not communicate directly with each other. Rather, they communicate via the IRF 2058 which is described above. Some network functions maybe common to multiple network slices. This type of network functions may connect to more than one IRF. An example of a network function that may be shared across network slices is a Mobility Management network function 2022 that keeps track of the UE's point(s) (i.e. RATs) of attachment to the network.

Network Slices can be mostly isolated from each other in the sense that they will not interact directly. However, they are not isolated in the sense that they may run on the same physical platform and they may interface to the same network functions in the underlay network 2004.

Network Slices may also communicate in roaming scenarios. For example, some services may require that the UE's IP anchor reside in the HPLMN while Mobility Management functionality may reside in the VPLMN. In such a scenario it is necessary for slices to interact or for the slice to exist across operators. In such a scenario, the IRF's of each slice (or part of the slice) will communicate via an IRF Interworking (IRF-IWK) function 2030 in the underlay network 2004.

Operator Defined, Enterprise, Vertical, and 3rd Party services may be deployed as network functions. Such services may connect directly to an operator's IRF 2058 to provide services to the UE 2006 or the operator. For example, an M2M Server may be deployed as a network function that connects directly to the IRF 2058 and provides services to the UE 2006. Also, a parental control service may be deployed as a NF and apply policies to traffic that comes to and from a UE 2006. For example, the PCF may provide parental control polices to a UPF and the UPF can enforce the policies. As mentioned elsewhere in this document, an NF such as the UPF may include a PEF.

Operator Defined, Enterprise, Vertical, and 3rd Party services may also be deployed in an Over the Top (OTT) manner. When deployed in this manner, traffic is routed from a slice's egress node to the OTT services 2010. The output of the egress node may typically be IP data. However, it may be SMS data and the OTT service may be an SMS-SC. Also, the traffic may be non-IP data packets that are tunneled (via IP) to an OTT service.

OTT Services, such as M2M Servers (IN-CSE, SCS, AS) may simultaneously connect and interact with a UE 2006 in an OTT manner and interact with the UE's network slice 2002 via an SCEF 2054 that allows the OTT Service to connect to the IRF 2058 and obtain services from the slice 2002.

Network Functions included in FIGS. 20A-C are described below. It is understood that the functionality illustrated in FIGS. 20A-C, may be implemented in the form of software (i.e., computer-executable instructions) stored in a memory of, and executing on a processor of, a wireless device or other apparatus (e.g., a server, gateway, device, or other computer system), such as one of those illustrated in FIGS. 36-37 described below. It is also understood that the functionality illustrated in FIGS. 20A-C may implemented as a set of virtualized network functions. The network functions may not necessarily communicate directly, rather, they may communicate via forwarding or routing function.

FIGS. 22-33 describe 5G Network Procedures that are required for the UE 2006 to establish basic connectivity with the 5G network. The procedures of FIGS. 22-28 are based on an approach that requires interactions between the UE 2006 and functions in the Underlay network 2004. The procedures of FIGS. 29-33 show an alternative approach to connect to a new network slice, change network slices, change profiles, etc. These procedures assume that the UE 2006 has a default slice that it will connect to at the initial attachment/connection event, which may also provide IP connectivity.

The 5G Network will support Network Functions that may either be virtualized or not virtualized. It might not be desirable to virtualize network functions that are required to be centralized and coordinated across all network functions, for example a subscriber data base. Different Network Functions may be performed in the same or different physical platforms or Network Nodes. Table 3 lists the Network Functions that are discussed in this document.

TABLE 3

Network Functions

| Network Function | Description | Possible Placement in the ULN 2004 |
|---|---|---|
| Subscription Service Function (SSF) 2060 | Serves as an interface between the UDR 2032 and the other functions in a Network Slice 2002. It should be appreciated that this function is an interface to the UDR and that network functions could communicate directly with the UDR; thus in some deployments, SSF functionality can be absorbed by the UDR. | |
| User Data Repository 2032 | Maintains and provides records of user subscriptions including those services that are enabled for a user's account. It should be appreciated that the maintaining and managing are the same thing, thus UDR could also be called User Data Management (UDM). | X |
| Policy Maintenance Function (PMF) 2050 | Stores and allows for the management and update of network policies that can effect Charging, Access to Services, Quality of Service, Access to Service Profiles, etc. Since the PMF manages polices it should be appreciated that managing and controlling are the same thing, thus the PMF may also be called a policy control function (PCF). | |
| Policy Enforcement Function (PEF) | Enforces the policies that are retrieved from the PMF 2050. Policy Enforcement may be performed in multiple network functions, e.g. SISF 2024 may restrict the Slice Instances that a user may be assigned to, based on policy. Since this function performs authentication, it may also be called a Authentication Server Function (AUSF). | |
| Authorization Authentication Accounting (AAA) Function 2028 | Provides challenges (authentication vectors) in response to requests for authentication and verifies responses. This functions the AAA Server 2028 may be integrated with the UDR 2032 and aligned with the Access Control Agent (ACA) that is described in 3GPP S2-162260, NextGen Core Architecture solution for sharing Network Function across multiple Network Slices. | X |

TABLE 3-continued

Network Functions

| Network Function | Description | Possible Placement in the ULN 2004 |
|---|---|---|
| RAT Interface Function (RIF) 2102 | Serves as the primary interface between the RAT and the CN. There will be many different RIF's defined as the CN must support many different RATs. | X |
| Slice Instance Selection Function (SISF) 2024 | Provides Network Slice Instance assignments to users based on signaled parameters, subscription information, or as a default as part of an initial connection establishment. This functionality of this NF may be aligned with the Network Slice Selection Function (NSSF) and C-Plane Selection Function (CPSF) of 3GPP S2-162259, Update of solution for support of multiple connections to multiple Network Slices reference. Since the SISF selects network slices, it could also be called the Network Slice Selection Function (NSSF). Since the SISF selects a network slice from a list, or repository, of network slices, it may also be called the Network Slice Repository Function (NSRF). | X |
| Slice Instance Management Function (SIMF) 2026 | Includes functions of VNF Management and Orchestration (MANO) Manages the creation and maintenance of network slices (scale-up/scale-down) Responsible for: creating new slices, modifying slices (adding/removing network functions (scale-up scale down)) starting/stopping slices telling SISF 2024 about Slice Descriptors This network function may control the timing of network slices (e.g. only operate during rush hour for a particular location). | X |
| Core Network Entry Point (CNEP) 2020 | Serves as the primary interface between all RIFs and the CN. It should be appreciated that, if no independent RIF is deployed, then the functionality that is described as being part of the RIF should be performed by the CNEP, integrated with the CNEP, or co-located with the CNEP. This NF may be integrated with the SISF 2024. | X |
| Interconnection and Routing Function (IRF) 2058 | Exposes a single interface to all Network Functions allowing for data to flow between the various Network Functions. | X |
| Mobile Originated Ingress Function (MOI) 2040 | The point MO where user plane traffic leaves the underlay network 2004 and enters the network slice. Since the MOI deals with User Plane Data it could be called a User Plane Function (UPF). | |
| Mobile Originated Egress Function (MOE) 2046 | The point MO where user plane traffic leaves the network slice and enters a PDN or is sent directly to a Server. Since the MOE deals with User Plane Data it could be called a User Plane Function (UPF). | |
| Mobile Terminated Ingress Function (MTI) 2044 | The point MT where user plane traffic is injected into the Network Slice for routing to the UE. Since the MTI deals with User Plane Data it could be called a User Plane Function (UPF). | |
| Mobile Terminated Egress Function (MTE) 2042 | The point MT where user plane traffic leaves the network slice and enters the underlay network 2004 for transmission to the UE. Since the MTE deals with User Plane Data it could be called a User Plane Function (UPF). | |
| Session Management (SM) Function 2048 | Manages the PDU sessions: including IP address assignment (if needed), PDU forwarding, PDU screening, etc. This function could be called the SM Function (SMF) or SM Network Function (SM NF). | |

TABLE 3-continued

Network Functions

| Network Function | Description | Possible Placement in the ULN 2004 |
|---|---|---|
| Mobility Management (MM) Function 2022 | Maintains the mobility context for of all UEs that are attached to the network. This functionality could be co-located, or integrated, with another network function such as the CNEP or SISF. | X |

The 5G Network will support Network Nodes which can perform one or more Network Functions and which may either perform the Network Functions natively in certain circumstances or through Network Function Virtualization. In some cases, the functions described in Table 3 may be distributed across multiple network nodes. For example the Session Management function may exist in ingress and egress nodes, at the RAT base stations, and at the UEs. When the RIF, CNEP, and MM Function are co-located/combined in one NF, the combined function deals when the UE's access to the network and mobility management, thus the co-located/combined NF may be called an Access and Mobility Management Function (AMF). There could be a single NF for handling MO data. In this case, the MOI and MOE could be co-located. Since this NF deals with user plane data, this combined function could be called a User Plane Function (UPF) or MO-UPF. There could be a single NF for handling MT data. In this case, the MTI and MTE could be co-located. Since this NF deals with user plane data, this combined function could be called a User Plane Function (UPF) or MT-UPF. There could be a single NF for handling MT and MO data. In this case, the MOI, MOE, MTI and MTE could be co-located. Since this NF deals with user plane data, this combined function could be called a User Plane Function (UPF).

The following sub-sections describe in more detail, some of the network functions described in Table 3.

The Subscription Service Function (SSF) 2060 is a type of NF that handles queries of subscriber data. Subscriber information is stored in a subscriber database that holds subscriber information for each UE 2006, group of UE's, or Application Server. An HSS, HLR, SPR, and UDR 2032 are types of Subscriber Databases. The subscriber database itself would not typically be virtualized, instead it would be considered a function that is part of the underlay network 2004 and shared across network slices. Since the SSF 2060 is a NF which may be part of a slice, it may interface with the UDR 2032 via an IRF 2058.

In the example of FIGS. 20A and 20B, the subscriber database (UDR 2032) is part of the underlay network 2004 and not virtualized. The SSF 2060 is a NF which may be virtualized and instantiated in each network slice instance.

When a new network slice is instantiated, the associated SSF 2060 may be configured based on the services that are provided by the slice instance and the users that are, or will be, associated with the slice instance. For example, if certain users, groups of users, or classes of users are not permitted to use the slice instance, then the SSF 2060 may not allow queries of the UDR 2032 if the query references those users, groups of users, or classes of users.

Since the UDR 2032 is a centralized entity and shared across many network slices, SSF 2060 may cache and/or pre-fetch and store subscriber information that is stored in the UDR 2032. When a user, or group, becomes associated with the network slice, then SSF 2060 may fetch the user's, or group's, subscription information from the UDR 2032 and store it locally in the SSF instance 2060 so that future UDR 2032 queries may be avoided. The SSF 2060 may inform the UDR 2032 that it has cached information associated with the user or group so that the UDR 2032 may notify the SSF 2060 when and if the associated information is updated.

The subscriber data base may need to be accessed prior to the UE 2006 connecting to a slice, for example it may be accessed to perform Authentication and authorization procedures with the UE 2006. Thus, the UDR 2032 may have an interface to an AAA Server 2028.

The User Data Repository (UDR 2032) is a repository of subscriber data. Table 4 captures the information that may be included in a UE's UDR Subscription Profile. Alternatively, the same information could be associated with a group of UE's, an Application Server, or a group of Application Servers.

Since the UDR 2032 is deployed as a central function that is shared across all network functions and it is required to determine what slice a UE 2006 should initially connect to, the UDR 2032 may not be virtualized and may be considered to be part of the underlay network 2004.

TABLE 4

UE Subscription Fields

| Filed | Description |
|---|---|
| UE-ID | Unique Identifier e.g. IMSI which identifies each device |
| UE-T-ID | Temporary UE-ID, unique within a specific context (e.g. location, service) only, and assigned randomly by the network. The network maintains the mapping to the UE-ID to uniquely identify the subscription without revealing the persistent UE-ID. |
| UE-DEVICE-ID | IMEI identifies the equipment IMEISV includes software version Device category |

TABLE 4-continued

UE Subscription Fields

| Filed | Description |
|---|---|
| UE-DEVICE-TYPE | The UE-DEVICE-TYPE identifies the type of device or device capabilities. |
| UE-SISF-ID | Unique ID (FQDN or IP Address) for the SISF 2024 currently serving this UE 2006 or the ID of the last SISF 2024 serving this UE. The ID might be allocated to a pool of SISF 2024, and the SISF instance selection occur together with the Slice Instance Assignment |
| UE-SLICE-DESCRIPTOR | A UE's subscription information may include multiple UE-SLICE-DESCRIPTORS that indicate the types of slices that will be used by this UE. |
| UE-SERVICE-DESCRIPTORS | One or more Service Descriptors may be associated with a UE. The service descriptors describe the type of services that the UE 2006 expects to access. If these services are provided by $3^{rd}$ parties, then this is indicated in the service descriptor. The service descriptor may also indicate a $3^{rd}$ party who should be charged for the service or asked to sponsor the service. |
| GROUP-ID | One or more group identifiers for group communications |

UDR Generate Temporary ID Procedure

The UDR 2032 may accept a request to generate a temporary ID for a UE. The request may indicate what type of service the UE 2006 will desire to use when providing the temporary ID, the location where the UE 2006 is expected to be when the temporary ID is used, a party that is to be charged when the temporary id is used, etc.

UE-DEVICE-TYPE

The UE-DEVICE-TYPE identifies the type of device or device capabilities. For example, it may indicate that it is a PS-only device, a Control-Plane only device, a Small Data Device, an emergency/first-responder device, etc.

A control-plane only device is a device that only maintains a control plane connection to a network, or network slice.

A PS-only device is a device that only accesses PS services and does not access CS services.

A Small Data device is a device that only accesses the network, or network slice for sending small data packets. There may be different types of small data devices (i.e. non-IP small data, SMS, etc.).

An emergency/first-responder device type indicates that the device is being used for critical communications and should be given priority during times of network congestion or partial network outages.

A low-mobility device type may indicate that the UE 2006 is not likely to be mobile or will only move infrequently. Additionally information may be provided such as a stationary indication or a maximum velocity, etc.

The UE-DEVICE-TYPE may be permanent subscription data in the subscriber data base.

The UE-DEVICE-TYPE may be temporary subscription data in the subscriber data base. When the UE-DEVICE-TYPE is temporary subscriber data, it may be provided by the UE 2006 when new services are accessed or when establishing an initial connection.

The UE-DEVICE-TYPE may consist of several identifiers so that a device can be simultaneously considered to be multiple types. For example, a radiation detector could be both low-mobility and an emergency device.

A Device Type may indicate times when the UE 2006 is allowed, or not allowed, to access the network.

A Device Type may indicate the locations where the UE 2006 is allowed, or not allowed, to access the network. Since Device Type describes the UE's capability to use Core Network features, it could be called UE 5G Core Network (5GCN) Capability

UE-SLICE-DESCRIPTOR

A UE-SLICE-DESCRIPTOR fully describes one or more types of slices. It may be considered a Slice Template or an identifier that is associated with a slice template. A UE's subscription information may include UE-SLICE-DESCRIPTOR's that indicate what types of slices the UE 2006 may connect to.

A UE-SLICE-DESCRIPTOR may include an indication that it is the UE's default, in which case the UE 2006 will by default connect to this type of slice.

A UE-SLICE-DESCRIPTOR may include an indication that it is required, in which case the UE 2006 is always required to connect to a slice of this type when connected to a network.

A UE-SLICE-DESCRIPTOR may include an indication that it is optional, in which case the UE 2006 may optionally request to connect to a slice of this type.

UE-SLICE-DESCRIPTOR's may be permanent subscription data or they may be temporary subscriber data. If it is temporary subscriber data, then UE-SLICE-DESCRIPTOR's may be provided by the UE 2006 during an initial connection procedure or when a desired service, or set of services, is requested.

UE-SERVICE-DESCRIPTOR

A UE-SERVICE-DESCRIPTOR describes one or more services that is desired by a UE. A UE's subscription information may include UE-SERVICE-DESCRIPTOR's that indicate what types of services the UE 2006 may access.

A UE-SERVICE-DESCRIPTOR may include an indication that it is the UE's default, in which case the UE 2006 will by default connect to this type of service(s).

A UE-SERVICE-DESCRIPTOR may include an indication that it is required, in which case the UE 2006 is always required to connect to a service(s) of this type when connected to a network.

A UE-SERVICE-DESCRIPTOR may include an indication that it is optional (or allowed), in which case the UE 2006 may optionally request to connect to a service(s) of this type.

UE-SERVICE-DESCRIPTOR's may be permanent subscription data or they may be temporary subscriber data. If it is temporary subscriber data, the then UE-SERVICE-DESCRIPTOR's may be provided by the UE 2006 during an initial connection procedure or when a desired service, or set of services, is requested.

The UE-SERVICE-DESCRIPTOR may include the UE capability profile and/or UE session profile. Some examples of the UE Capability profile are:

- A "Web Browsing" service descriptor that indicates that the UE 2006 expects to use web browsing applications and have access to certain upload and download speeds.
- A "SMS Messaging" service descriptor that indicates that the UE 2006 expects to use applications that send SMS messages. The service descriptor may indicate that the UE 2006 is allowed to send or receive X messages per unit of time.
- A "Video Streaming" service descriptor that would be used, e.g., by video streaming applications requiring relatively high data rates on a more or less continuous basis.
- A "Non-IP Data" service descriptor that would be used, e.g., by home automation appliances which do not require a full IP stack.
- An "Ultra Low Latency" Service descriptor for use by, e.g., an industrial automation application.
- A "Short Data Burst" service descriptor for use by, e.g. a smart meter which produce low frequency short data bursts.
- A "Critical Communications" service descriptor for use by mission critical applications, e.g., public safety or government use.
- 3rd party Provided Services (e.g. Notification Server, M2M Servers, etc.)
- Sponsors (e.g. third party services that will sponsor the service)
- A Service Descriptor may indicate times when the UE 2006 is allowed, or not allowed to access the service.
- A Service Descriptor may indicate the locations where the UE 2006 is allowed, or not allowed to access the service.

Policy Maintenance Function

The Policy Maintenance Function (PMF) 2050 is responsible for storing and allowing retrieval of policies that are applicable to the 5G Network as well as services provided by third parties. The PMF 2050 will be queried by various network functions in advance of taking enforcement actions. The PMF 2050 will be updated by the service provider in response to, e.g., changes in network policies or third party policies.

The PMF 2050 may be a centralized entity that exists in the underlay network 2004. Each Network Slice may have a NF that serves as a front end to the PMF 2050. The PMF Front End (PMF-FE) may be used by other NF's within the slice to retrieve policies. The PMF-FE may filter policies that are sent to other NF's within the slice. The filtering may be based on the configuration of the slice, capabilities of the slice, or the capabilities or permission level of the NF that is retrieving policies.

Alternatively, the PMF 2050 may not be centralized and instead deployed as a NF within each slice or shared across several slices. Each Network Slice may have a NF that serves as a PMF 2050. The PMF 2050 may be used by other NF's within the slice to retrieve policies. The PMF 2050 may filter policies that are sent to other NF's within the slice. The filtering may be based on the configuration of the slice, capabilities of the slice, or the capabilities or permission level of the NF that is retrieving policies.

The PMF 2050 may provide an interface that allows external entities to provision new services in the PMF 2050. This interface may be accessible via the IRF 2058 or via O&M methods.

Policy Enforcement Function

The Policy Enforcement Function (PEF) may be deployed as a standalone function or it may be distributed across several NF's. In other words, it might be considered an action that is taken by many different NF's. For example, in a distributed deployment, the PEF will be part of the Ingress and/or Egress Functions and will be responsible for enforcing QoS constraints on flows that enter/leave the Core Network. PEF may also be part of third party services such as parental controls which require filtering certain content as specified by the PMF 2050. The PEF could be part of the IRF 2058 and enforce polices related to what NF's, or services, are allowed to be accessed. As such, the distributed PEF function will periodically (or as triggered by certain events) query the PMF 2050 in order to obtain the current policies with respect to the services being provided.

AAA Function 2028.

The AAA function 2028 may be required during a UE's initial connection procedures. Thus, as shown in FIGS. 20A and 20B, it may not be virtualized and may be considered part of the underlay network 2004.

The AAA server 2028 may be used to obtain authentication and authorization information for a UE 2006. It may also be used as a secure interface for other entities (e.g. the RIF 2102) to obtain UE subscription information, obtain new temporary identifiers for the UE 2006, and update the UE's subscription information with new location and state information.

A UE 2006 can attempt to establish an initial connection via a RAT (small cell, access point, eNodeB, base station, etc.,) and utilize the AAA service 2028.

An AAA Server function 2028 may also be virtualized and be included as part of a network slice to provide similar functionality. In the 5G network architecture 2000, these types of functions are provided within the slice by the SSF 2060.

When a UE 2006 successfully authenticates with the AAA Server 2028, the AAA Server 2028 may include UE subscription information such as the information from Table 4, in a successful authentication response to the RIF 2102.

The AAA function 2028 may be integrated with the UDR function 2032.

RAT Interface Function (RIF) 2102

Figure 21:
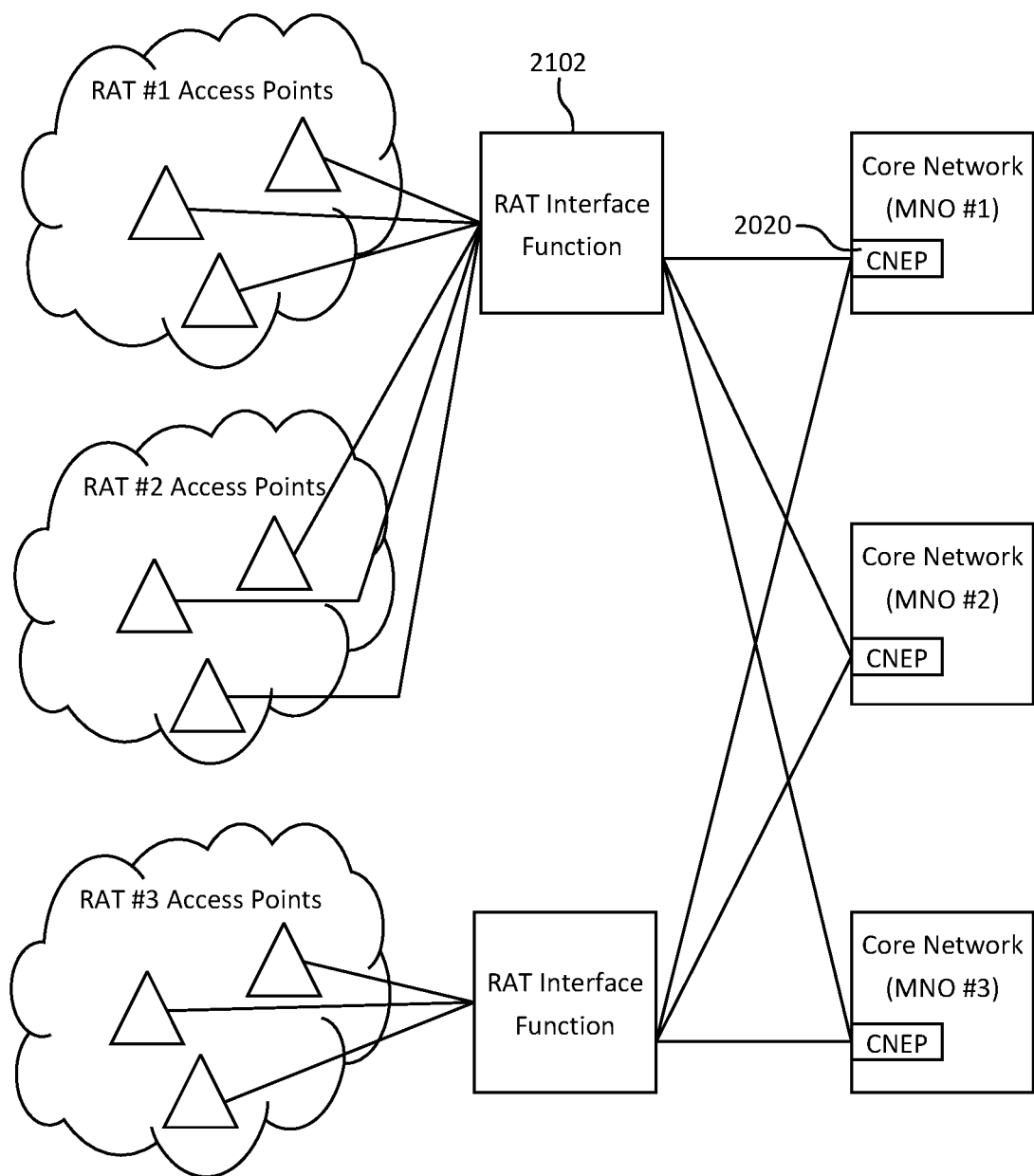
FIG. 21 is a diagram that illustrates the RAT Interface Function relative to the mobile core network and the networks that are associated with each RAT.

The Core Network exposes interface(s) that are agnostic to the RAT that are being used to access the core network. A RAT Interface Function (RIF) 2102 is used to interface between the Core Network and the RATs that are used to access the core network. FIG. 21 shows the placement of the RAT Interface Function 2102 relative to the mobile core network and the networks that are associated with each RAT. In this architecture the RIF 2102 is not considered a Core Network function, however, one can appreciate how it may be placed relatively close to the core network and be considered a core network function or may be integrated or co-located with a core network function such as the CNEP.

It is understood that the functionality illustrated in FIG. 21, may be implemented in the form of software (i.e., computer-executable instructions) stored in a memory of, and executing on a processor of, a wireless device or other apparatus (e.g., a server, gateway, device, or other computer system), such as one of those illustrated in FIGS. 36-37 described below. It is also understood that the functionality illustrated in FIG. 21 may implemented as a set of virtualized network functions. The network functions may not necessarily communicate directly, rather, they may communicate via forwarding or routing function.

RAT's can be generally classified into 3 categories:

3GPP Defined RATs.

3GPP Compatible RATs—3GPP Compatible RATs are RATs that are not defined by 3GPP but 3GPP has defined procedures to interwork these RATs with the 3GPP core network. In 4G, these RATs are called non-3GPP RATs; examples of Non-3GPP RATs are Wi-Fi and CDMA2000.

Foreign RATs—Foreign RATs are RATs that 3GPP has not defined interworking procedures for. However, customized, or implementation specific Radio Interface Modules may be designed to interwork these RATs with the Core Network.

Notice that a RIF 2102 can connect 1 or more networks to the core network and each network can be associated with a different or the same RAT. The RIF 2102 interfaces to the access points (i.e. base stations or eNodeB's) of each network.

The RIF 2102 will access the core network functions through the Core Network Entry Point (CNEP) 2010. The RIF 2102 will provide the RAN with any core network information that may be broadcast/advertised by the RAN, for instance to assist the UE 2006 in selecting a RAT and connecting to the Underlay Network.

The RIF 2102 supports the procedures listed in Table 5.

TABLE 5

RIF 2102 Procedures

| Procedure | Description |
|---|---|
| RAT Broadcast/ Advertisement | This procedure, between the RAT access points and RIF 2102, is used to broadcast the network capabilities. |
| Initial Connection Procedure | This procedure is executed between the RIF 2102 and a UE 2006 when the UE 2006 attempts to make an initial connection to a core network. |
| Obtain Authentication and Authorization Vectors | This procedure is executed between the RIF 2102 and an AAA server in the UE's Core network to obtain authentication and authorization vectors for a UE 2006 that is attempting to make an initial connection to a core network. |
| Authentication Challenge | This procedure is used between the RIF 2102 and a UE 2006 to authenticate the UE. |
| Check Authentication and Authorization Vectors | This procedure is executed between the RIF 2102 and an AAA server 2028 in the UE's Core network to check a UE's authentication response. |

RAT Broadcast/Advertisement

Prior to the Initial Connection procedure, the UE 2006 receives information that is broadcasted. The information in the broadcast is used by the UE 2006 to determine that the RAT can be used by the UE 2006 to establish a connection with a Core Network, or Network Slice(s), and to obtain desired services. The RIF 2102 will provide the underlying RAT with the information to be broadcast.

The following information may be included in the broadcast:

For each RIF 2102 that can be reached via the RAT:

RAT Interface Identifier: RIF ID (Unique Identifier which may be referenced by UE for connection)

Identity of network operators that are associated with the RIF 2102: PLMN ID or MNO ID Address of serving SISF: ID, IP Address, or FQDN of SISF Address of serving CNEP: ID, IP Address, or FQDN of CNEP Service ID's—Identifiers, or names, of services that can be reached via this RAT or RIF 2102. These service ID's may map to specific types of service profiles.

RAT Type (e.g. low mobility only, low data rate only, etc.)

Co-located RAT information (if any)

A single AP/Base station may broadcast information about multiple RIFs/RATs which can be requested by the UE. For example, an AP/Base station can broadcast multiple RIF identifiers and a separate set of the information listed above could be associated with each identifier.

A UE 2006 may provide a GUI or API that allows a user to enter any of the information above. The information would then be used as a criteria by the UE 2006 for deciding whether or not the UE 2006 should connect the RAN. Additionally, the Operating System may maintain a profile of installed applications and provide profile information that either directly maps to a required RAT Type or provides constraints on what RAT types are needed to satisfy the application requirements. The operating system may provide the profile to the modem for transmission to the underlay network. The modem may expose an API to allow this operating system to provide the profile to the modem.

Initial-Connection

The initial connection procedure is executed between the RIF 2102 and a UE 2006 when the UE 2006 is attempting to make an initial connection to a Core Network.

The Initial-Connection-Req message is sent by the UE 2006 to the RIF 2102. The request includes the following information:

UE-T-ID: A temporary identifier that the RIF 2102 can resolve to a HPLM-ID or MNO-ID. The format of this identifier may be a binary value such as a temporary IMSI or the format of this identifier can be a URI. An example URI may be alpha-numeric-string@network-operator-identifer.net. The portion of the identifier that identifies the network operator may include a Mobile Network Code (MNC) and a Mobile Country Code (MCC).

UE-AAA-SERVER-POC: The point of contact, identity, or address, of an AAA Server 2028 that can be used to authorize and authenticate the UE. If this value is not provided by the UE, the RAN may derive it from the UE-T-ID. For example the RIF 2102 may perform a DNS lookup on the UE-T-ID to get the point of contact or the RIF 2102 may recognize that the UE-T-ID is associated with a particular operator and have a pre-provisioned point of contact for that operator.

UE-DEVICE-TYPE (it may be part of the UE's subscription information as permanent subscription data or it may be provided by the UE. If provided by the UE 2006 it may be added to the UE's subscription data as temporary subscription data.)

UE-SISF-ID (it may be part of the UE's subscription information as permanent subscription data or it may be provided by the UE 2006. If provided by the UE 2006 it may be added to the UE's subscription data as temporary subscription data.)

UE-SLICE-DESCRIPTORS (it may be part of the UE's subscription information as permanent subscription data or it may be provided by the UE. If provided by the UE 2006 it may be added to the UE's subscription data as temporary subscription data.)

UE-SERVICE-DESCRIPTORS (it may be part of the UE's subscription information as permanent subscription data or it may be provided by the UE. If provided by the UE 2006 it may be added to the UE's subscription data as temporary subscription data)

HANDOVER-FLAG—This is an indication from the UE 2006 that the UE 2006 is already connected to a core network via another access point or another RIF 2102. When this indication is set by the UE, or provided by the UE, it is an indication that the RIF 2102 should authenticate and authorize the UE, obtain related subscription information from the UE 2006 from the SSIF, and maintain the UE's connection with the core network and network slices that it is currently connected to.

RIF-ID—This Identifier allows the UE 2006 to uniquely reference a specific RIF 2102 based on the broadcast information. This enables the UE 2006 to request initial connection to a particular RAT even though the broadcast information may have been provided via a different RAT.

The Initial-Connection-Resp message is sent by the RIF 2102 to the UE. The request includes the following information:

An indication of whether or not connection is permitted.
An indication of whether or not connection to all requested services or slices can be provided.
UE-T-ID-NEW—A new temporary identifier. If this identifier is provided, then previous UE-T-ID should be considered invalid.
UE-SERVICE-DESCRIPTORS (it may be part of the UE's subscription information as permanent subscription data or it may be provided by the UE. If provided by the UE 2006 it may be added to the UE's subscription data as temporary subscription data)

Obtain Authentication and Authorization Vectors from the Core Network

This procedure is used between the RIF 2102 and an AAA Server 2028 to obtain authentication and authorization information for a UE 2006 that is attempting to establish a connection to a core network. The AAA server 2028 resides in the core network that the UE 2006 is attempting to establish a connection with. The RIF 2102 uses the UE's UE-T-ID to determine how to contact an AAA Server 2028 in the HPLMN of the UE. For example a DNS lookup on the UE-T-ID may resolve to an AAA Server 2028 address, HPLMN, or CNEP 2020 address. Alternatively, the UE 2006 may have explicitly provided a network operator, HPLMN, CNEP, or AAA Server ID in the Initial-Connection-Req message. Instead of contacting an AAA Server 2028, the point of contact may be a subscriber data base such as an HSS, HLR, or UDR 2032.

The RIF 2102 sends an AA-Vector-Req message to an AAA server 2028. The message includes the UE-T-ID.

The AAA Server 2028 responds to the RIF 2102 with an AA-Vector-Resp message. A successful response is an indication to the RIF 2102 that the AAA Server 2028 recognizes that the UE 2006 that is associated with the UE-T-ID should be allowed to establish a connection to the RAT. This response may include the following information:

One or more challenge vectors that can be used to authenticate the UE. The AKA procedure may be similar to that defined in EPS but with potentially different key derivation as required for different entities and relationships. The AKA mechanism performs authentication and session key distribution in Universal Mobile Telecommunications System (UMTS) networks. AKA is a challenge-response based mechanism that uses symmetric cryptography. AKA is typically run in a subscriber module (e.g. USIM) which resides on a smart card like device that also provides tamper resistant storage of shared secrets.

One or more tokens may be used by the UE 2006 to perform Network Authentication.

UE Authentication

When a UE 2006 establishes a connection to a RIF 2102, the RIF 2102 authenticates the UE. When the UE 2006 moves from one RAT to another RAT or one AP/Base station to another AP/Base station, the UE 2006 does not need to necessarily re-authenticate if the RIF 2102 does not change.

During this authentication process the RIF 2102 will send a challenge message to the UE 2006 and check that the UE 2006 provides the expected response. If the expected response is provided, the UE 2006 is assumed to be authenticated. This section describes the challenge and response messages that are exchanged between the RIF 2102 and UE.

The RIF 2102 sends an Auth-Challenge-Req message to the UE. The authentication challenge message includes one or more of the challenge vectors that were provided by the AAA Server 2028. The message may also include the following information:

An indication that the temporary identifier is not recognized or that the temporary identifier is associated with a stolen device. This may cause the UE's platform to display a message such as "This Device's Identity is not recognized by the Network. Please contact your service provider to obtain an identity". The UE 2006 may further provide a GUI that allows the user to enter a new temporary identity and select a "Connect" option. Selecting the "Connect" option will cause the UE 2006 to attempt to connect to the network again and initiate a new Initial-Connection request.

The UE 2006 sends the Auth-Challenge-Resp message to the RAN. This challenge response is based on the challenge vector that was provided in the Auth-Challenge-Req message and the UE's private identity.

Check Authentication and Authorization Vectors with the Core Network

This procedure is used between the RIF 2102 and AAA Server 2028 to check a UE's authentication response. The RIF 2102 forwards the UE's response to the AAA server 2028 and the AAA Server 2028 responds with an indication if the response is correct and if the UE 2006 can be considered to be authenticated.

The RIF 2102 sends the AA-Challenge-Check-Req message to the AAA Server 2028. This message is used to forward the challenge response from the UE 2006 to the AAA Server 2028. This message may also include the following information.

- The challenge vector that was sent to the UE 2006 in the Auth-Challenge-Req.
- The UE-T-ID that is associated with the UE.

The AAA server uses the Challenge Vector, the UE-T-ID and the UE's challenge response to confirm that the response is proper and was provided by the UE 2006 that is associated with the UE-T-ID. The AAA Server 2028 responds with an AA-Challenge-Check-Resp message which includes an indication of whether or not authentication was successful. Since the UE 2006 has now been authenticated, the AAA Server 2028 may choose to send subscription information related to the UE 2006 to the RIF 2102. For example, the response may include the following information:

- The UE-T-ID and UE-T-ID-NEW. If authentication successful, then the AAA Server 2028 may provide a new UE-T-ID, UE-T-ID-NEW that should be assigned to the UE. The original UE-T-ID may now be considered invalid.
- UE-DEVICE-TYPE
- UE-SISF-ID
- UE-SLICE-DESCRIPTORS
    - UE-SERVICE-DESCRIPTORS
    - CONNECTION-REFERENCE-ID
    - CHARGING-REFERENCE-ID Slice Instance Selection Function (SISF)

The SISF 2024 has the following functionality:

1) Allocate slice instances to UEs, for example when a UE 2006 first connects to the core network, or when there is a UE Service profile change or a UE location, or perform addition/deletion/modification within a set of Network Slice instances assigned to UE(s);
2) Connect a UE 2006 to the selected network slice instance and notify the session management function to configure/set-up the needed NFs for the UE. This may be as a result of a new slice request from the UE 2006;
3) Change network slice instance allocations, based on inputs from the SIMF 2026;
4) Report network slice instance needs/usage to the Slice Instance Management Function (SIMF) 2026;
5) Monitor and respond to context changes (e.g. UE location changes);
6) Manage network initiated connection requests;
7) Configure the CNEP 2020 for routing traffic to the appropriate network slice instance.

A number of actions will trigger one or more of the above functionality. These are described in the sections below.

The SISF 2024 provides the Slice ID's that are assigned to a UE 2006 for a particular service or set of services. Since the SISF selects network slices, it could also be called the Network Slice Selection Function (NSSF). Since the SISF selects a network slice from a list, or repository, of network slices, it may also be called the Network Slice Repository Function (NSRF). The SISF 2024 may additionally provide a configuration for a Slice. For example, two UE's may access the same slice to obtain services. However, the slice may be configured in a different way for each UE. The configuration may refer to the specific NF's with the slice that process traffic from each UE 2006 and the order in which the NF's process traffic from each UE. Today, there is no distinction between a Network Slice and a Network Slice Instance. However, in this type of implementation, the distinction between a Network Slice and a Network Slice Instance may be that a Network Slice refers to a specific set of deployed NF's while a Network Slice Instance refers to a Specific Chaining, or ordering, of the NF's within the slice to provide a service.

Allocate Network Slice Instance Based on New UE 2006 Connecting to Underlay Network 2004

After authenticating and authorizing the UE, the RIF 2102 will query the SISF 2024 to determine what network slice instances the UE 2006 may connect to. The message that is used to query the SISF 2024 may be called SISF-Req. The query may be based on the following information:

- UE-SLICE-DESCRIPTORS—One or more Slice Descriptors may be associated with a UE. A slice descriptor may simply describe the requirements of a slice. A slice descriptor may also be called a Slice Template.
- UE-SERVICE-DESCRIPTORS—One or more Service Descriptors may be associated with a UE. The service descriptors describe the type of services that the UE 2006 expects to access.
- UE-DEVICE-TYPE—A device type may describe the general manner in which the UE 2006 will be used. For example, a MTC device type may imply that the UE 2006 only requires low data rates. A device type may indicate that that the UE 2006 is limited to accessing a certain number of or types of network slice instances. A device type may indicate that it is used for emergency services and should be assigned to slices that have a low probability of being disabled during an emergency.
- LOCATION-INFORMATION—The assigned slice(s) may depend on the UE's location. For example, UE's in a certain area (i.e. school) may be restricted from viewing certain content or certain content may be limited to UE's in a certain area (i.e. sports stadium or live event). The UE's location may also influence slice selection in the sense that the SISF 2024 may desire to assign a slice with computational resources that are geographically close to the UE 2006 to facilitate, for example, low latency Augmented Reality applications. The UE's location may be provided by the UE 2006 itself (i.e. in GPS format) or the location may be inferred by the identity of the radio station that the UE 2006 is connecting to. Thus, LOCATION-INFORMATION may be the identity of the RAT/RAN or Radio Station that the UE 2006 is connected to.
- UE-HPLMN-ID—The UE's home network identifier may be used to determine what slice(s) the UE 2006 should be told to connect to. For example, the SISF 2024 may assign different slices depending on the roaming agreements that it has in place with each operator.
- UE-ID—The UE-ID identifies the particular UE 2006 that is associated with the query.
- RAT-TYPE-INDICATOR—Indicates the type of RAT that the RIF 2102 is interfacing with. This may indicate the type of service provided by the RAT. For example, the RAT-TYPE-INDICATOR may indicate that the RIF 2102 interfaces with a low throughput, low mobility RAT which would be suitable for IoT applications but not for Enhanced Mobile Broadband. This will provide the SISF 2024 with additional information on which Slice Instances should be selected for UEs accessing the network via this RAT. If the RAT doesn't provide this indicator, the SISF 2024 can make the selection from all available Slice Instances rather than the subset that are optimized for specific RAT Types. The RAT-TYPE-INDICATOR should be consistent with the Rat Type.

3$^{Rd}$ Party Service Agreements—for example the UE's subscription information may already be configured with information that indicates that a 3rd party will sponsor its connection.

When the information above is provided to the SISF 2024 by the RAT through the RIF 2102, the RAT may have obtained certain fields from the UE 2006 itself, for example when the UE 2006 made its initial connection or authentication/authorization request. The RAT (or RIF 2102), may also have obtained certain fields from a subscriber data base, for example, the UE's home network operator may have provided the information to the RAT (or RIF 2102) once the UE 2006 was authenticated and authorized or the RAT (or RIF 2102) may have queried the UE's home network operator for the information after the UE 2006 was authenticated and authorized.

A SISF 2024 may be located in the RAT or it may be remotely located from the RAT but in the VPLMN (i.e. owned by the same owner of the RAT). The SISF 2024 may respond to the RAT's query with the information listed below or the SISF 2024 may respond to the RAT (or RIF 2102) with the identity of another, remotely located, SISF 2024 that should be queried instead. For example, the SISF 2024 may determine that, based on the UE's identity, an SISF 2024 in the UE's home network should be queried. In this type of scenario, the function in the RAT (or RIF 2102) may be an "SISF Resolution Function" and the SISF 2024 may be in the home network of the UE. Alternatively, the SISF in the RAT (or RIF 2102) could resolve the appropriate SISF function and serve as a proxy between the RAT and the appropriate SISF function. The SISF 2024 may also reside in the RAT Interface Function.

The SISF 2024 may be located in the UE's home network. The UE's identifier may be used by the RAN to locate the appropriate SISF. For example, the UE's identity may identify the UE's home network operator and the RAN (or RIF 2102) may use the home network identifier to look up an SISF address or a DNS query on the UE's identifier may resolve to an SISF identity. For non-3GPP RATs, the SISF 2024 will either be collocated with RAT Interface Function or will exist within the ULN 2004. For non-3GPP RATs, one way the SISF 2024 may present itself to the UE 2006 is as a DHCP server.

The response message from the SISF 2024 may be called SISF-Resp. The response may contain the following information:
A list of allocated network slice instance identities and associated slice descriptions. Each identity may include the following information:
NSI-ID: Network Slice Instance Identifier.
Communication Type supported by slice (e.g. SMS, IP, non-IP)
IPOC—Initial Point of Contact. This may be a DHCP server.
UE-SLICE-DESCRIPTOR-INDEX—The associated UE-SLICE-DESCRIPTOR or UE-SERVICE-DESCRIPTORS that were provided in the query message. Alternatively, this can be an index that is associated with the slice or service description from the query. For example, a value of 3 may indicate that this slice will fulfill the services or functionality that is required by the 3$^{rd}$ party service or slice that was described in the query.
A list of network slice descriptions or templates (referred to as SLICE_DESCRIPTOR). Each description, or template, may include the following information which may be used to dynamically instantiate the desired instances:
Services Provided: indication of type of service offered by the slice. For example critical communication, massive IoT, enhanced mobile broadband, etc.
Latency: this includes an indication of the latency associated with the slice. For example typical control plane latency for initial connection, handover, etc. and typical user-plane latency.
Value Added Services offered: A list of value added services offered by slice. For example parental controls, caching of user-plane content, etc.
Mobility support: indication of the type of mobility that the slice supports. Some slices may support limited to no mobility. For example, a UE 2006 associated with a slice that does not support mobility, will not be tracked by the core network.
UE-SLICE-AVAILIBILITY—The time (or list of times) when the slice is available to this UE. This may be used to indicate an initial connection time to the UE. It may also be used when multiple slices are assigned to the same UE 2006 to create automatic switching by the UE 2006 between slices The SISF 2024 may be considered a "Core Network Function" and therefore may not be virtualized. Since some function must select a slice for the UE 2006 to connect to before the connection procedure start, the SISF 2024 may need to be accessed prior to the UE 2006 connecting to a slice. Once a UE 2006 is connected to a slice, all slices that are associated with a UE 2006 may interface with the SISF. Network slices may interface to the SISF 2024 via SISF Front End (SISF-FE) NF.

The combination of SLICE_DESCRIPTOR and RAT-TYPE-INDICATOR will provide the SISF 2024 with the characteristics of the services that can be provided from RAT through network egress. The SISF 2024 may therefore determine that the service necessary for the User's Service profile cannot be satisfied with any Slice Instance and may therefore recommend that the User seek an alternative RAT. This recommendation may be signaled to the UE 2006 via OMA Device Management API and may trigger the UE 2006 to display a user interface message to the user indicating that they may want to add support for a different RAT to their subscription. The device management signaling may be carried over an alternate slice instance assigned to the UE, a default slice instance, or via the underlay network 2004.

Modify Allocated Network Slice Instance Assignments Based on UE Profile Change

If the UE 2006 changes its capability or session profile, the SISF 2024 is informed so that it may allocate new network slice instances to the UE. The RIF 2102 may send the SISF 2024 an SS_Profile_Change_Req. The query may include the following information:
UE-ID—The UE-ID identifies the particular UE 2006 that is associated with the query.
UE-SLICE-DESCRIPTORS—One or more Slice Descriptors may be associated with a UE. A slice descriptor may simply describe the requirements of a slice. A slice descriptor may also be called a Slice Template.
UE-SERVICE-DESCRIPTORS—One or more Service Descriptors may be associated with a UE. The service descriptors describe the type of services that the UE 2006 expects to access.

RAT-TYPE-INDICATOR—Indicates the type of RAT that the RIF 2102 is interfacing with.

In response to the profile change, the SISF 2024 may change the network slice instance allocated to the UE 2006 through an SS_Profile_Change_Resp which may include the parameters that were listed in the SISF-Resp message and the parameters listed below:

A list of allocated network slice instance identities and associated slice descriptions The SLICE_DESCRIPTOR for each of these network slice instance identities. This includes the network slice descriptions or templates. Each description, or template, may include the following information which may be used to dynamically instantiate the desired instances RAT-TYPE-INDICATOR—Indicates the type of RAT that the RIF 2102 is interfacing with.

Again, the SISF 2024 may determine that the service necessary for the User's Service profile cannot be satisfied with the any Slice Instance via the currently used RAT and may therefore recommend that the User seek an alternative RAT.

Connect UE 2006 to Network Slice Instance

A RIF 2102 may request that a SISF 2024 connect a UE 2006 to a network slice instance. This is achieved through an SS_Slice_Req which may include:

UE-ID—The UE-ID identifies the particular UE 2006 that is associated with the query.

NSI_ID—one of the slices provided by the SISF 2024 (for example after Initial connection or after a profile change)

UE-SERVICE-DESCRIPTORS—One or more Service Descriptors may be associated with a UE. The service descriptors describe the type of services that the UE 2006 expects to access. This could be a subset of the UE-SERVICE-DESCRIPTORS, and is used by the SISF 2024 as an indication of the connection that is triggering this request to connect to a slice. The UE 2006 may optionally not provide a UE-SERVICE-DESCRIPTORS, at which case the SISF 2024 may take this as an indication that the UE 2006 wants a basic default connection. Since this information assists the network in selecting a particular Network Slice Instance, UE-SERVICE-DESCRIPTORS could be called Network Slice Selection Assistance information (NSSAI).

CONNECTION_ID: identifier of connection that is associated with the query

RAT-TYPE-INDICATOR—Indicates the type of RAT that the RIF 2102 is interfacing with.

The SISF 2024 may query the SSF 2060 to verify that the UE 2006 has access to the slice, and may connect the UE 2006 to the requested slice, or it may alternatively connect the UE 2006 to an alternate slice. One reason the SISF 2024 may connect the UE 2006 to an alternate slice is an incompatibility between the RAT-TYPE-INDICATOR and the requested slice. The SISF 2024 issues a response to the UE (SS_Slice_Resp), which may include:

UE-ID—The UE-ID identifies the particular UE 2006 that is associated with the query.

NSI_ID—ID of network slice instance assigned to the UE.

CONNECTION_ID: identifier of connection that is associated with the query

Slice_Connect_Cause—reason for assigning the UE 2006 to this slice. This could be because of subscription, lack of resources on requested slice, etc.

Slice_Operating_Parameters—Any restrictions associated with the slice, for example this may include a schedule of when the connection should use the slice.

Connection_Parameters:—Core Network parameters which pertain to the connection. For example, IP address assigned to UE 2006 (if any), sleep parameters, SM parameters, or other slice related parameters such as the time when the Slice is available to the UE, the locations from which the UE 2006 may access the slice, the bandwidth and data rate restrictions that should be enforced when accessing the slice.

Autonomously Change UE Network Slice Instance

The SISF 2024 may autonomously decide to change the network slice instance to which the UE 2006 is connected, for example an existing slice may be deleted, a newly created slice by the SIMF 2026 may be better suited for a UE 2006 connection, etc. The SISF 2024 may send an SS_New_Slice message to the UE 2006 (via the RIF 2102), which may include:

UE-ID—The UE-ID identifies the particular UE 2006 that is associated with the query.

List of slices:

NSI_ID—ID of network slice instance where the UE 2006 has been connected

SLICE_DESCRIPTOR—description of a slice.

CONNECTION_ID: identifier of connection that is associated with the query. If included, this tells the UE 2006 to start a new PDU connection with the provided slice.

Slice_Operating_Parameters

Connection_Parameters

The reception of an SS_New_Slice_Ack acknowledges that the UE 2006 has accepted the request.

Change Network Slice Instance Configuration

The SISF 2024 may change the configuration of a network slice instance assigned to a UE. The SISF 2024 provides the NSI_ID of the network slice instance that is being changed as well as the information related to the new network slice instance. If the UE 2006 is already connected to the network slice instance that is being changed, the SISF 2024 may provide the Slice_Operating_Parameters and Connection_Parameters to the UE. If the UE 2006 is not already connected to the slice that is being changed, then the UE 2006 just updates its list of allocated slices (swapping out the old slice information for the new slice information). The SISF 2024 may use an SS_Change_Slice request message to change a slice. The message may include:

UE-ID—The UE-ID identifies the particular UE 2006 that is associated with the query.

List of changes to slices:

OLD_NSI_ID—ID of network slice instance that is being changed

NEW_NSI_ID—ID of network slice instance that is being added (if the NEW_NSI_ID is either NULL or associated with a slice instance that is already assigned to the UE, then the change network slice instance is effectively a delete network slice instance.)

SLICE_DESCRIPTOR—description of a slice

Slice_Operating_Parameters (if UE 2006 already connected to OLD_NSI_ID)

Connection_Parameters (if UE 2006 already connected to OLD_NSI_ID)

HARD/SOFT TRANSITION IND—indicates if the transition between slices should be performed with a "make before break" connection or not Services_per_slice—if more than one slice is allocated after transition, it indicates which services should be transferred to which slice.

Update the SIMF 2026 about Allocated Slices

The SISF 2024 may regularly provide status information to the SIMF 2026 to assist the SIMF 2026 in managing the network slice instances. The SISF 2024 updates the SIMF 2026 through a Slice_Usage_Update message. This message may include:
- UE-ID—The UE-ID identifies the particular UE 2006 that triggered the update.
- UE-SERVICE-DESCRIPTORS—One or more Service Descriptors may be associated with a UE. The service descriptors describe the type of services that the UE 2006 expects to access
- NSI_ID(s)—The ID(s) of the network slice instance(s) that is currently assigned to the UE.

Manage Change in UE Location

When a UE 2006 changes its location, it may trigger the SISF 2024 to modify the slice instances allocated to the UE, or to change the slice instance to which the UE 2006 is connected. The SISF 2024 is notified from the Mobility Management function, or any similar function that maintains the UE location information. The SISF 2024 may be notified through an SS_Location_Change_Req message, which provides the SISF 2024 with:
- UE-ID—The UE-ID identifies the particular UE 2006 that triggered the update.
- LOCATION-INFORMATION—The UE location (e.g GPS format).
- MOBILITY_STATUS—the UE 2006 may provide an indication of its associated mobility (low-mobility, stationary, fast-moving, etc.). For instance some slice instances may be targeted to low-mobility UEs. The UE 2006 may have this information pre-configured or it may determine this dynamically based on GPS, base station changes, etc.

Manage New Connection Request from PMF 2050

When a network initiated connection is required to a UE, the PMF 2050 may trigger the SISF 2024 to assign a slice instance to the connection. The SISF 2024 may be notified through an SS_Connection_Req message, which provides the SISF 2024 with:
- UE-ID—The UE-ID identifies the particular UE 2006 that is targeted.
- UE-SERVICE-DESCRIPTORS—One or more Service Descriptors indicating the details of the connection request.
- REQUESTOR-ID—The Application Server or Network Function that initiated the request.

Configure CNEP 2020 for Routing

After connecting a UE 2006 to a slice, the SISF 2024 may provide the CNEP 2020 with the routing information for UEs connection. This allows the CNEP 2020 to route the connection to the appropriate network slice instance. The SISF 2024 may use a Connection_Config_Req message which may include:
- UE-ID—The UE-ID identifies the particular UE 2006 that triggered the request.
  - CONNECTION_ID: identifier of connection associated with the UE
  - NSI_ID—The ID of the network slice instance that is currently assigned to the UE. This may alternatively be an identifier to the CN Ingress function on the network slice instance.

Slice Instance Management Function (SIMF)

The SIMF 2026 is the point where the ULN 2004 interacts with might traditionally be considered the Virtualization layer, or the hypervisor. The SIMF 2026 is the ULN's interface for requesting that network slices be added, modified, or deleted.

Add/Delete/Modify Slice Instances

The SIMF 2026 is responsible for managing network slice instances. The SIMF 2026 may make its decisions based on Management and Network Orchestration (MANO) functionality which:
- Regularly obtains status information from the slice instances themselves (e.g. usage, load, delay, etc.).
- Obtains status information from the SISF 2024 regarding new UEs that are requesting connections or whose profile has changed.

In addition, the SIMF 2026 may also be directed to configure network slice instances through a Graphical User Interface (GUI) which allows operators to create new slices, or modify/delete existing slice instances. If there is any change in a slice instance (existing slice instances are deleted or modified, or if a new slice instance is created) the SIMF 2026 should notify the SISF, so that it may consider these updates during the slice instance selection. The SIMF 2026 notifies the SISF 2024 through the New_Slice_Req, Modify_Slice_Req, and Delete_Slice_Req messages. Some of the contents of these messages are described below:
- New_Slice_Req
  - NSI_ID—ID of network slice instance that is being added
  - SLICE_DESCRIPTOR—description of a slice
- Modify_Slice_Req:
  - NSI_ID—ID of network slice instance that is being added
  - SLICE_DESCRIPTOR—description of a slice
- Delete_Slice_Req
  - NSI_ID—ID of network slice instance that is being added The New Slice, Modify Slice, and Delete slice request may be initiated by administrative, or O&M, means. For example, suppose an operator signs a commercial agreement with a large Smart Grid operator that will come into effect 1 month from the signing. The operator may want to pre-reserve a certain amount of network capacity (i.e. a large number of slice instances) before the SISF 2024 is triggered for that smart grid customer.

\Core Network Entry Point (CNEP) 2020

The CNEP 2020 may provide:
- Marking of packets so that they can flow to the correct network functions within the assigned slice instance. For example the CNEP may mark traffic from a particular UE 2006 so that it is sent to the correct slice. The marking may also be based information that was inserted by the UE 2006 to indicate the traffic or service type.
- Routing of packets to the correct network slice instance (i.e. the correct IRF), based on the configuration from the SISF. This may be based on UE_ID, CONNECTION_ID, or based on some other identifier.
- Routing of control-plane packets to the appropriate control plane network function in the ULN 2004
- Interworking between RIFs, which allows coordination between RATs and potential multi-RAT operation (where a UE connection is simultaneously split over 2 or more RATs).

Interconnection and Routing Function (IRF)

The functions of IRF 2058 include:

- Stores the binding between UE's identity and the interface layer identity (e.g. instance number) of each serving NF, which has active session for the UE 2006. For the NFs, which do not interface with the IRF 2058 directly, e.g. in roaming scenario, the IRF 2058 stores the identity of the remote-PLMN's IRF 2058 via which those NFs are reachable.
- Updates the binding repository when the identity of the serving NF changes for a given UE 2006, e.g. due to UE mobility, load re-balancing (i.e. scale-in or scale-out of virtual machines) or restoration reasons.
- Examines the message header to determine the identity of the UE 2006 (for which message is sent) and the destination NF. For UE's identity, looks up the internal binding repository to determine the interface layer identity (e.g. instance number) of the destination NF or the identity of the remote IRF 2058. Routes the message accordingly.
- Optionally performs authorization of the message based on the operator's configuration, e.g. if operator's configuration prohibits NF1 from invoking certain message (such as "change of UE's APN-AMBR") towards NF2 then the IRF 2058 rejects the corresponding message. Optionally protects NFs during the signaling storm by performing overload control, e.g. pacing of messages sent to a given NF based on its load/overload condition.

Mobile Originated Ingress Function

The Mobile Originated Ingress (MOI) Function is the point where the underlay network 2004 connects to a Network Slice for MO user plane communication. The CNEP 2020 accepts PDU's from the UE 2006 and determines what Network Slice to send the PDU to. The PDU is then sent to the MOI 2040 of the appropriate selected network slice. Upon reception of a PDU, the MOI 2040 may confirm that the PDU comes from a UE/Underlay network combination that is authorized to send PDU's to the Network Slice. The MOI 2040 may send a reject response to the CNEP 2020 if the PDU does not come from an authorized UE/Underlay Network combination. In order to minimize latency, the CNEP may reside in the RIF closer to the base station or access point.

Assuming that the PDU is authorized and properly formatted, MOI 2040 may wrap the PDU with a new header. The new header may include information about what NF's the PDU should be forwarded to.

For example, based on header information that the UE 2006 attached to the PDU, the MOI 2040 may determine that the PDU is an SMS message and attach information to indicate that the PDU should be routed to a particular NF that serves as an SMS-SC, IW-MSC, or an interface to a legacy IW-MSC or SMS-SC. If the MOI 2040 determines that the PDU is an SMS PDU that is destined for another operator's network, the MOI 2040 may attach information to indicate that the PDU should be routed to the other operator's network, specifically, the packet may be sent to the IRF-IWK 2030 in the underlay network 2004 so that the packet can then be forwarded to the IRF-IWK 2030 of the targeted network.

In another example, based on header information that the UE 2006 attached to the PDU, the MOI 2040 may determine that the PDU is an IP packet and attach information to indicate that the PDU should be sent to a particular NF that that serves as an IP anchor point. The MOI 2040 may detect based on header information that the IP anchor resides in another network slice or in another operator's network and then attach information to indicate that the PDU should be send to the IRF-IWK 2030 so that it can be forwarded to the appropriate destination network.

In another example, based on header information that the UE 2006 attached to the PDU, the MOI 2040 may determine that the PDU is an unstructured non-IP packet and attach that the PDU should be sent to a particular NF that can be used to forward the packet to the destination. The MOI 2040 may detect based on header information that the packet needs to be sent to a NF that resides in another network slice or in another operator's network and then attach information to indicate that the PDU should be send to the IRF-IWK 2030 so that it can be forwarded to the appropriate destination network.

The MOI 2040 may attach header information to the PDU to indicate what other network functions should process the PDU and in what order the NF's should process the data. For example, the header may be formatted similar to an NSH. The MOI 2040 may also add meta data to the header. The meta data may be used by the other NF's to help in processing the PDU. For example, the meta data may indicate that the packet has certain priority, came from a particular location, etc.

Mobile Originated Egress Function

The Mobile Originated Egress (MOE) function 2046 is the last NF to process a user plane packet before it leaves the network slice. The MOE 2046 removes header information, such as a NSH, that was used to route the packet through the slice and between NF's within the slice.

There may be multiple types of MOE's based on the PDU type. For example, an MOE 2046 may be specified for SMS PDU's and the MOE 2046 may send the PDU to an SMS-SC. In this example, the MOE 2046 may act as an IW-MSC on its interface to the SMS-SC. In another example, the MOE 2046 may process IP packets. The MOE 2046 may remove header information that is specific to processing within the slice and send an IP packet to an IP network. In another example, the MOE 2046 may detect that the packet is an unstructured non-IP packet and send the packet directly to a Server such as an M2M Server, Application Server, etc. The MOE 2046 may know the destination of the non-IP packet based on an identifier in the header of the PDU that was attached by the UE 2006, SM NF 2048, MOI, or another NF. The SM NF 2048, MOI 2040, or other NF may know that destination of the non-IP data based on information that was provided by the UE 2006 during session establishment or based on provisioned subscription information. The non-IP packet may be tunneled from the MOE 2046 to the destination Server.

Mobile Terminated Ingress Function

The Mobile Terminated Ingress (MTI) Function 2044 is the point where the network slice connects to a PDN or directly to a Server for user plane communication. The PDN (or Server) sends IP packets, SMS messages, or unstructured non-IP data to the MTI 2044.

When the PDU type is IP, the MTI 2044 may be the IP anchor point of the UE 2006. If the MTI 2044 is not considered part of the network slice, then the MTI 2044 will determine the appropriate network slice to send the data to based on the destination and source IP address and port number. The decision of what network slice to send the data to may also be based on information from a DPI engine that inspected the traffic and determined the type of application that is associated with the PDU.

When the PDU type is SMS, the MTI 2044 may serve as an SMS-GMSC that accepts SMS data from an SMS-SC.

The MTI 2044 may then forward the PDU to the appropriate destination slice or NF based on the destination MSISDN, Application Port ID, Data Coding Scheme, and Protocol Identifier SMS header fields.

When the PDU type is unstructured non-IP, the MTI 2044 may use information in the header to determine what NF or Network slice to forward the data to. The decision may also be based on the source address or identifier of the non-IP data. When the non-IP data is tunneled to the MTI 2044 (e.g. in an IP tunnel) the MTI 2044 will remove the header from the IP tunnel before forwarding the packet further into the network slice.

Based on information that was provisioned during session set up, the MTI 2044 may attach packet marking to the PDU before forwarding it into the network slice. The packet markings may indicate required QoS treatment (i.e. priority, latency requirements, etc.).

Mobile Terminated Egress Function 2042

The Mobile Terminated Egress (MTE) function 2042 is the last NF that process a user plane packet before it leaves the network slice and is sent to the underlay network 2004 for transmission to the UE 2006. The MTE 2042 removes header information, such as a NSH, that was used to route the packet through the slice and between NF's within the slice.

There may be multiple types of MTE's based on the PDU type. For example, an MTE 2042 be specified for SMS PDU's and an MTE 2042 specified for IP data and an MTE 2042 specified for unstructured non-IP data.

The MTE 2042 may attach a new header to the PDU so that the UE 2006 may determine how to process the PDU. For example, the MTE 2042 may add a header that includes a bearer identifier, tunnel identifier, traffic type identifier, destination application identifier, or SMS header so that the UE 2006 can route the PDU to appropriate application within the UE 2006. The MTE 2042 may have obtained this information during session set up from the SM NF 2048, from the UE 2006 itself, or from the subscription information.

Session Management (SM) Function

The Session Management function is responsible for managing a UE's PDU sessions, within a network slice instance. These sessions may be IP-based, non-IP based, as well as connectionless. The session management function has the following responsibility:

- Control/management of user plane traffic of the PDU sessions. This may involve preparing the PDU session "flow information" which provides an indication of the path that a packet of a particular PDU session should follow. For instance, the SM function 2048 may set up PDU forwarding rules and PDU screening rules associated to PDU sessions in various user-plane network functions. Alternatively the SM function 2048 may provide the flow information to the NF responsible for marking the user-plane packets (for example the CNEP 2020, the MO Ingress function, or the MT Ingress function)
- Assign IP address to UE 2006 (for IP based PDU session)
- Manage the separation or aggregation of a PDU session across multiple access network paths. For instance, a UE 2006 may simultaneously connect to a 3GPP RAT and a Wi-Fi RAT. The PDU session may be split across both access network connections. The SM function 2048 configures the separator/aggregator network function with the information needed to properly split/aggregate a PDU session. This may be through policies or rules. For example
    - Alternate transmission of PDU packets between access networks,
    - fair split of PDU session packet transmissions over the different access networks,
    - send the packet over the access network providing highest instantaneous transmission rate based on for example some channel quality indicator, etc.

Mobility Management (MM) Function

The Mobility Management function maintains the mobility context for all the UEs in the network. It is responsible for:

- Tracking the location of the UE 2006. For example as the UE 2006 moves from one access network base station to another, or from one RAT to another.
- Evaluating the UE mobility profile. For instance the MM function 2022 may determine if a UE 2006 is stationary, fast moving, portable, etc. It may also determine if the determined mobility profile corresponds with the profile stored in the UE subscription. If not, it can take proactive action. For instance, the MM function 2022 may notify the SISF 2024 to delete the UE 2006 from the assigned network slice instance. It should be appreciated that the MM function could be co-located, or integrated with another network function such as the RIF or CNEP.
- Providing mobility information to other network functions. This may be based on requests, for example, a NF may specifically query the MM 2022 to determine location of one or a group of UEs. Alternatively this may be based on a subscription model, whereby a network function subscribes to be notified when a UE 2006 changes its mobility context. Alternatively, the MM function 2022 may push the location information to certain NFs, either when a mobility event occurs or periodically. For example, the MM function 2022 may notify the SSF 2060 about a change in UE location, so that this can be updated in the subscription database.
- Providing UE paging to support mobile terminated communications 5G Network Procedures (Underlay Network Based)

The 5G Network Procedures that are described in this section relate to how the UE 2006 makes an initial connection to a RAT, Core Network, and Network Slice. They are all based on the assumption that the UE 2006 requires some control plane connection to functions in the RAN and/or Core Network that are not virtualized. We refer to these "always present"/"not virtualized" functions as the Underlay network 2004. The Underlay network 2004 is functionality that the UE 2006 uses to make an initial connection to a RAN, Core Network, and Network Slice. Table 6 summarizes the procedures that are described in this section.

TABLE 6

Network Procedures (Underlay Network Based)

| Network Procedure | Description |
| --- | --- |
| Broadcast | The RIF 2102 provides access points with information that should be broadcasted/advertised to UE's that may want to connect to the network. |
| Initial Connection Procedure | This procedure, establishes a connection from UE 2006 to a RAT, provides the RIF 2102 with a Temporary Identifier, begins a process where the UE 2006 is authorized and authenticated by a core network, and determines what network slice(s) the UE 2006 should connect to. |
| Assign New Slice Instance to a UE-ULN Based-UE Initiated | This procedure assigns a new slice instance to a UE 2006 and is initiated by the UE 2006. It is assumed that the UE 2006 received one or more Slice instance IDs before this procedure begins. The network may override the requested network slice instance and provide an alternative. The network may reject the request altogether.<br>The id that is provided in the new slice request could be a "reference id" that was provided in an earlier procedure (i.e. in an add new slice or change slice instance procedure). |
| Assign New Slice Instance to a UE-ULN Based-ULN Initiated | The network assigns a Slice Instance to a UE 2006 (that is not already assigned to it). |
| Profile Change-ULN Based-UE Initiated | The UE profile that is stored in the Network is updated based on a request from the UE 2006. The result of this procedure maybe that the UE 2006 is told "connect to this slice instance id". This procedure does not cover how to connect to the new instance. |
| Profile Change-ULN Based-ULN Initiated | The UE profile that is stored in the Network is updated. One example: If profile is in SIM card, OMA procedures download a new one. This may occur as a result of a Subscription change or policy change. |
| Change Slice Instance-ULN Based-ULN Initiated | This procedure results in changing the UE assignment of a network slice instance to a different slice instance. Change could be to a slice instance that the UE 2006 is already connected to (this would be the equivalent of a delete) or to a new slice. |

Initial Connection Procedure

In the Initial Connection procedure:

The UE 2006 establishes a connection to a RAT.

Provides the RIF 2102 with a Temporary Identifier (UE-T-ID) that the RIF 2102 resolves to an HPLMN Identifier.

The RIF 2102 uses the Temporary Identifier to contact the HPLM and begin a process where the UE 2006 is authorized and authenticated.

The RIF 2102 communicates with the SISF 2024 to determine what network slice(s) the UE 2006 should connect to.

The UE 2006 is told what slices to connect to.

After the initial connection procedure, the UE 2006 begins to connect to network slice(s). This process is described with respect to FIGS. 24 and 25. It should be appreciated that, since the initial connection procedure involves authorizing the UE to receive services from the network, an initial connection procedure may also be called a registration procedure.

Figure 23:
FIG. 23 is a diagram that illustrates a GUI Prompt for a new temporary identifier.

As a general principle, the UE 2006 should never provide its private subscription identifier to the RIF 2102. The UE 2006 should only provide a temporary identifier to the RIF 2102. A new temporary identifier will periodically be provided to the UE 2006 or the temporary identifier may be pre-provisioned for the case in which the UE 2006 is connecting to the network for the very first time. The UE 2006 may provide a GUI that allows the user to enter a temporary identifier that may be used by the UE 2006 the next time that it connects to the system. An example of a GUI that allows the user to configure its temporary identifier is shown in FIG. 23. The user may be provided a temporary identifier as part of activation of their account. Additionally, Device Management procedures may be used to push a new TID to the UE 2006.

Figure 22:
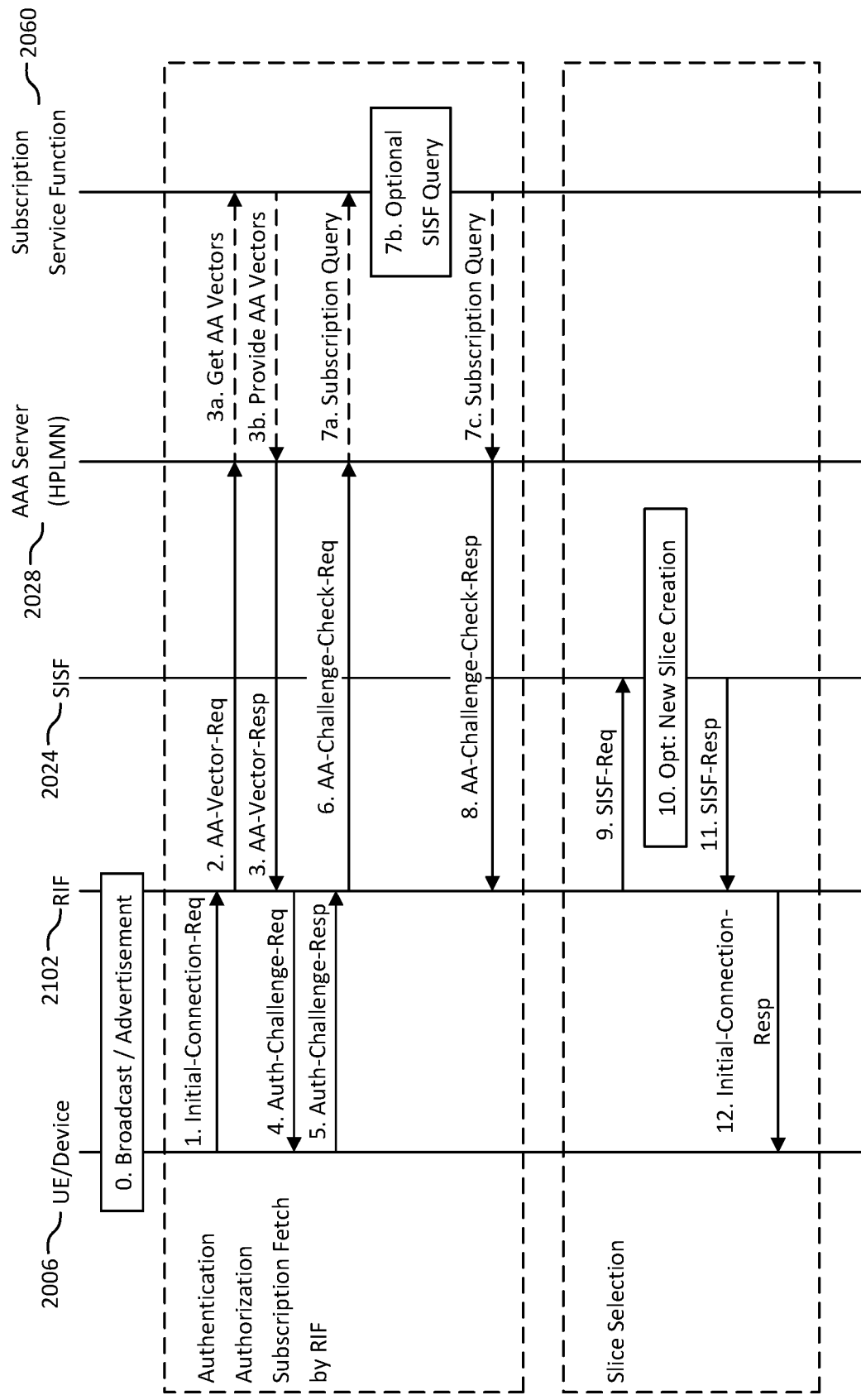
FIG. 22 is a diagram that illustrates an Initial Connection Procedure.

FIG. 22 is a diagram that illustrates an Initial Connection Procedure.

In step 0 of FIG. 22, the UE 2006 will be provisioned to check what networks are available. The UE 2006 will be provisioned to check if access points of certain RAT Types and certain frequencies are available. Upon detecting that acceptable RAT and Frequency combinations exists, the UE will listen to the information that is broadcasted by each of the associated access points and make a determination as to what RAT to connect to. Some access points may broadcast information that is associated with an access point of another RAT type. For example, a 5G cellular base station may broadcast information about a nearby non-3GPP (e.g. Wi-Fi) access point, its frequency of operation, its SSID, etc. As shown in FIG. 20A, the RIF 2102 may connect to one or more access points and provide it with information that should be broadcasted. The information that is broadcasted by the RIF 2102 and how the UE 2006 uses the information to determine to send a connection request to the RIF 2102 is described above. Alternatively, the access points could be provisioned with the broadcast information via O&M procedures.

In step 1 of FIG. 22, after determining, based on the observed broadcast information, that it wishes to connect to a particular access point, the UE 2006 sends an Initial-Connection-Req message to the RIF 2102.

In step 2 of FIG. 22, the RIF 2102 sends a AA-Vector-Req message to the AAA server 2028 in the UE's HPLMN. This message is used to obtain Authentication and Authorization (AA) AA Vectors for the UE 2006.

In step 3 of FIG. 22, the AAA Server 2028 sends a AA-Vector-Resp message to the RIF 2102. As shown in parts 3*a*) and 3*b*) of this step, the AAA server 2028 may obtain the AA vectors from the SSF 2060.

In step 4 of FIG. 22, the RIF 2102 sends an authentication challenge to the UE 2006.

In step 5 of FIG. 22, the UE 2006 sends the authentication challenge response to the RIF 2102.

In step 6 of FIG. 22, the RIF 2102 sends a request to the AAA Server 2028 to verify that the response provided by the UE 2006 is correct.

In step 7 of FIG. 22, optionally, if the AAA server 2028 does not have the subscription information or slice identifiers and since the AAA Server 2028 knows that the UE 2006 has now been authenticated and authorized, it may choose to obtain UE subscription information from a Subscriber Data Base (i.e. an HLR, HSS, or UDR 2032) so that it can be provided to the RIF 2102. As part of this query, the subscriber data base may obtain slice identifiers from SISF 2024 that can be used by the UE 2006. If slice identifiers are obtained in this step, then steps 10-12 may not be needed as the RIF 2102 may simply forward the slice identifiers to the UE 2006 as shown in step 12.

In step 8 of FIG. 22, the AAA server 2028 response to the RIF 2102 with an indication of whether not the UE's response was proper and if the UE 2006 can be considered authenticated. This response may also include subscribe data that was provide to the RIF 2102 in step 7.

In step 9 of FIG. 22, the RIF 2102 queries the SISF 2024 to determine what network slice(s) to assign to the UE 2006. In step 10 of FIG. 22, optionally, the SISF 2024 may trigger the creation of slice instance(s) by the SIMF 2026 that will meet the needs to the UE 2006. The SISF 2024 provides the RIF 2102 with slice ID(s) and may indicate the time(s) when the slice(s) will be available. The SISF 2024 may also query another NF, Application Server, or Server to see if it is willing to sponsor the UE's connection. The SISF's query may be based on an indication in the UE's request or subscription information that the flow will be sponsored.

In step 11 of FIG. 22, the SISF 2024 responds to the RIF 2102 with a list of network slice identifiers.

In step 12 of FIG. 22, the RIF 2102 responds to the UE's connection request with the Initial-Connection-Resp message. If the UE 2006 indicated that this is handover operation in the Initial-Connection-Req, then this message may indicate that the UE's existing slice connections have been maintained or this message may provide the UE 2006 with slice identifiers that the UE 2006 is already associated with. If this message includes slice identifiers, the UE 2006 should connect to, then the UE 2006 (or RIF/SISF) may subsequently initiate a slice connection procedure towards the identified slice(s).

It is understood that the entities performing the steps illustrated in FIG. 22 may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 22 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 22. It is also understood that the functionality illustrated in FIG. 22 may implemented as a set of virtualized network functions. The network functions may not necessarily communicate directly, rather, they may communicate via forwarding or routing function. It is also understood that any transmitting and receiving steps illustrated in FIG. 22 may be performed by communication circuitry of the apparatus under control of the processor of the apparatus and the computer-executable instructions (e.g., software) that it executes.

Assign New Slice Instance to a UE 2006 (ULN Based)

The Assign New Slice Instance to a UE procedure may be initiated when a UE's Service Profile or Location Changes.

The UE's Service Profile Change may have been initiated by the UE 2006. This may occur when a new app is installed, or launched for the first time.

The UE's Service Profile Change may have been initiated the Network. This may occur when there is a change of subscription data, a request to activate a service from an OTT service via the SCEF 2054, or an indication from a NF that a certain type of downlink or uplink traffic has been detected for the UE 2006.

The following sections describe the details of New Slice Assignment for the ULN based scenarios.

Assign New Slice Instance to a UE—UE Initiated

In the UE Initiated, ULN based Assign New Slice Instance to a UE procedure, it is assumed that the UE 2006 is already has information which may be resolved by the SISF 2024 to Network Slice Instance ID(s). This information may be a Service Profile, a slice FQDN, or some other slice identifier.

The UE 2006 will provide this information to the SISF 2024 via the RIF 2102, the SISF 2024 will resolve the information to a set of Network Slice Instance ID(s) that will be provided to the UE 2006 and subsequently used by the UE 2006 to connect the Network Slice(s). The Slice Instance ID(s) that are provided to the UE 2006 may be temporary identifiers that may only be used by the UE 2006 or a group of UE's to connect to particular slice; thus hiding the internal slice identifier from the UE 2006.

Following this procedure, the UE 2006 will have at least one New Network Slice assigned to it but the UE 2006 might not yet be connected to the slice(s). The UE 2006 may connect to the slice(s) as part of subsequent procedures. Alternatively, this procedure could also be used to initiate the slice connection process.

Figure 24:
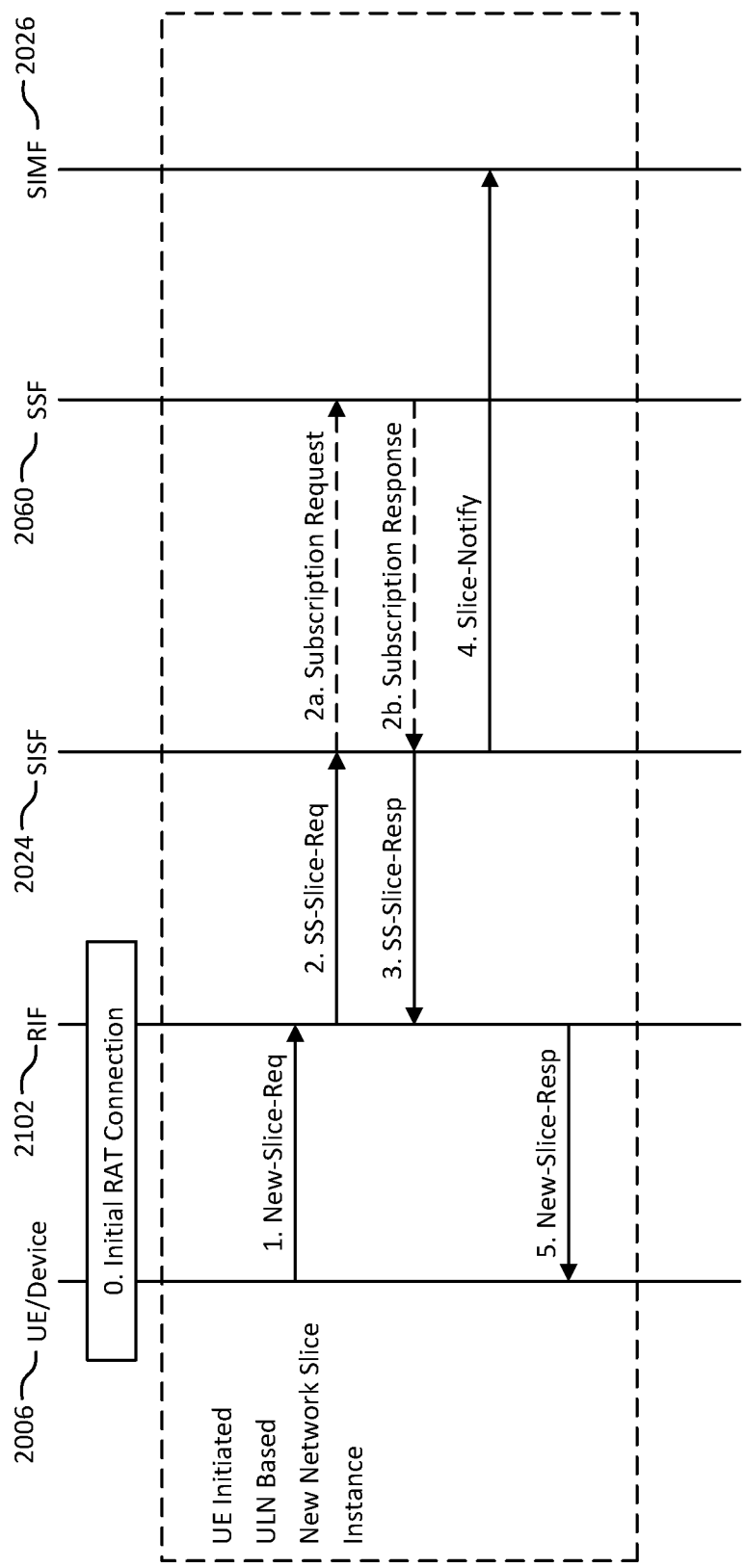
FIG. 24 is a diagram that illustrates a UE Initiated ULN Based New Slice Instance Assignment Call Flow.

FIG. 24 is a diagram that illustrates a UE Initiated ULN Based New Slice Instance Assignment Call Flow.

In step 0 of FIG. 24, it is assumed that the UE 2006 has already has information about what services it wishes to access. For example, it may have received a Service Profile in the Initial RAT Connection procedure (See FIG. 22), the user may have manually entered a new service profile to the UE 2006, or an application level event on the UE 2006 may have caused the UE's OS to modify the UE's service profile or create a new service profile. It may also have been provisioned with a Service Profile or received one from the network in the procedure of FIGS. 26 and 27.

In step 1 of FIG. 24, The UE 2006 sends a New-Slice-Req message to the RIF 2102. This message includes the list of services that the UE 2006 wishes to be assigned and may be identical to the SS-Slice-Req.

In step 2 of FIG. 24, The RIF 2102 sends the SISF 2024 a SS-Slice-Req message to request assignment of one or more Slice Instances to the UE 2006. The SISF 2024 may optionally forward the request to the Subscription Service Function which will respond indicating whether or not the requested Slice Instances are part of the user's subscription.

In step 3 of FIG. 24, The SISF 2024 responds to the RIF 2102 with a SS-Slice-Resp message which indicates the new Slice Instance(s) has been successfully assigned to the UE 2006, or that a different Slice instance is assigned to the UE 2006 (Network overrides the UEs requests). If the UEs request is made with a reference ID, the Network may override the UEs request without the UE 2006 becoming aware.

In step 4 of FIG. 24 the SISF 2024 will notify the Session Instance Management Function of the Network Slice Instance that the UE 2006 is being assigned to inform it that it now has an additional assignment by sending a Slice-Notify message which will contain, at the minimum, a UE identifier.

In step 5 of FIG. 24, The RIF 2102 confirms that the UE 2006 has been assigned to a network slice instance by sending a New-Slice-Resp message. In the case the assigned Network Slice Instance provides IP connectivity, the this step may be used to assign an IP address to the UE 2006 or direct the UE 2006 to a DHCP server through which the IP address assignment procedure may be completed (bypassing the usual broadcast query).

It is understood that the entities performing the steps illustrated in FIG. 24 may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 24 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 24. It is also understood that the functionality illustrated in FIG. 24 may implemented as a set of virtualized network functions. The network functions may not necessarily communicate directly, rather, they may communicate via forwarding or routing function. It is also understood that any transmitting and receiving steps illustrated in FIG. 24 may be performed by communication circuitry of the apparatus under control of the processor of the apparatus and the computer-executable instructions (e.g., software) that it executes.

Assign New Slice Instance to a UE—ULN Initiated

In the ULN based, ULN initiated Assign New Slice Instance to a UE procedure, a UE 2006 is provided a new slice instance as a result of actions in the ULN 2004. Example causes for this initiation could be a change to the User's profile, subscription, or online charging. In the case the network Slice Instance provides IP connectivity, the UE 2006 will have either been assigned an IP address or be directed to a DHCP server through which the IP address assignment procedure may be completed (bypassing the usual broadcast query), or may complete the normal DHCP IP assignment procedure.

Figure 25:
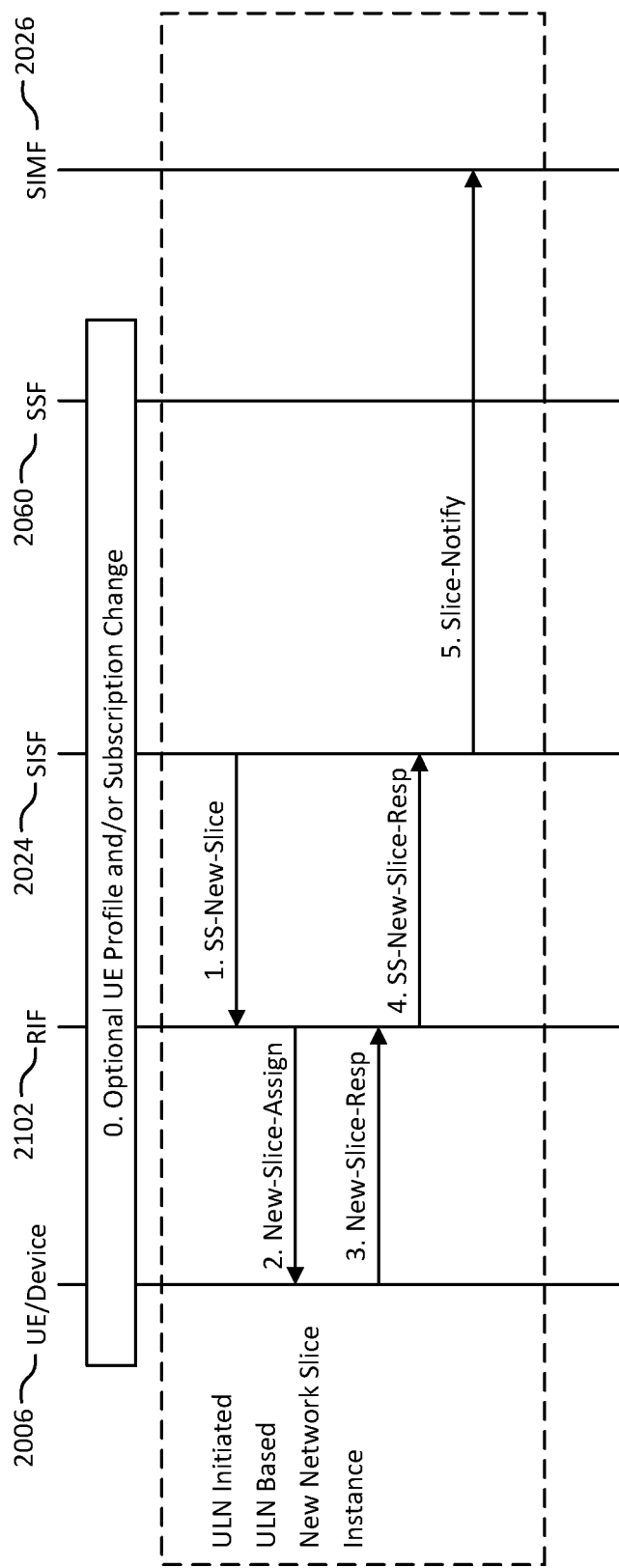
FIG. 25 is a diagram that illustrates a ULN Initiated ULN Based New Slice Instance Assignment Call Flow.

FIG. 25 is a diagram that illustrates a ULN Initiated ULN Based New Slice Instance Assignment Call Flow.

In step 0 of FIG. 25, the UE profile and/or subscription may optionally have changed prior to the ULN 2004 initiated New Slice Instance procedure. This procedure is described with respect to FIGS. 26 and 27.

In step 1 of FIG. 25, as a result of, e.g., a profile or subscription change, the SISF 2024 will send a SS-New-Slice message to the RIF 2102 which will include the Slice Instance ID to be assigned to the UE 2006.

In step 2 of FIG. 25, the RIF 2102 will send a New-Slice-Assign message to the UE 2006 which will include one or more Slice Instance IDs.

In step 3 of FIG. 25, the UE 2006 will respond to the RIF 2102 with a New-Slice-Resp message indicating that it is now confirms assignment to the new Slice Instance(s) provided to it in the New-Slice-Assign message.

In step 4 of FIG. 25, the RIF 2102 will send a SS-New-Slice-Resp message to the SISF 2024 confirming that the UE 2006 has been assigned to new Network Slice Instance(s).

In step 5 of FIG. 25, the SISF 2024 will notify the Session Management Function of the Network Slice Instance that the UE 2006 is being assigned to inform it that it now has an additional assignment by sending a Slice-Notify message which will contain, at the minimum, a UE identifier.

It is understood that the entities performing the steps illustrated in FIG. 25 may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 25 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 25. It is also understood that the functionality illustrated in FIG. 25 may implemented as a set of virtualized network functions. The network functions may not necessarily communicate directly, rather, they may communicate via forwarding or routing function. It is also understood that any transmitting and receiving steps illustrated in FIG. 25 may be performed by communication circuitry of the apparatus under control of the processor of the apparatus and the computer-executable instructions (e.g., software) that it executes.

Profile Change

The Service Profile stored in the Network (e.g. in the Subscription Service Function and/or in the SISF) may be updated for various reasons. The Profile Change may be initiated by the UE 2006, ULN 2004, or Network. The profile may have changed due to administrative actions or due to a UE location change. The Profile Change may be carried out over an existing IP connection (if one exists) or using the ULN 2004. The following sections describe the details of the Profile Change procedure for the ULN Based scenarios.

Profile Change—ULN Based—UE Initiated

In the UE Initiated, ULN based Profile Change procedure, the UE 2006 will request a change of profile in response to, e.g., a new application being installed or launched for the first time. At the completion of the Profile Change, the UE 2006 may be provided one or more Network Slice Instance IDs (or other identifier that may be uniquely resolvable to a Network Slice Instance ID by the network.)

Figure 26:
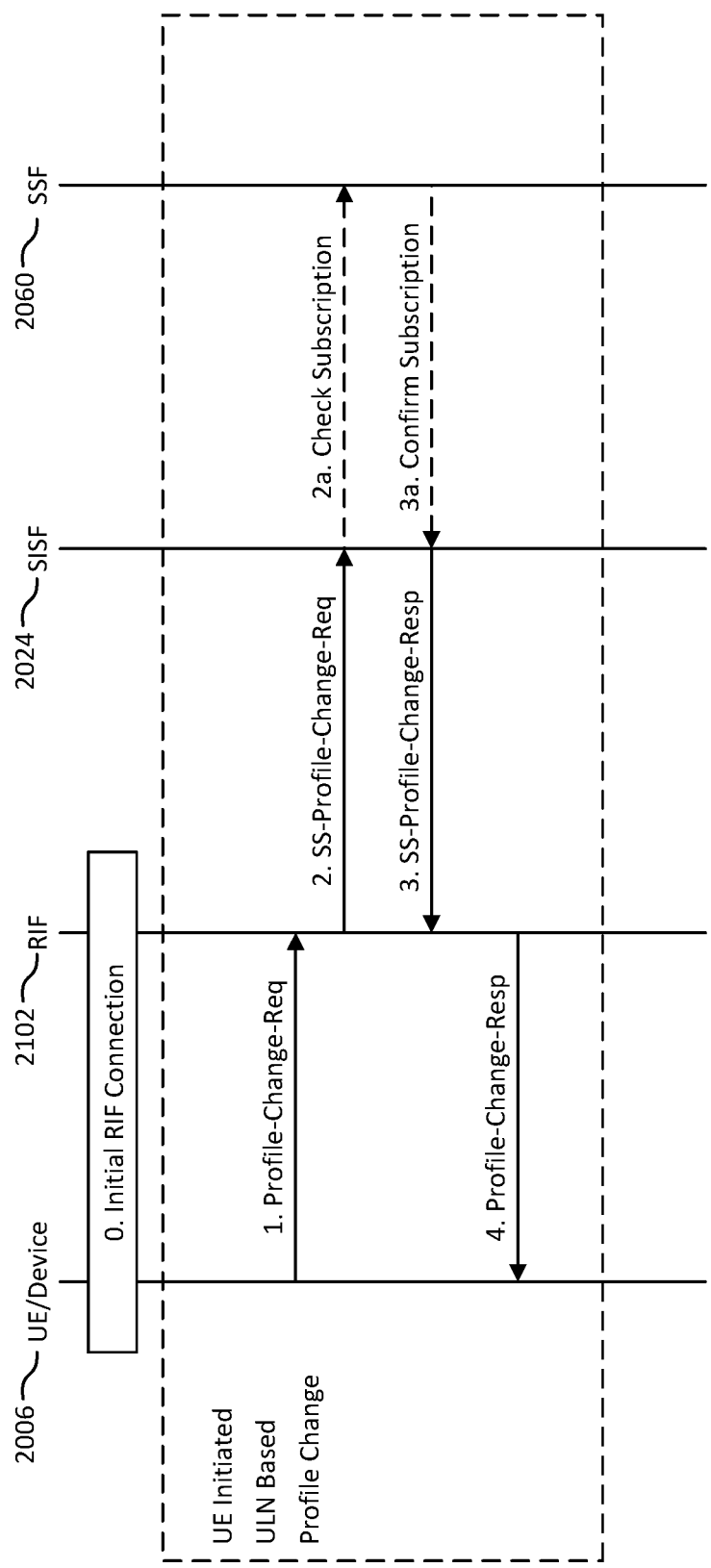
FIG. 26 is a diagram that illustrates a UE Initiated ULN Based Profile Change.

FIG. 26 is a diagram that illustrates a UE Initiated ULN Based Profile Change.

In step 0 of FIG. 26, prior to UE 2006 initiated profile change, the Initial RIF Connection procedure must have been completed (see FIG. 22) which provided it with connectivity with the ULN 2004.

In step 1 of FIG. 26, as a result of, e.g. installation of a new application or launching an application for the first time, the UE 2006 sends a Profile-Change-Req message to the RIF 2102. The Profile-Change-Req message will include, at a minimum, one or more UE-SERVICE-DESCRIPTORS which describe the type of services that the UE 2006 expects to access.

In step 2 of FIG. 26, the RIF 2102 will send a SS-Profile-Change-Req message to the SISF 2024 which may optionally forward the message to the Subscription Service Function. The SS-Profile-Change-Req message will include, at a minimum, one or more UE-SERVICE-DESCRIPTORS which describe the type of services that the UE 2006 expects to access.

In step 3 of FIG. 26, if the Subscription Service Function was sent the SS-Profile-Change-Req in Step 2, it may respond to the SISF 2024 confirming that the Profile Change is acceptable given the UEs subscriptions. Alternatively, the SISF 2024 may independently respond to the SS-Profile-Change-Req with a SS-Profile-Change-Resp message which will indicate a confirmation that the UEs profile has been updated. The SISF 2024 may optionally include one or more Network Slice IDs (or other identifiers that can be unique resolved by the network to a Network Slice ID) with the SS-Profile-Change-Resp message.

In step 4 of FIG. 26, the RIF 2102 will send a Profile-Change-Resp message to the UE 2006 indicating that the UEs profile change procedure has been completed by the ULN 2004. This message may be identical to the SS-Profile-Change-Resp message that was sent in the previous step.

It is understood that the entities performing the steps illustrated in Figure—may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 26 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 26. It is also understood that the functionality illustrated in FIG. 26 may implemented as a set of virtualized network functions. The network functions may not necessarily communicate directly, rather, they may communicate via forwarding or routing function. It is also understood that any transmitting and receiving steps illustrated in FIG. 26 may be performed by communication circuitry of the apparatus under control of the processor of the apparatus and the computer-executable instructions (e.g., software) that it executes.

Profile Change—ULN Based—ULN Initiated

In the ULN Initiated, ULN based Profile Change, the ULN 2004 will request a change of profile in response to, for example, a subscription change or OMA device management command. At the completion of the Profile Change, the UE 2006 may update its SIM card or OS configuration based on the new profile assigned by the network. Additionally, the UE 2006 may be provided one or more Network Slice Instance IDs (or other identifier that may be uniquely resolvable to a Network Slice Instance ID by the network.)

Figure 27:
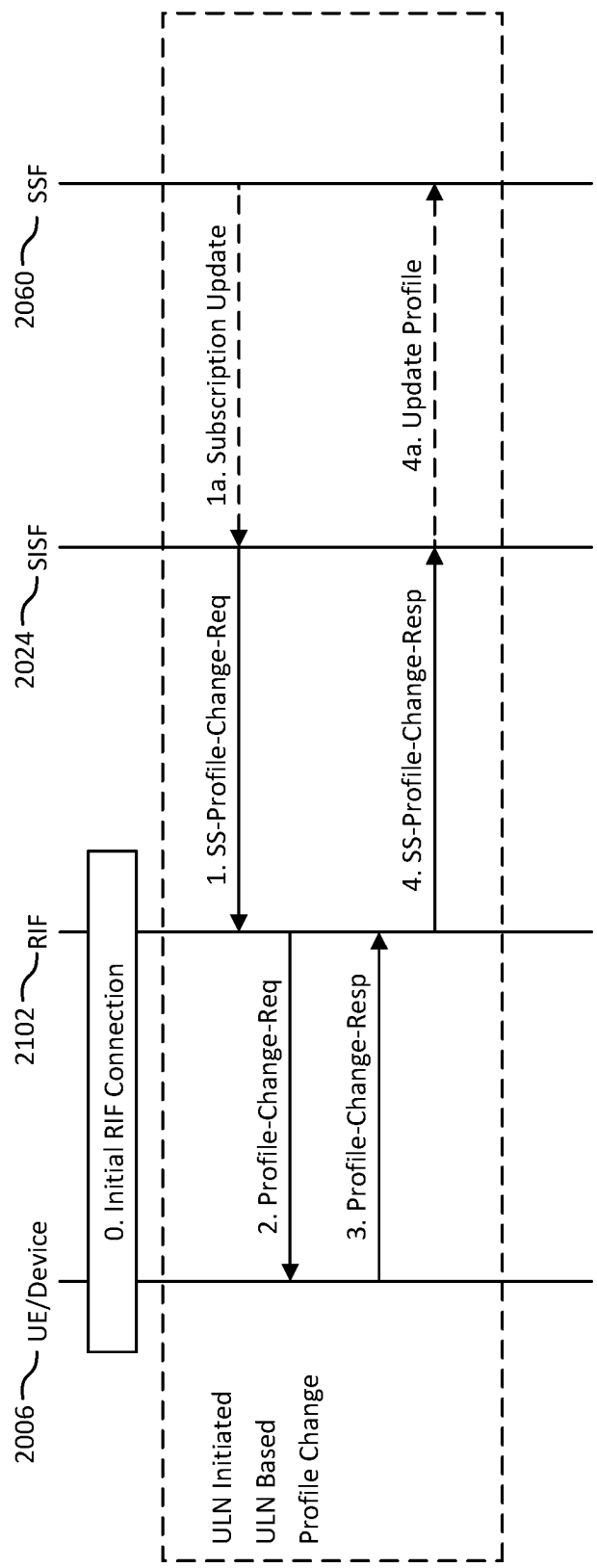
FIG. 27 is a diagram that illustrates ULN Initiated ULN Based Profile Change.

FIG. 27 is a diagram that illustrates ULN Initiated ULN Based Profile Change.

In step 0 of FIG. 27, prior to UE 2006 initiated profile change, the Initial RIF Connection procedure must have been completed (see FIG. 22) which provided it with connectivity with the ULN 2004.

In step 1 of FIG. 27, optionally, the Subscription Service Function sends a SS-Profile-Change-Req message to the SISF 2024 as a result of a change in user subscription or as a result of an OMA device management command. The Subscription Service Function sends a SS-Profile-Change-Req message to the SISF 2024 which forwards the SS-Profile-Change-Req message and may optionally include one or more Network Slice Instance IDs (or other identifiers that are uniquely resolvable to Network Slice Instance IDs) to the RIF 2102.

In step 2 of FIG. 27, the RIF 2102 will send a Profile-Change-Req message to the UE 2006. The Profile-Change-Req message will include, at a minimum, one or more UE-SERVICE-DESCRIPTORS which describe the type of services that the UE 2006 expects to access.

In step 3 of FIG. 27, the UE 2006 responds with a Profile-Change-Resp message indicating that it has updated its profile based on the Profile-Change-Req message in one or more of the SIM, OS configuration, or other device configuration memory.

In step 4 of FIG. 27, the UE 2006 responds with a Profile-Change-Resp message indicating that it has confirmed the update of its profile based on the Profile-Change-Req message. Optionally, the SISF 2024 may forward the Profile-Change-Resp to the Subscription Service Function.

It is understood that the entities performing the steps illustrated in FIG. 27 may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 27 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 27. It is also understood that the functionality illustrated in FIG. 27 may implemented as a set of virtualized network functions. The network functions may not necessarily communicate directly, rather, they may communicate via forwarding or routing function. It is also understood that any transmitting and receiving steps illustrated in FIG. 27 may be performed by communication circuitry of the apparatus under control of the processor of the apparatus and the computer-executable instructions (e.g., software) that it executes.

Change Slice Instance

The network may change the slice instance a UE 2006 is assigned to for various reasons such as, a change to the user's subscription, load balancing, etc. The slice instance change may be carried out over an existing IP connection (if one exists) or over the ULN 2004. The following sections describe the details of the Slice Instance Change procedure for the cases of ULN based update.

Change Slice Instance—ULN Based—ULN Initiated

When initiated by the ULN 2004 and carried out over the ULN 2004, the Change Slice Instance procedure will provide the UE 2006 with one or more Network Slice IDs (or other identifiers that are uniquely resolvable to Network Slice IDs.) Following this procedure, one or more of the UEs previously assigned Network Slice Instances will no longer be assigned but will be replaced by different Network Slice Instance(s).

Figure 28:
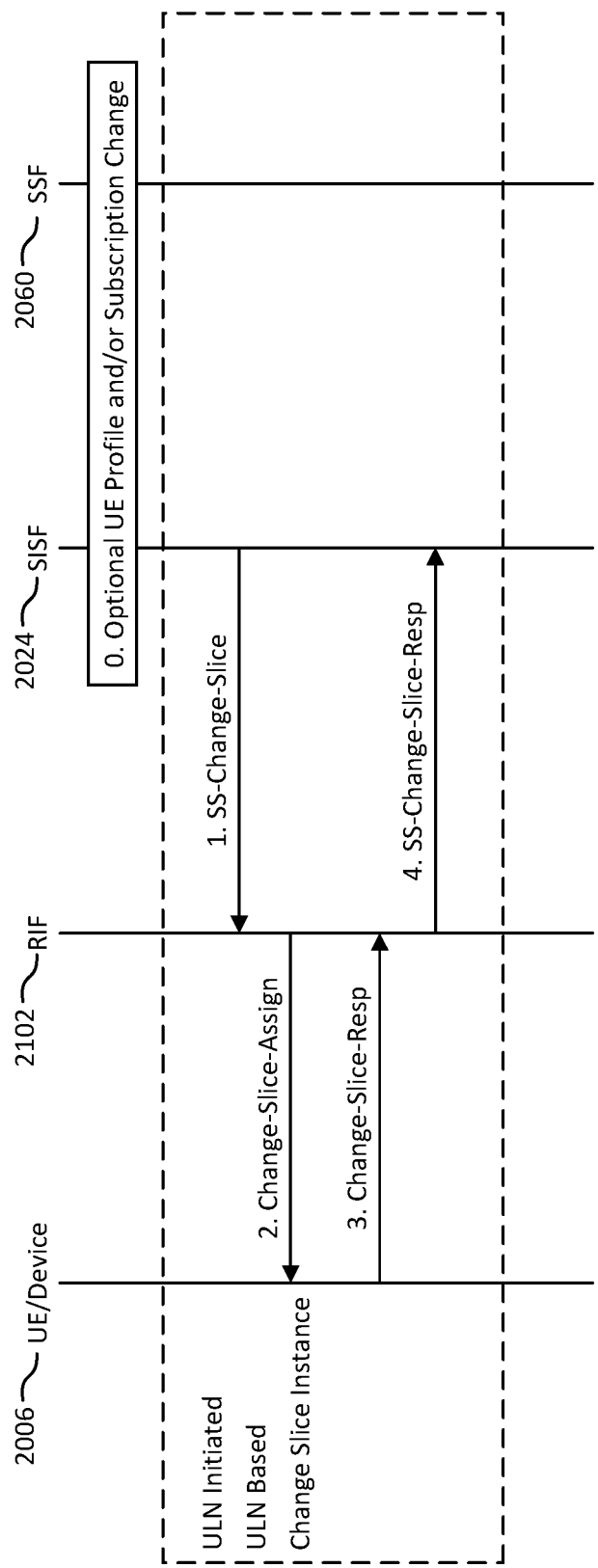
FIG. 28 is a diagram that illustrates a ULN Initiated ULN Based Profile Change.

FIG. 28 is a diagram that illustrates a ULN Initiated ULN Based Profile Change.

In step 0 of FIG. 28, optionally, the Subscription Service Function may notify the SISF 2024 of a change in user subscription that may impact one or more of the slices currently assigned to a user.

In step 1 of FIG. 28, the SISF 2024 will send an SS-Change-Slice message to the RIF 2102 based on updated subscription information or because of an OMA device management command, etc. The SS-Change-Slice message will include one or more Network Slice IDs that are currently allocated to the user as well as one or more Network Slice IDs that the UE 2006 should replace the current assignments with.

In step 2 of FIG. 28, the RIF 2102 will send the UE 2006 a Change-Slice-Assign message which will include, at least, the same information as was contained in the SS-Change-Slice message it received.

In step 3 of FIG. 28, the UE 2006 will respond with a Change-Slice-Resp message indicating that it confirms changing the Network Slice Instances based on the Change-Slice-Assign message it received.

In step 4 of FIG. 28, the RIF 2102 will forward the response from the UE 2006 in a SS-Change-Slice-Resp message. This message will contain at least the same information that was contained in the Change-Slice-Resp message from the UE 2006.

It is understood that the entities performing the steps illustrated in FIG. 28 may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 28 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 28. It is also understood that the functionality illustrated in FIG. 28 may implemented as a set of virtualized network functions. The network functions may not necessarily communicate directly, rather, they may communicate via forwarding or routing function. It is also understood that any transmitting and receiving steps illustrated in FIG. 28 may be performed by communication circuitry of the apparatus under control of the processor of the apparatus and the computer-executable instructions (e.g., software) that it executes.

5G Network Procedures (Alternative Approach)

The procedures in this section show an alternative approach to connect to a new network slice, change network slices, change profiles, etc.

The 5G Network Procedures that are described in this section assume that the UE 2006 has a default slice that it will connect to at the initial attachment/connection event, which may also provide an IP connection. The procedures include UEs Service profile updates and network slice instance assignments and updates, as summarized in Table 7. This section assumes the initial connection procedure (including broadcast), is performed as described with respect to FIG. 22.

TABLE 7

Network Procedures (Alternative Approach)

| Network Procedure | Description |
| --- | --- |
| Assign New Slice Instance to a UE UE-Initiated | The network assigns a Slice Instance to a UE 2006 (that is not already assigned to it) in response to a UE request. |

TABLE 7-continued

Network Procedures (Alternative Approach)

| Network Procedure | Description |
| --- | --- |
| | This procedure assigns a new slice instance to a UE 2006 and is initiated by the UE 2006. It is assumed that the UE 2006 received one or more Slice instance IDs before this procedure begins. The network may override the requested network slice instance and provide an alternative. The network may reject the request altogether. The id that is provided in the new slice request could be a "reference id" that was provided in an earlier procedure (i.e. in "add new slice" or "change slice instance" procedures). This procedure does not cover connection establishment to the new Slice Instance. |
| Assign New Slice Instance to a UE-Network Initiated | The network assigns a Slice Instance to a UE 2006 (that is not already assigned to it). This procedure does not cover connection establishment to the new Slice Instance. |
| Profile Change-UE Initiated | The UE profile that is stored in the Network is updated based on a request from the UE 2006. This procedure does not cover how to connect to the new instance. |
| Profile Change-Network Initiated | The UE profile that is stored in the Network is updated. |
| Change Slice Instance-Network Initiated | This procedure results in changing the UE 2006 assignment of a network slice instance to a different slice instance. Change could be to a slice instance that the UE 2006 is already connected to (this would be the equivalent of a delete) or to a new slice. |

Assign New Slice Instance to a UE 2006 (Alternative Approach)

The Assign New Slice Instance to a UE procedure may be initiated by the UE 2006 (e.g. a new app is installed, or launched for the first time) or the Network may initiate it for various reasons such as a change in user subscription. The following sections describe the details of New Slice Assignment for the various possible scenarios.

Assign New Slice Instance to a UE—UE Initiated (Alternative Approach)

A New Slice Instance (Alternative Approach) assignment procedure may be initiated by the UE 2006 to request one or more new Network Slices. It is assumed that the UE 2006 has already been provided Network Slice Instance IDs (or other identifiers which may be uniquely resolved by the SISF 2024 to Network Slice Instance IDs), such that following this procedure, the UE 2006 will have these new Network Slice(s) assigned to it.

Figure 29:
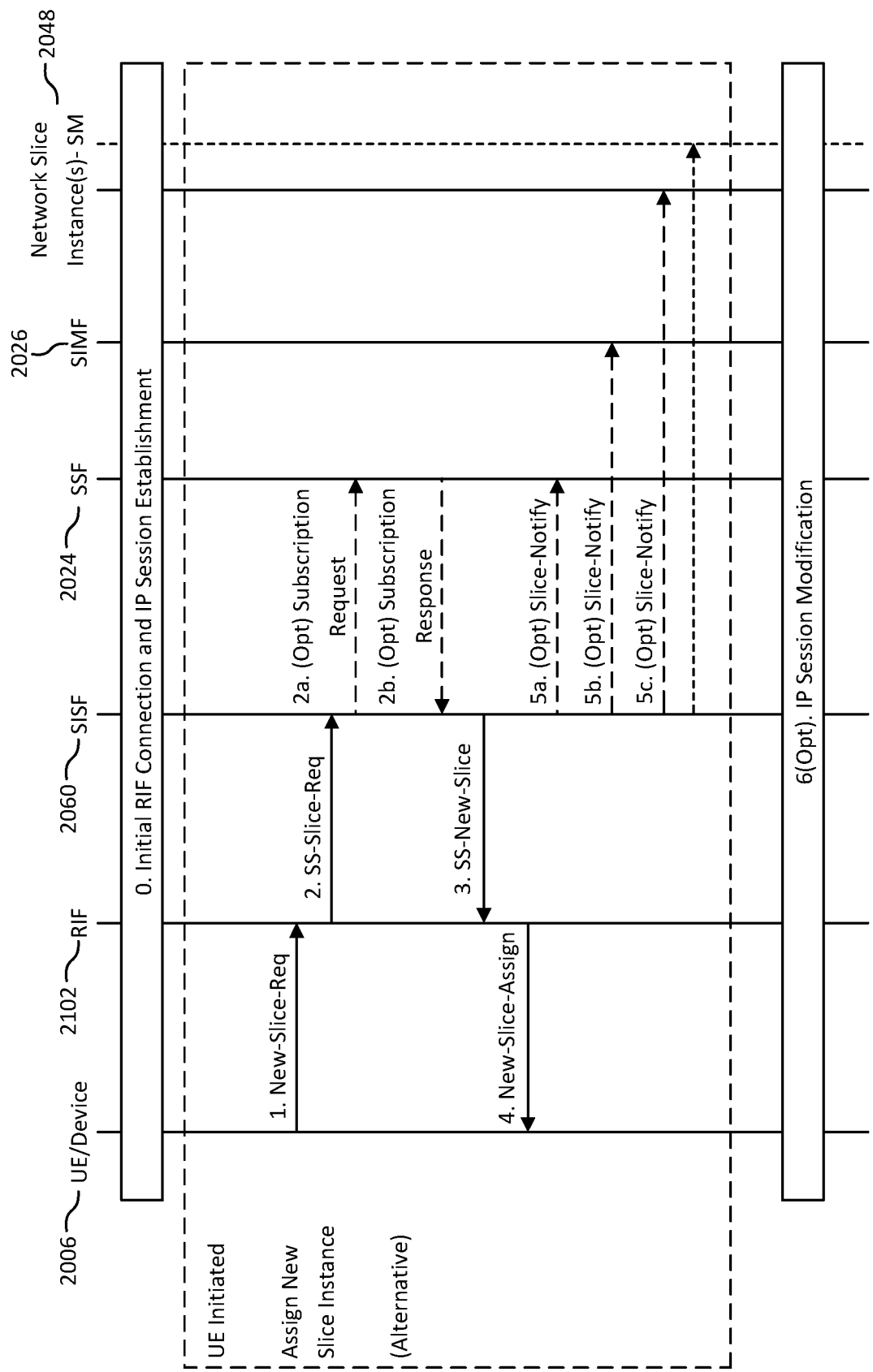
FIG. 29 is a diagram that illustrates a UE Initiated, New Slice Assignment (Alternative Approach).

FIG. 29 is a diagram that illustrates a UE Initiated, New Slice Assignment (Alternative Approach).

In step 0 of FIG. 29, prior to the Network initiated profile change, the Initial RIF Connection procedure must have been completed (see FIG. 22) which provided the UE 2006 with connectivity. An IP connection may have also been established.

In step 1 of FIG. 29, the UE 2006 sends a New-Slice-Req message to the RIF 2102. This message includes one or more Slice Instance IDs (or IDs which may be uniquely resolved by the SISF 2024 into Slice Instance IDs) that the UE 2006 wishes to connect to.

In step 2 of FIG. 29, the RIF 2102 sends the SISF 2024 a SS-Slice-Req message to request assignment of one or more Slice Instances to the UE 2006.

In step 2a and 2b, the SISF 2024 may check that the Profile change is acceptable given the UE subscriptions, therefore a Subscription Request/Response pair of messages may be exchanged with the Subscription Service Function.

In step 3 of FIG. 29, the SISF 2024 will send a SS-New-Slice message with the Network Slice IDs that the UE 2006 should use in addition to the current assignment. The list provided by SISF 2024 may be the same as the list requested by the UE 2006, a subset of it or one with different Slices assigned.

If the SISF 2024 requests that some functionality is transferred to the new slice, a list of transferred and/or allowed functions is provided, as well as information about connection establishment for the new slice. A HARD/SOFT-TRANSITION indicator is sent to indicate "make-before-break" transitions for the functions who might support it.

In step 4 of FIG. 29, the RIF 2102 will send the UE 2006 a New-Slice-Assign message which will include, at least, the same information as was contained in the SS-New-Slice message it received.

In step 5 of FIG. 29, the SISF 2024 may send a Slice-Notify message to the Subscription Service Function 2060 (SSF, 5a) and Slice Instance Management Function 2026 (SIMF, 5b) to indicate the updated Network Slice IDs assigned to the UE 2006. Other Slice-Notify indication messages may be sent to other Network Functions, including the Session Management (SM) functions 2048 in each of the network slices involved (5c).

In step 6 of FIG. 29, (Optional) the IP session may be modified based on the new Slice assignment.

It is understood that the entities performing the steps illustrated in FIG. 29 may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 29 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 29. It is also understood that the functionality illustrated in FIG. 29 may implemented as a set of virtualized network functions. The network functions may not necessarily communicate directly, rather, they may communicate via forwarding or routing function. It is also understood that any transmitting and receiving steps illustrated in FIG. 29 may be performed by communication circuitry of the apparatus under control of the processor of the apparatus and the computer-executable instructions (e.g., software) that it executes.

Assign New Slice Instance to a UE—Network Initiated (Alternative Approach)

A New Slice Instance Assignment (Alternative Approach) procedure is initiated by the Network and provides the UE 2006 with one or more new Network Slice IDs (or other identifiers that are uniquely resolvable to Network Slice IDs.) Following this procedure, the UE 2006 will have at least one New Network Slice assigned to it. Either the SISF 2024 or other Network functions may initiate the new Slice Assignment.

Figure 30:
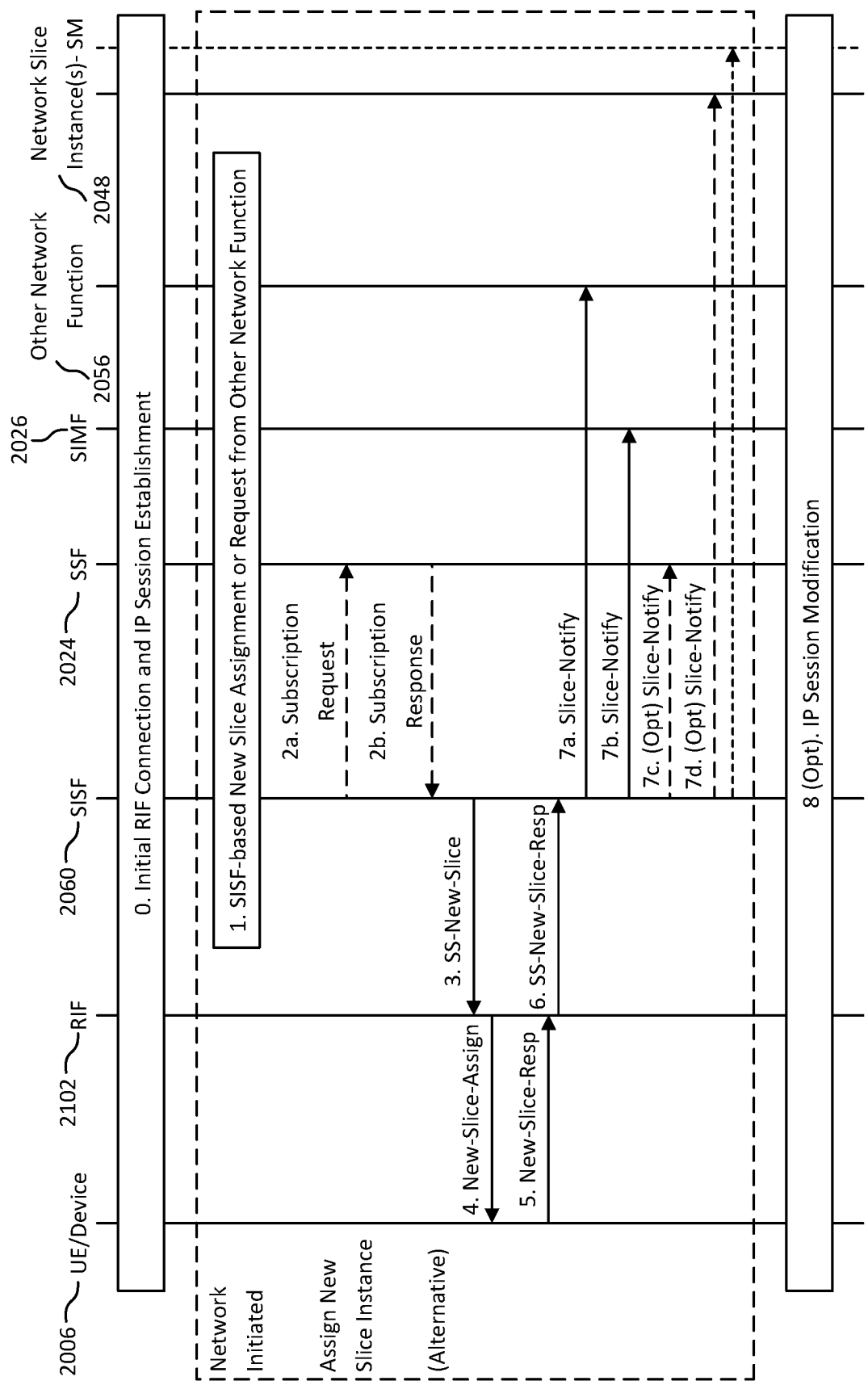
FIG. 30 is a diagram that illustrates a Network Initiated, New Slice Assignment (Alternative Approach).

FIG. 30 is a diagram that illustrates a Network Initiated, New Slice Assignment (Alternative Approach).

In step 0 of FIG. 30, prior to the Network initiated profile change, the Initial RIF Connection procedure must have been completed (see FIG. 22) which provided the UE 2006 with connectivity. An IP connection may have also been established.

In step 1 of FIG. 30, the SISF 2024 decides that a new Slice is required for one or more UEs based on internal processing or based on a specific request from another Network Function. This may include changes in a subscription.

In case the New Slice assignment is triggered by a Subscription change, this step may include a profile change procedure of FIGS. 24 and 25, or the full procedure below may be merged with the profile change procedure of FIGS. 24 and 25.

In step 2 of FIG. 30, if the New Slice assignment did not originate in the Subscription Service, SISF 2024 checks with the Subscription Service Function that the UE 2006 subscriptions are compatible with the new Slice.

In steps 2a and 2b of FIG. 30, a Subscription Request/Response pair of messages may be exchanged with the Subscription Service Function for this purpose.

In step 3 of FIG. 30, the SISF 2024 will send an SS-New-Slice message, including one or more Network Slice IDs that the UE 2006 should use in addition to the current assignment.

If the SISF 2024 requests that some functionality is transferred to the new slice, a list of transferred and/or allowed functions is provided, as well as information about connection establishment for the new slice. A HARD/SOFT-TRANSITION indicator is sent to indicate "make-before-break" transitions for the functions who might support it.

In step 4 of FIG. 30, the RIF 2102 will send the UE 2006 a New-Slice-Assign message which will include, at least, the same information as was contained in the SS-New-Slice message it received.

In step 5 of FIG. 30, the UE 2006 will respond with a New-Slice-Resp message indicating that it confirms the assignment of the new Network Slice Instance.

In step 6 of FIG. 30, the RIF 2102 will forward the response from the UE 2006 in a SS-New-Slice-Resp message. This message will contain at least the same information that was contained in the New-Slice-Resp message from the UE 2006.

In step 7 of FIG. 30, the SISF 2024 sends a New-Slice-Notify messages to indicate the completion of the slice assignment procedure.

In step 7a of FIG. 30, if the initiator was a Network function other than the SISF, the originator is notified of procedure completion.

In step 7b of FIG. 30, the Slice Instance Management Function (SIMF) is notified of the new Slice assignment In step 7c of FIG. 30, (Optional) the Subscription Service Function may also be notified of the new Slice assignment to indicate the updated Network Slice IDs assigned to the UE 2006.

In step 7d of FIG. 30, (Optional) other Slice-Notify indication messages may be sent to other Network Functions, including the Session Management (SM) functions in each of the network slices involved.

In step 8 of FIG. 30, (Optional) the IP session may be modified based on the new Slice assignment.

It is understood that the entities performing the steps illustrated in FIG. 30 may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 30 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 30. It is also understood that the functionality illustrated in FIG. 30 may implemented as a set of virtualized network functions. The network functions may not necessarily communicate directly, rather, they may communicate via forwarding or routing function. It is also understood that any transmitting and receiving steps illustrated in FIG. 30 may be performed by communication circuitry of the apparatus under control of the processor of the apparatus and the computer-executable instructions (e.g., software) that it executes.

Profile Change

The Service Profile stored in the Network (e.g. in the Subscription Service Function and/or in the SISF) may be updated for various reasons. The Profile Change may be initiated by the UE 2006 or the Network.

Profile Change—UE Initiated (Alternative Approach)

In the UE Initiated (Alternative Approach) Profile Change, the UE 2006 will request a change of profile in response to changing application requirements e.g. a browser starts being used for video streaming. The UE 2006 is assumed to have an IP connection through the Egress Function.

At the completion of the Profile Change, the existing session may be modified or the UE 2006 may be provided one or more new Network Slice Instance IDs.

Figure 31:
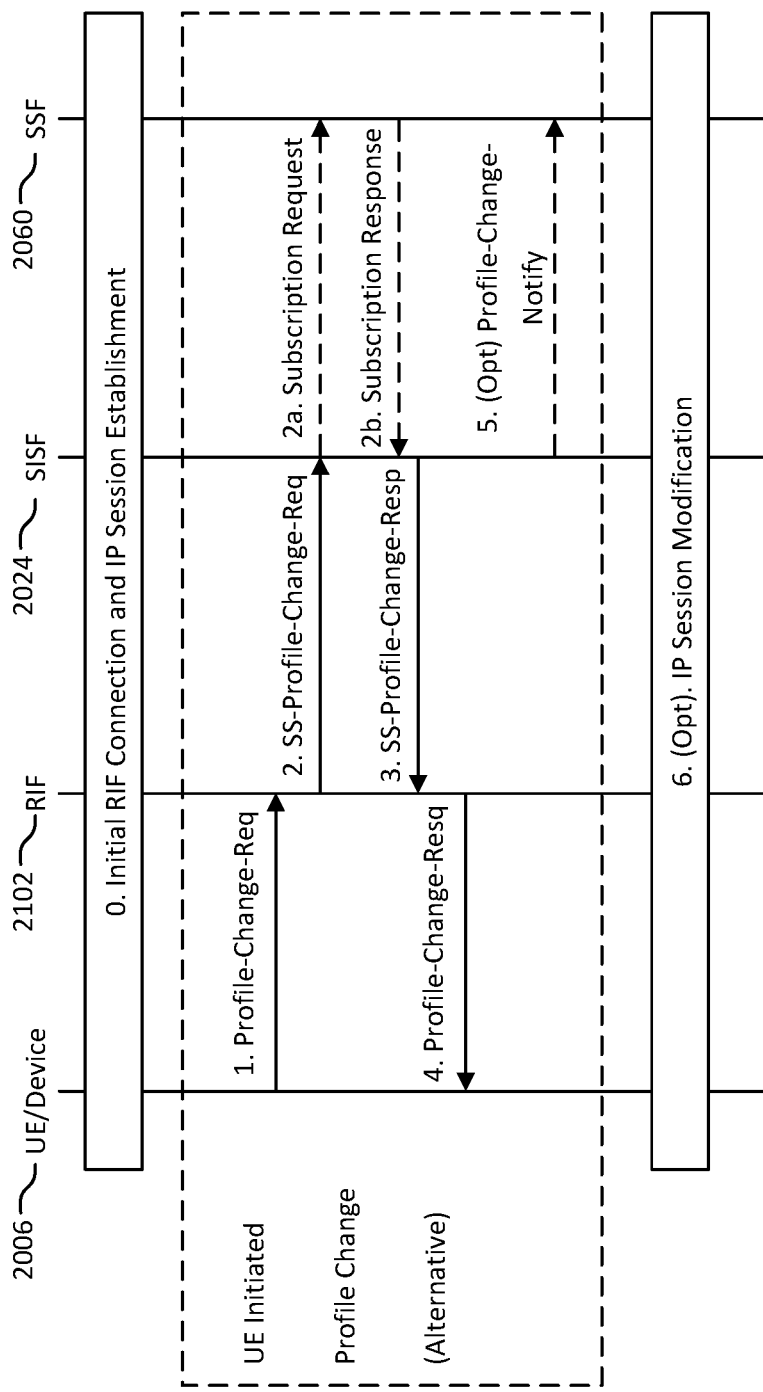
FIG. 31 is a diagram that illustrates a UE Initiated Profile Change (Alternative Approach).

FIG. 31 is a diagram that illustrates a UE Initiated Profile Change (Alternative Approach).

In step 0 of FIG. 31, prior to UE 2006 initiated profile change, the Initial RIF Connection procedure must have been completed (see FIG. 22) which provided it with connectivity with the ULN 2004. An IP connection may have also been established.

In step 1 of FIG. 31, when a service functionality changes (e.g. going from browsing to video streaming), the UE 2006 sends a Profile-Change-Req message to the RIF 2102. The Profile-Change-Req message will include, at a minimum, one or more UE-SERVICE-DESCRIPTORS which describe the type of services that the UE 2006 expects to access.

In step 2 of FIG. 31, the RIF 2102 will send a SS-Profile-Change-Req message to the SISF. The SS-Profile-Change-Req message will include, at a minimum, one or more UE-SERVICE-DESCRIPTORS which describe the type of services that the UE 2006 expects to access.

In steps 2a and 2b of FIG. 31, the SISF 2024 may check that the Profile change is acceptable given the UE subscriptions, therefore a Subscription Request/Response pair of messages may be exchanged with the Subscription Service Function.

In step 3 of FIG. 31, the SISF 2024 responds with the Profile-Change-Resp message to the RIF 2102 and may optionally include one or more Network Slice IDs (or other identifiers that can be unique resolved by the network to a Network Slice ID).

In step 4 of FIG. 31, the RIF 2102 will send the Profile-Change-Resp message to the UE 2006, including the information received from SISF.

In step 5 of FIG. 31, (Optional) the SISF 2024 will send a Profile-Change-Notify message to the Subscription Service Function (SSF) 2060, indicating that the UEs profile change procedure has been completed. Other Network functions may be similarly notified.

In step 6 of FIG. 31, (Optional) the IP session may be modified based on the UE Profile change.

It is understood that the entities performing the steps illustrated in FIG. 31 may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 31 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 31. It is also understood that the functionality illustrated in FIG. 31 may implemented as a set of virtualized network functions. The network functions may not necessarily communicate directly, rather, they may communicate via forwarding or routing function. It is also understood that any transmitting and receiving steps illustrated in FIG. 31 may be performed by communication circuitry of the apparatus under control of the processor of the apparatus and the computer-executable instructions (e.g., software) that it executes.

Profile Change—Network Initiated (Alternative Approach)

In the Network Initiated (Alternative Approach) Profile Change, request for change of profile is issued by a Network Function in response a subscription change or OMA device management command. The UE 2006 may have an IP connection.

At the completion of the Profile Change, the existing session may be modified or the UE 2006 may be provided one or more new Network Slice Instance IDs.

Figure 32:
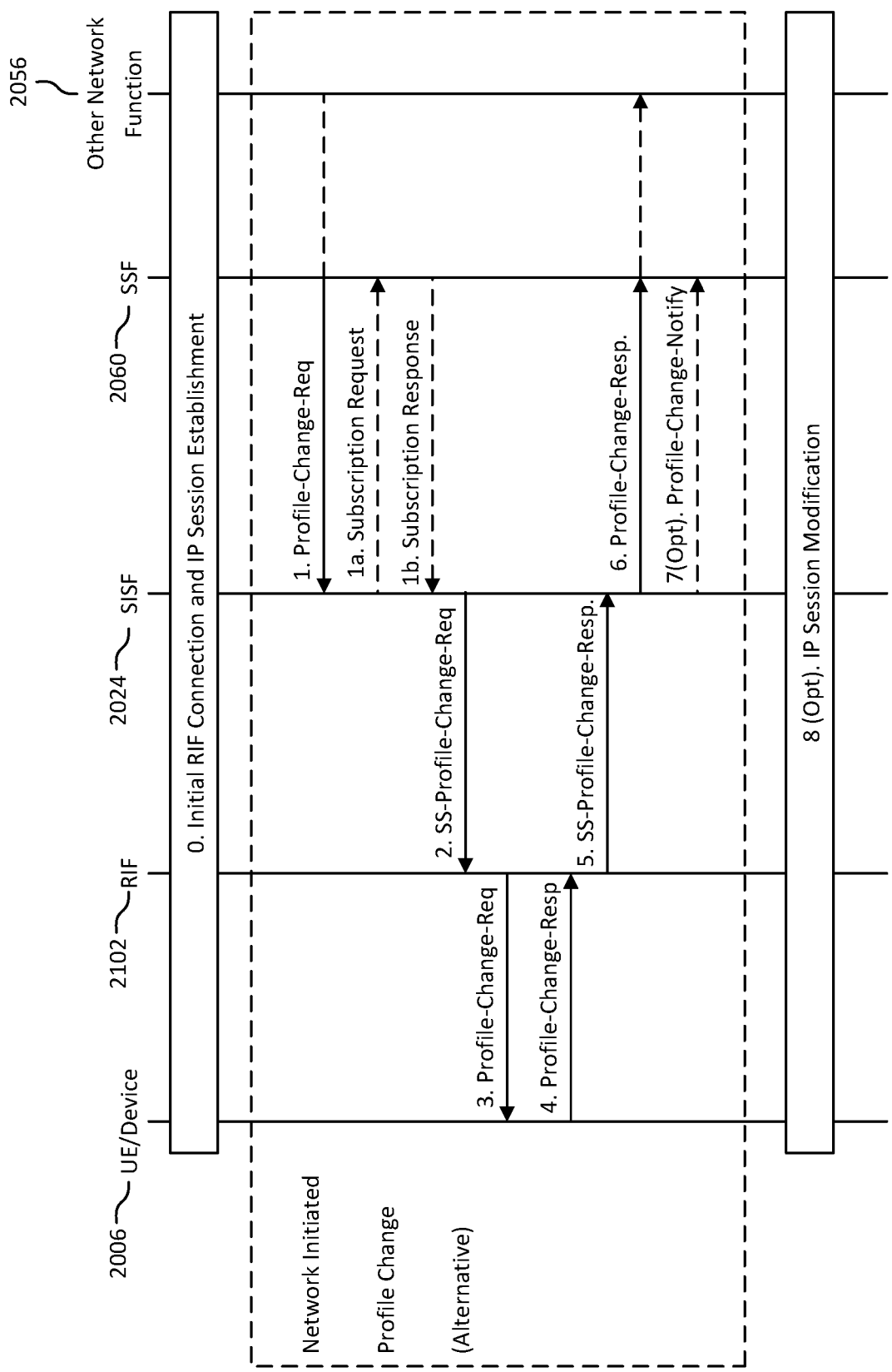
FIG. 32 is a diagram that illustrates a Network Initiated Profile Change (Alternative Approach).

FIG. 32 is a diagram that illustrates a Network Initiated Profile Change (Alternative Approach).

In step 0 of FIG. 32, prior to the Network initiated profile change, the Initial RIF Connection procedure must have been completed (see FIG. 22) which provided the UE 2006 with connectivity. An IP connection may have also been established.

In step 1 of FIG. 32, the Subscription Service or another Network Function will request a Profile Change by using the Profile-Change-Req message to the SISF. The Profile-Change-Req message will include, at a minimum, one or more UE-SERVICE-DESCRIPTORS describing the type of services that the UE 2006 expects to access.

In steps 1a and 1b of FIG. 32, the SISF 2024 may check that the Profile change is acceptable given the UE subscriptions, therefore a Subscription Request/Response pair of messages may be exchanged with the Subscription Service Function (unless this function was the Profile Change requester)

In step 2 of FIG. 32, the SISF 2024 initiates the Profile change by sending the SS-Profile-Change-Req to the RIF 2102, with the new profile information. The SS-Profile-Change-Req message will include, at a minimum, one or more UE-SERVICE-DESCRIPTORS which describe the type of services that the UE 2006 expects to access.

The message may include additional parameters such as an "active time" which enables a synchronized changed of profiles between the UE 2006 and the Network. Moreover, the message may provide alternative profiles to be used in different conditions and/or at different times, which may be applied/switched automatically by the UE 2006 and the Network In step 3 of FIG. 32, the RIF 2102 will send the Profile-Change-Req message to the UE 2006 with the new profile information.

In step 4 of FIG. 32, after changing the locally stored Profile, the UE 2006 will send the Profile-Change-Resp message to the RIF 2102 acknowledging the new profile.

In step 5 of FIG. 32, the RIF 2102 will send the SS-Profile-change-Resp message to the SISF.

In step 6 of FIG. 32, the SISF 2024 responds to the initiator (SSF 2060 or other Network function) with the Profile-Change-Resp message.

In step 7 of FIG. 32, (Optional) if the initiator was a Network function other than the Subscription Service function (SSF) 2060, the SISF 2024 may send a Profile-Change-Notify to the SSF 2060 as well, indicating that the UEs profile change procedure has been completed.

In step 8 of FIG. 32, (Optional) the IP session may be modified based on the UE Profile change.

It is understood that the entities performing the steps illustrated in FIG. 32 may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 32 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 32. It is also understood that the functionality illustrated in FIG. 32 may implemented as a set of virtualized network functions. The network functions may not necessarily communicate directly, rather, they may communicate via forwarding or routing function. It is also understood that any transmitting and receiving steps illustrated in FIG. 32 may be performed by communication circuitry of the apparatus under control of the processor of the apparatus and the computer-executable instructions (e.g., software) that it executes.

Change Slice Instance

The network may change the slice instance a UE 2006 is assigned to for various reasons such as load balancing or changes to the user's subscription, among others.

Change Slice Instance—Network Initiated (Alternative Approach)

The Change Slice Instance procedure (Alternative Approach) is initiated by the Network and it changes the Network Slice(s) assigned to an UE 2006. Following this procedure, the UE 2006 will be assigned to different Network Slice Instance(s).

Figure 33:
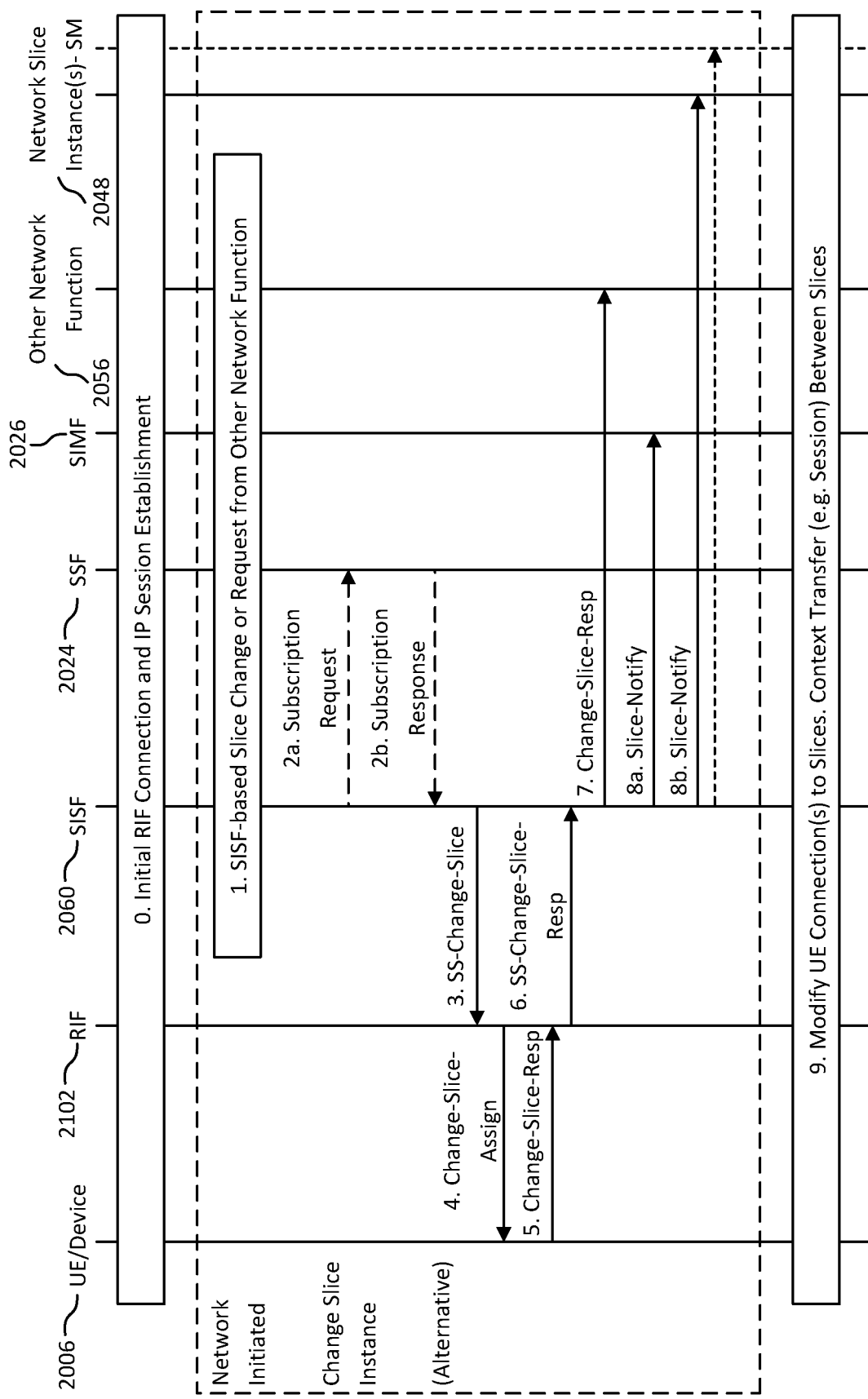
FIG. 33 is a diagram that illustrates Network Initiated Slice Change (Alternative Approach).

FIG. 33 is a diagram that illustrates Network Initiated Slice Change (Alternative Approach).

In step 0 of FIG. 33, prior to the Network initiated profile change, the Initial RIF Connection procedure must have been completed (see FIG. 22) which provided the UE 2006 with connectivity. An IP connection may have also been established.

In step 1 of FIG. 33, the SISF 2024 decides that the Slices assigned to one or more UEs need to be changed, based on internal processing or based on a specific request from another Network Function. This may include changes in a subscription.

In case the New Slice assignment is triggered by a Subscription change, this step may include a profile change procedure of FIGS. 24 and 25, or the full procedure below may be merged with the profile change procedure of FIGS. 24 and 25.

In step 2 of FIG. 33, if the New Slice assignment did not originate in the Subscription Service, SISF 2024 checks with the Subscription Service Function that the UE 2006 subscriptions are compatible with the new Slice.

In steps 2a and 2b of FIG. 33, a Subscription Request/Response pair of messages may be exchanged with the Subscription Service Function for this purpose.

In step 3 of FIG. 33, the SISF 2024 will send an SS-Change-Slice message, including the (one or more) Network Slice ID(s) that are currently allocated to the UE 2006, as well as the (one or more) Network Slice ID(s) that should replace the current assignment. The message will include information about the new slice(s) (e.g. NEW_N-SI_ID—ID, SLICE_DESCRIPTOR, Slice_Operating_Parameters, Connection_Parameters).

If the SISF 2024 may provide a list of functions to be transferred and/or allowed functions per Slice, as well as information about connection establishment for the new slice. A HARD/SOFT-TRANSITION indicator is sent to indicate "make-before-break" transitions for the functions who might support it.

In step 4 of FIG. 33, the RIF 2102 will send the UE 2006 a Change-Slice-Assign message which will include, at least, the same information as was contained in the SS-Change-Slice message it received.

In step 5 of FIG. 33, the UE 2006 will respond with a Change-Slice-Resp message indicating that it confirms changing the Network Slice Instances based on the Change-Slice-Assign message it received.

In step 6 of FIG. 33, the RIF 2102 will forward the response from the UE 2006 in a SS-Change-Slice-Resp message. This message will contain at least the same information that was contained in the Change-Slice-Resp message from the UE 2006.

In step 7 of FIG. 33, if the initiator was another Network the SISF 2024 sends to the respective function a Slice-Change-Resp to indicate the completion of the slice change procedure.

In step 8 of FIG. 33, the SISF 2024 sends Slice-Change-Notify indications to the Session Management (SM) function to indicate the updated Network Slice IDs assigned to the UE 2006 and to trigger necessary session transfer procedures. 8a. and 8b show the indicators sent to the SM Functions in the Slices assigned pre and post procedure execution.

In step 9 of FIG. 33, the UE 2006 connections to the slices are modified based on the assigned Slices. Context may be exchanged between the slices involved in the procedure.

Slice Change Notifications may be sent to other network functions affected by the slice change, and may contain timing information about when the change should take place. Other context transfer procedures may occur between equivalent functions in the two slices.

It is understood that the entities performing the steps illustrated in FIG. 33 may be logical entities that may be implemented in the form of software (i.e., computer-executable instructions) stored in a memory of, and executing on a processor of, an apparatus configured for wireless and/or network communications or a computer system such as those illustrated in FIGS. 36-37. That is, the method(s) illustrated in FIG. 33 may be implemented in the form of software (i.e., computer-executable instructions) stored in a memory of an apparatus, such as the apparatus or computer system illustrated in FIGS. 36-37, which computer executable instructions, when executed by a processor of the apparatus, perform the steps illustrated in FIG. 33. It is also understood that the functionality illustrated in FIG. 33 may implemented as a set of virtualized network functions. The network functions may not necessarily communicate directly, rather, they may communicate via forwarding or routing function. It is also understood that any transmitting and receiving steps illustrated in FIG. 33 may be performed by communication circuitry of the apparatus under control of the processor of the apparatus and the computer-executable instructions (e.g., software) that it executes.

Embodiments (Implementation Aspects)

Figure 34:
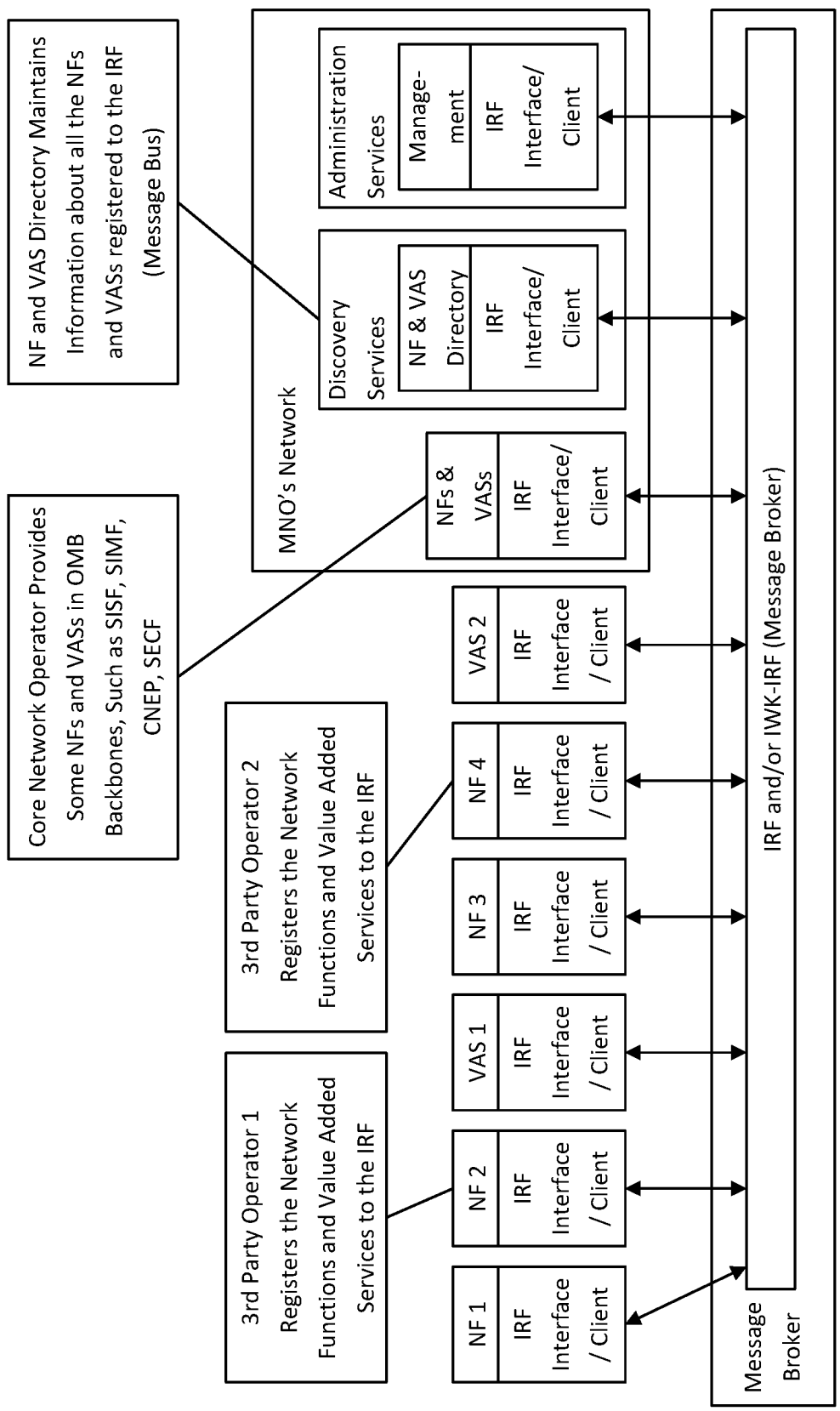
FIG. 34 is a diagram that illustrates an example of implementing IRF/IWK-IRF as a message broker.

FIG. 34 shows an example of implementing IRF/IWK-IRF as a message broker. The following points are noted:

The IRF 2058 and/or IWK-IRF is implemented as the message broker, so that all other NFs and VASs registering with IRF 2058 could be involved in a network slice instance. A network slice instance may consist of NFs and VASs provisioned by either core network operator or $3^{rd}$ party operator.

The core network operator provides the following:

NFs and VASs that implement functionalities in the CN, such as SISF, SIMF and mobility management.

NFs and VASs Directory to enable the convenient discovery of available NFs and VASs that register with the IRF 2058.

Since IRF/IWK-IRF is implemented as a message broker, which essentially is a messaging based middleware, NFs could subscribe some information/events at the IRF 2058 which they are interested in. For example, a mobility management function and a session management function could subscribe the location report/update information for a UE 2006 or a group of UEs at IRF 2058, so that they will be notified with the corresponding location update.

Different $3^{rd}$ party operators could register their own NFs and VASs to the IRF 2058, and provide these functions/services to the users.

FIG. 34 may represent a single network slice or it may represent several network slices where the IRF 2058 is shared by multiple network slices and the NF's that are connect to the IRF 2058 belong to different network slices.

It is understood that the functionality illustrated in FIG. 34, may be implemented in the form of software (i.e., computer-executable instructions) stored in a memory of, and executing on a processor of, a wireless device or other apparatus (e.g., a server, gateway, device, or other computer system), such as one of those illustrated in FIGS. 36-37 described below. It is also understood that the functionality illustrated in FIG. 34 may implemented as a set of virtualized network functions. The network functions may not necessarily communicate directly, rather, they may communicate via forwarding or routing function.

Figure 35:
FIG. 35 is a diagram of a Graphical User Interface of one embodiment.

Interfaces, such as Graphical User Interfaces (GUIs), can be used to assist user to control and/or configure functionalities related to connecting to the virtualized mobile core networks. FIG. 35 is a diagram that illustrates an interface 3502 that allows a user to create new slices, or modify/delete existing slice instances. It is to be understood that interface 3502 can be produced using displays such as those shown in FIG. 35.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service run-time enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Figure 36A:
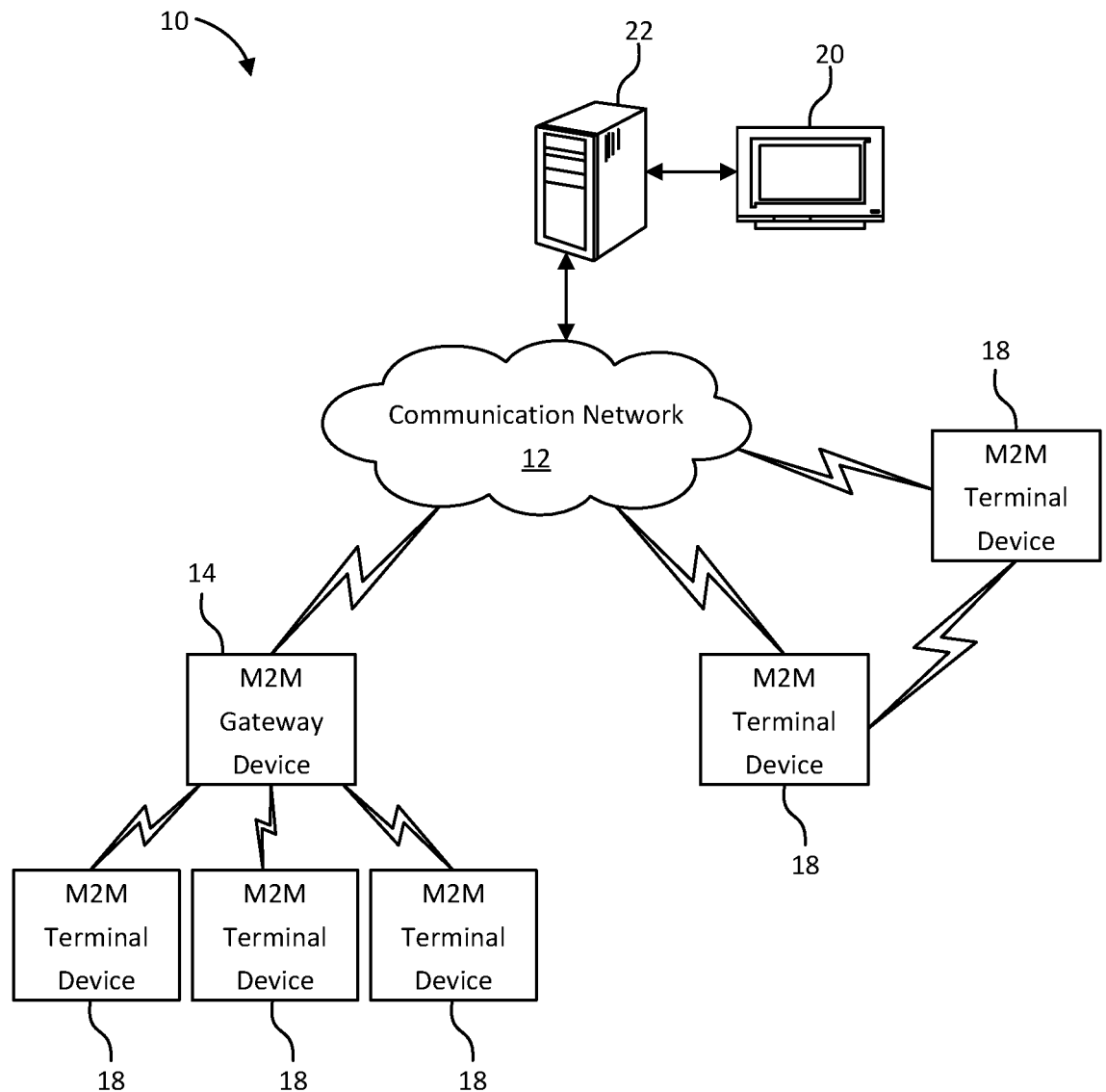
FIG. 36A is a diagram of a M2M/IoT/WoT communication system that includes a communication network.

FIG. 36A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as Subscription Service Function (SSF) 2060, User Data Repository 2032, Policy Maintenance Function (PMF) 2050, Policy Enforcement Function (PEF), Authorization Authentication Accounting (AAA) Function 2028, RAT Interface Function (RIF) 2102, Slice Instance Selection Function (SISF) 2024, Slice Instance Management Function (SIMF) 2026, Core Network Entry Point (CNEP) 2020, Interconnection and Routing Function (IRF) 2058, Mobile Originated Ingress Function (MOI) 2040, Mobile Originated Egress Function (MOE) 2046, Mobile Terminated Ingress Function (MTI) 2044, Mobile Terminated Egress Function (MTE) 2042, Session Management (SM) Function 2048, and Mobility Management (MM) Function 2022.

As shown in FIG. 36A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 36A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 36B:
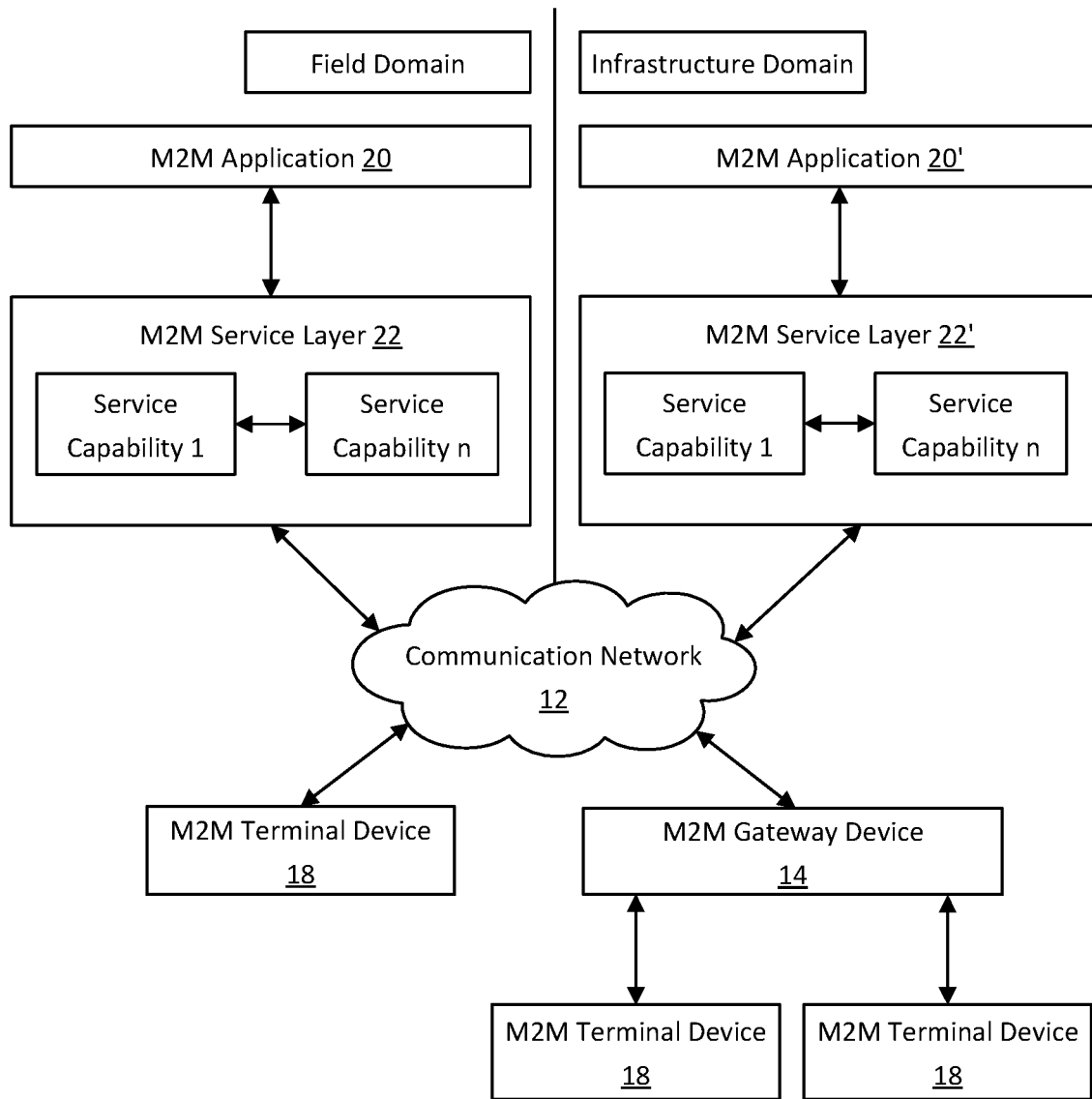
FIG. 36B is a diagram of an illustrated M2M service layer in the field domain that provides services for the M2M application, M2M gateway devices, and M2M terminal devices and the communication network.

Referring to FIG. 36B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as Subscription Service Function (SSF) 2060, User Data Repository 2032, Policy Maintenance Function (PMF) 2050, Policy Enforcement Function (PEF), Authorization Authentication Accounting (AAA) Function 2028, RAT Interface Function (RIF) 2102, Slice Instance Selection Function (SISF) 2024, Slice Instance Management Function (SIMF) 2026, Core Network Entry Point (CNEP) 2020, Interconnection and Routing Function (IRF) 2058, Mobile Originated Ingress Function (MOI) 2040, Mobile Originated Egress Function (MOE) 2046, Mobile Terminated Ingress Function (MTI) 2044, Mobile Terminated Egress Function (MTE) 2042, Session Management (SM) Function 2048, and Mobility Management (MM) Function 2022. The M2M service layer 22 may be implemented by one or more servers, computers, devices, virtual machines (e.g. cloud/storage farms, etc.) or the like, including for example the devices illustrated in FIGS. 36C and 36D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 36B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA)

and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as Subscription Service Function (SSF) 2060, User Data Repository 2032, Policy Maintenance Function (PMF) 2050, Policy Enforcement Function (PEF), Authorization Authentication Accounting (AAA) Function 2028, RAT Interface Function (RIF) 2102, Slice Instance Selection Function (SISF) 2024, Slice Instance Management Function (SIMF) 2026, Core Network Entry Point (CNEP) 2020, Interconnection and Routing Function (IRF) 2058, Mobile Originated Ingress Function (MOI) 2040, Mobile Originated Egress Function (MOE) 2046, Mobile Terminated Ingress Function (MTI) 2044, Mobile Terminated Egress Function (MTE) 2042, Session Management (SM) Function 2048, and Mobility Management (MM) Function 2022 may be hosted within a M2M service layer instance hosted by an M2M node, such as an M2M server, M2M gateway, or M2M device, as shown in FIG. 36B. For example, the logical entities such as Subscription Service Function (SSF) 2060, User Data Repository 2032, Policy Maintenance Function (PMF) 2050, Policy Enforcement Function (PEF), Authorization Authentication Accounting (AAA) Function 2028, RAT Interface Function (RIF) 2102, Slice Instance Selection Function (SISF) 2024, Slice Instance Management Function (SIMF) 2026, Core Network Entry Point (CNEP) 2020, Interconnection and Routing Function (IRF) 2058, Mobile Originated Ingress Function (MOI) 2040, Mobile Originated Egress Function (MOE) 2046, Mobile Terminated Ingress Function (MTI) 2044, Mobile Terminated Egress Function (MTE) 2042, Session Management (SM) Function 2048, and Mobility Management (MM) Function 2022 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 36C or FIG. 36D described below.

Further, logical entities such as Subscription Service Function (SSF) 2060, User Data Repository 2032, Policy Maintenance Function (PMF) 2050, Policy Enforcement Function (PEF), Authorization Authentication Accounting (AAA) Function 2028, RAT Interface Function (RIF) 2102, Slice Instance Selection Function (SISF) 2024, Slice Instance Management Function (SIMF) 2026, Core Network Entry Point (CNEP) 2020, Interconnection and Routing Function (IRF) 2058, Mobile Originated Ingress Function (MOI) 2040, Mobile Originated Egress Function (MOE) 2046, Mobile Terminated Ingress Function (MTI) 2044, Mobile Terminated Egress Function (MTE) 2042, Session Management (SM) Function 2048, and Mobility Management (MM) Function 2022 can implemented as part of an M2M network that uses a Service Oriented Architecture (SOA) and/or a Resource-Oriented Architecture (ROA) to access services of the present application.

Figure 36C:
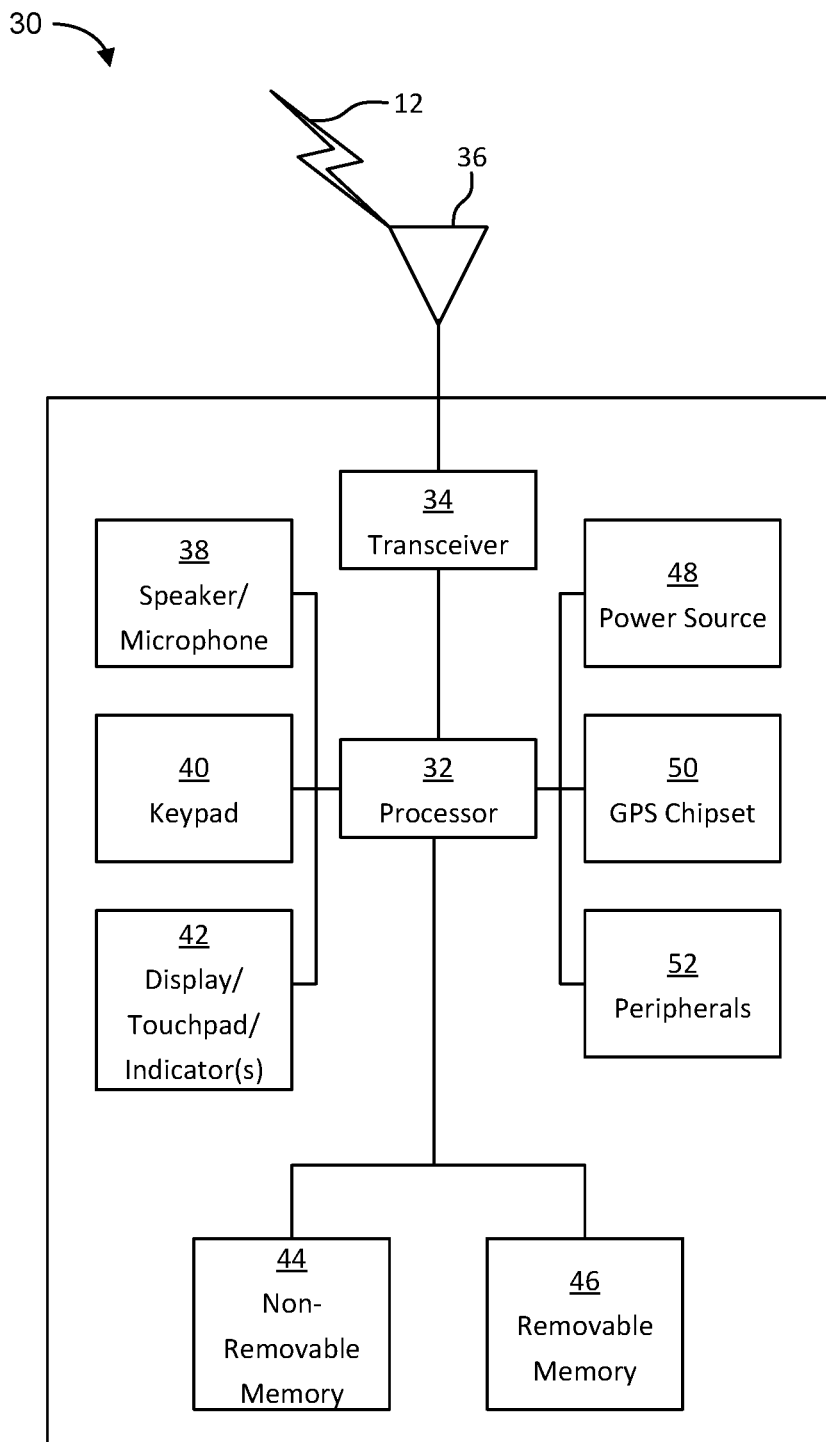
FIG. 36C is a diagram of an exemplary device that may be used to implement any of the network nodes, devices or apparatuses described herein.

FIG. 36C is a block diagram of an example hardware/software architecture of a M2M network node 30, such as an M2M device 18, an M2M gateway 14, an M2M server, or the like. The node 30 can execute or include logical entities such as Subscription Service Function (SSF) 2060, User Data Repository 2032, Policy Maintenance Function (PMF) 2050, Policy Enforcement Function (PEF), Authorization Authentication Accounting (AAA) Function 2028, RAT Interface Function (RIF) 2102, Slice Instance Selection Function (SISF) 2024, Slice Instance Management Function (SIMF) 2026, Core Network Entry Point (CNEP) 2020, Interconnection and Routing Function (IRF) 2058, Mobile Originated Ingress Function (MOI) 2040, Mobile Originated Egress Function (MOE) 2046, Mobile Terminated Ingress Function (MTI) 2044, Mobile Terminated Egress Function (MTE) 2042, Session Management (SM) Function 2048, and Mobility Management (MM) Function 2022. The device 30 can be part of an M2M network as shown in FIG. 36A-B or part of a non-M2M network. As shown in FIG. 36C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 36C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 36C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 36C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control visual indications on the display to reflect the status of the system or to obtain input from a user or display information to a user about capabilities or settings. A graphical user interface, which may be shown on the display, may be layered on top of an API to allow a user to interactively do functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

Figure 36D:
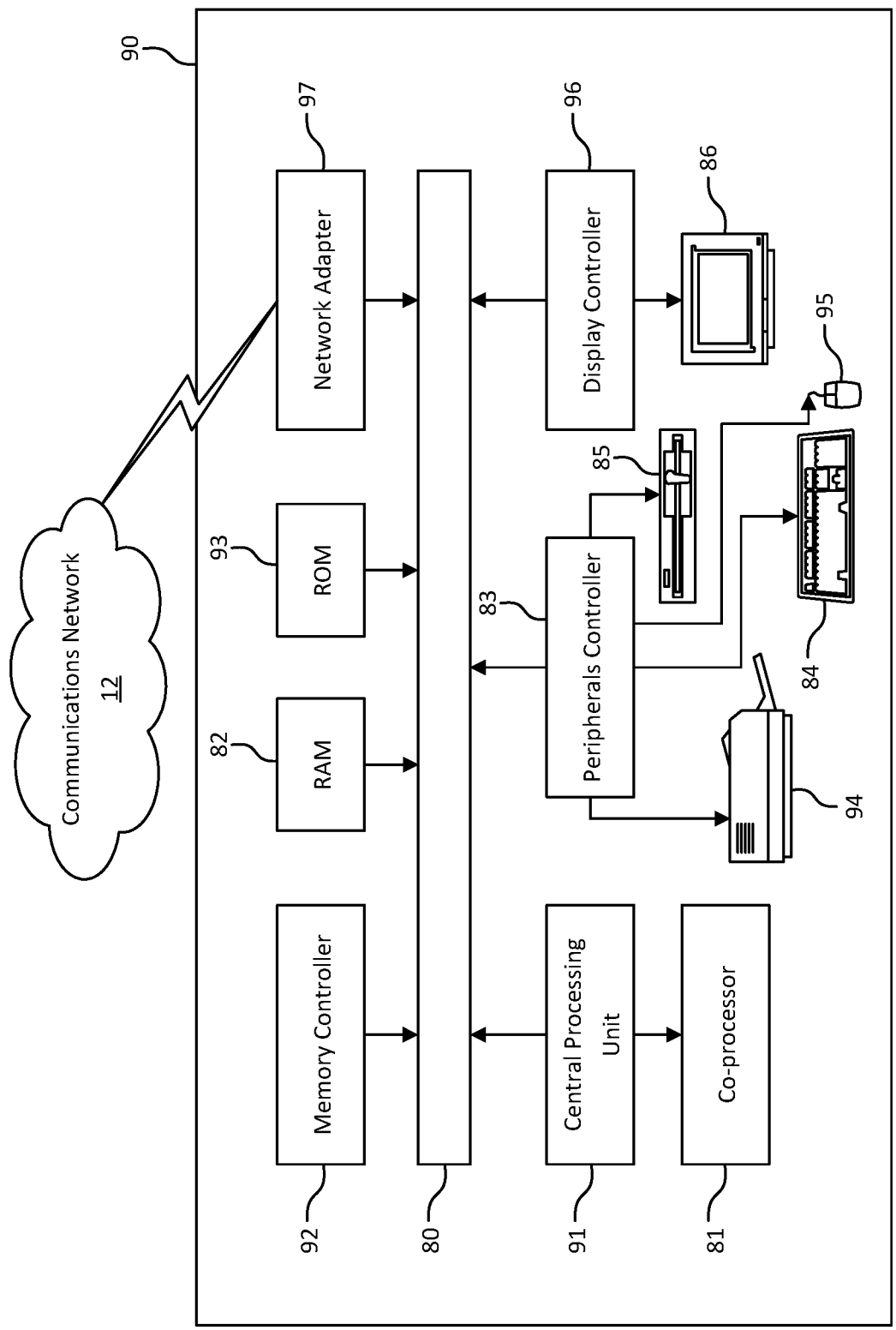
FIG. 36D is a block diagram of a computer system or server that may be used to implement any of the network nodes, devices or apparatuses described herein.

FIG. 36D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as Subscription Service Function (SSF) 2060, User Data Repository 2032, Policy Maintenance Function (PMF) 2050, Policy Enforcement Function (PEF), Authorization Authentication Accounting (AAA) Function 2028, RAT Interface Function (RIF) 2102, Slice Instance Selection Function (SISF) 2024, Slice Instance Management Function (SIMF) 2026, Core Network Entry Point (CNEP) 2020, Interconnection and Routing Function (IRF) 2058, Mobile Originated Ingress Function (MOI) 2040, Mobile Originated Egress Function (MOE) 2046, Mobile Terminated Ingress Function (MTI) 2044, Mobile Terminated Egress Function (MTE) 2042, Session Management (SM) Function 2048, and Mobility Management (MM) Function 2022. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 36A and FIG. 36B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 36A-B or the device 30 of FIG. 36 C.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 37A:
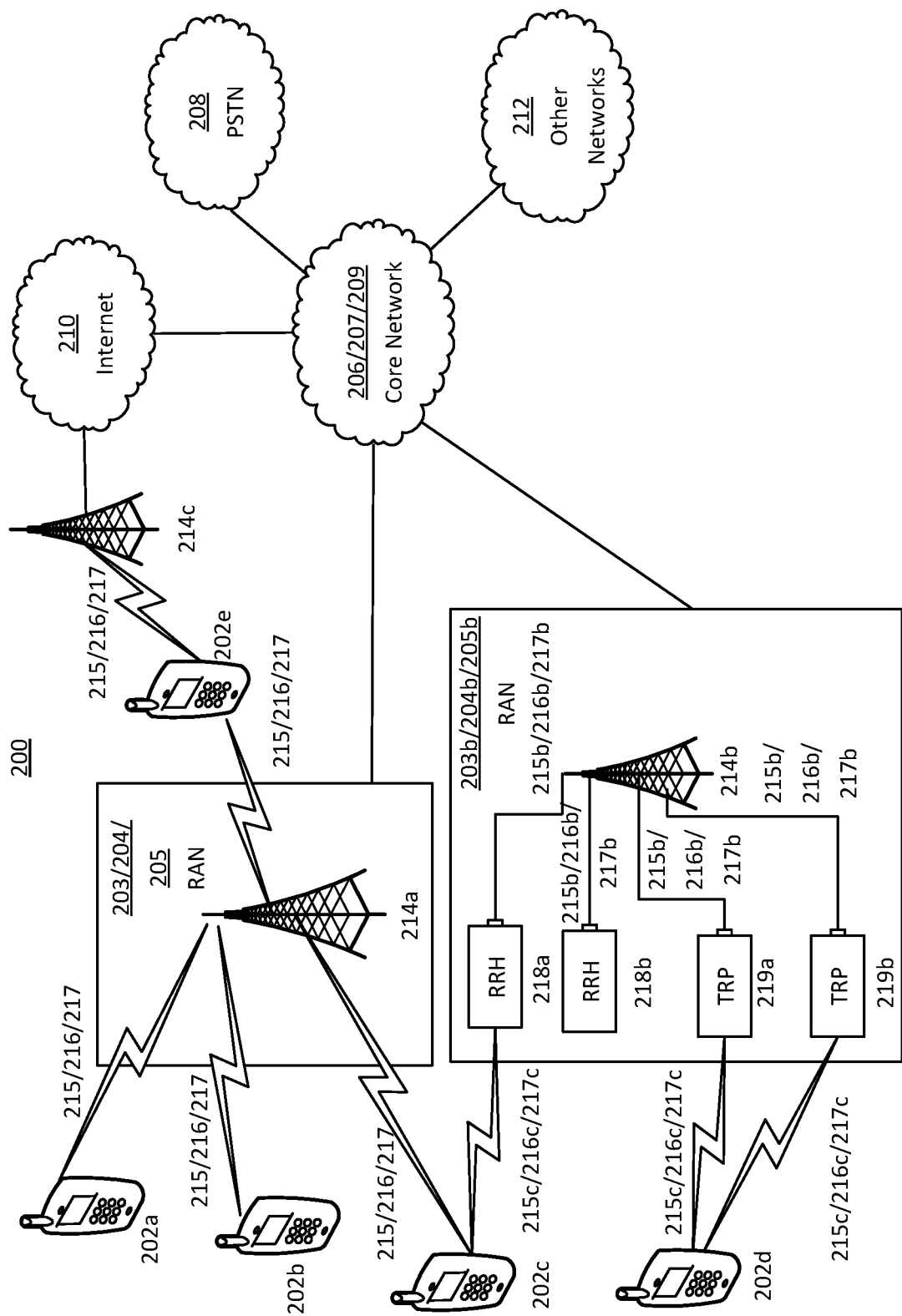
FIG. 37A illustrates one embodiment of an example communications system in which the methods and apparatuses described and claimed herein may be embodiment.

FIG. 37A illustrates one embodiment of an example communications system 200 in which the methods and apparatuses described and claimed herein may be embodied. As shown, the example communications system 200 may include wireless transmit/receive units (WTRUs) 202a, 202b, 202c, and/or 202d (which generally or collectively may be referred to as WTRU 202), a radio access network (RAN) 203/204/205/203b/204b/205b, a core network 206/207/209, a public switched telephone network (PSTN) 208, the Internet 210, and other networks 212, though it will be appreciated that the disclosed embodiments contemplate any number of WTRUs, base stations, networks, and/or network elements. Each of the WTRUs 202a, 202b, 202c, 202d, 202e may be any type of apparatus or device configured to operate and/or communicate in a wireless environment. Although each WTRU 202a, 202b, 202c, 202d, 202e is depicted in FIGS. 37A-37E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 200 may also include a base station 214a and a base station 214b. Base stations 214a may be any type of device configured to wirelessly interface with at least one of the WTRUs 202a, 202b, 202c to facilitate access to one or more communication networks, such as the core network 206/207/209, the Internet 210, and/or the other networks 212. Base stations 214b may be any type of device configured to wiredly and/or wirelessly interface with at least one of the RRHs (Remote Radio Heads) 218a, 218b and/or TRPs (Transmission and Reception Points) 219a, 219b to facilitate access to one or more communication networks, such as the core network 206/207/209, the Internet 210, and/or the other networks 212. RRHs 218a, 218b may be any type of device configured to wirelessly interface with at least one of the WTRU 202c, to facilitate access to one or more communication networks, such as the core network 206/207/209, the Internet 210, and/or the other networks 212. TRPs 219a, 219b may be any type of device configured to wirelessly interface with at least one of the WTRU 202d, to facilitate access to one or more communication networks, such as the core network 206/207/209, the Internet 210, and/or the other networks 212. By way of example, the base stations 214a, 214b may be a base transceiver station (BTS), a Node-B, an eNode B, a Home Node B, a Home eNode B, a site controller, an access point (AP), a wireless router, and the like. While the base stations 214a, 214b are each depicted as a single element, it will be appreciated that the base stations 214a, 214b may include any number of interconnected base stations and/or network elements.

The base station 214a may be part of the RAN 203/204/205, which may also include other base stations and/or network elements (not shown), such as a base station controller (BSC), a radio network controller (RNC), relay nodes, etc. The base station 214b may be part of the RAN 203b/204b/205b, which may also include other base stations and/or network elements (not shown), such as a base station controller (BSC), a radio network controller (RNC), relay nodes, etc. The base station 214a may be configured to transmit and/or receive wireless signals within a particular geographic region, which may be referred to as a cell (not shown). The base station 214b may be configured to transmit and/or receive wired and/or wireless signals within a particular geographic region, which may be referred to as a cell (not shown). The cell may further be divided into cell sectors. For example, the cell associated with the base station 214a may be divided into three sectors. Thus, in an embodiment, the base station 214a may include three transceivers, e.g., one for each sector of the cell. In an embodiment, the base station 214a may employ multiple-input multiple output (MIMO) technology and, therefore, may utilize multiple transceivers for each sector of the cell.

The base stations 214a may communicate with one or more of the WTRUs 202a, 202b, 202c over an air interface 215/216/217, which may be any suitable wireless communication link (e.g., radio frequency (RF), microwave, infrared (IR), ultraviolet (UV), visible light, cmWave, mmWave, etc.). The air interface 215/216/217 may be established using any suitable radio access technology (RAT).

The base stations 214b may communicate with one or more of the RRHs 218a, 218b and/or TRPs 219a, 219b over a wired or air interface 215b/216b/217b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 215b/216b/217b may be established using any suitable radio access technology (RAT).

The RRHs 218a, 218b and/or TRPs 219a, 219b may communicate with one or more of the WTRUs 202c, 202d over an air interface 215c/216c/217c, which may be any suitable wireless communication link (e.g., radio frequency (RF), microwave, infrared (IR), ultraviolet (UV), visible light, cmWave, mmWave, etc.). The air interface 215c/216c/217c may be established using any suitable radio access technology (RAT).

More specifically, as noted above, the communications system 200 may be a multiple access system and may employ one or more channel access schemes, such as CDMA, TDMA, FDMA, OFDMA, SC-FDMA, and the like. For example, the base station 214a in the RAN 203/204/205 and the WTRUs 202a, 202b, 202c, or RRHs 218a, 218b and TRPs 219a, 219b in the RAN 203b/204b/205b and the WTRUs 202c, 202d, may implement a radio technology such as Universal Mobile Telecommunications System (UMTS) Terrestrial Radio Access (UTRA), which may establish the air interface 215/216/217 or 215c/216c/217c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 214a and the WTRUs 202a, 202b, 202c, or RRHs 218a, 218b and TRPs 219a, 219b in the RAN 203b/204b/205b and the WTRUs 202c, 202d, may implement a radio technology such as Evolved UMTS Terrestrial Radio Access (E-UTRA), which may establish the air interface 215/216/217 or 215c/216c/217c respectively using Long Term Evolution (LTE) and/or LTE-Advanced (LTE-A). In the future, the air interface 215/216/217 may implement 3GPP NR technology.

In an embodiment, the base station 214a in the RAN 203/204/205 and the WTRUs 202a, 202b, 202c, or RRHs 218a, 218b and TRPs 219a, 219b in the RAN 203b/204b/205b and the WTRUs 202c, 202d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 214c in FIG. 37A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 214c and the WTRUs 202e, may implement a radio technology such as IEEE 802.11 to establish a wireless local area network (WLAN). In an embodiment, the base station 214c and the WTRUs 202d, may implement a radio technology such as IEEE 802.15 to establish a wireless personal area network (WPAN). In yet another embodiment, the base station 214c and the WTRUs 202e, may utilize a cellular-based RAT (e.g., WCDMA, CDMA2000, GSM, LTE, LTE-A, etc.) to establish a picocell or femtocell. As shown in FIG. 37A, the base station 214b may have a direct connection to the Internet 210. Thus, the base station 214c may not be required to access the Internet 210 via the core network 206/207/209.

The RAN 203/204/205 and/or RAN 203b/204b/205b may be in communication with the core network 206/207/209, which may be any type of network configured to provide voice, data, applications, and/or voice over internet protocol (VoIP) services to one or more of the WTRUs 202a, 202b, 202c, 202d. For example, the core network 206/207/209 may provide call control, billing services, mobile location-based services, pre-paid calling, Internet connectivity, video distribution, etc., and/or perform high-level security functions, such as user authentication.

Although not shown in FIG. 37A, it will be appreciated that the RAN 203/204/205 and/or RAN 203b/204b/205b and/or the core network 206/207/209 may be in direct or indirect communication with other RANs that employ the same RAT as the RAN 203/204/205 and/or RAN 203b/204b/205b or a different RAT. For example, in addition to being connected to the RAN 203/204/205 and/or RAN 203b/204b/205b, which may be utilizing an E-UTRA radio technology, the core network 206/207/209 may also be in communication with another RAN (not shown) employing a GSM radio technology.

The core network 206/207/209 may also serve as a gateway for the WTRUs 202a, 202b, 202c, 202d, 202e to access the PSTN 208, the Internet 210, and/or other networks 212. The PSTN 208 may include circuit-switched telephone networks that provide plain old telephone service (POTS). The Internet 210 may include a global system of interconnected computer networks and devices that use common communication protocols, such as the transmission control protocol (TCP), user datagram protocol (UDP) and the internet protocol (IP) in the TCP/IP internet protocol suite. The networks 212 may include wired or wireless communications networks owned and/or operated by other service providers. For example, the networks 212 may include another core network connected to one or more RANs, which may employ the same RAT as the RAN 203/204/205 and/or RAN 203b/204b/205b or a different RAT.

Some or all of the WTRUs 202a, 202b, 202c, 202d in the communications system 200 may include multi-mode capabilities, e.g., the WTRUs 202a, 202b, 202c, 202d, and 202e may include multiple transceivers for communicating with different wireless networks over different wireless links. For example, the WTRU 202e shown in FIG. 37A may be configured to communicate with the base station 214a, which may employ a cellular-based radio technology, and with the base station 214c, which may employ an IEEE 802 radio technology.

Figure 37B:
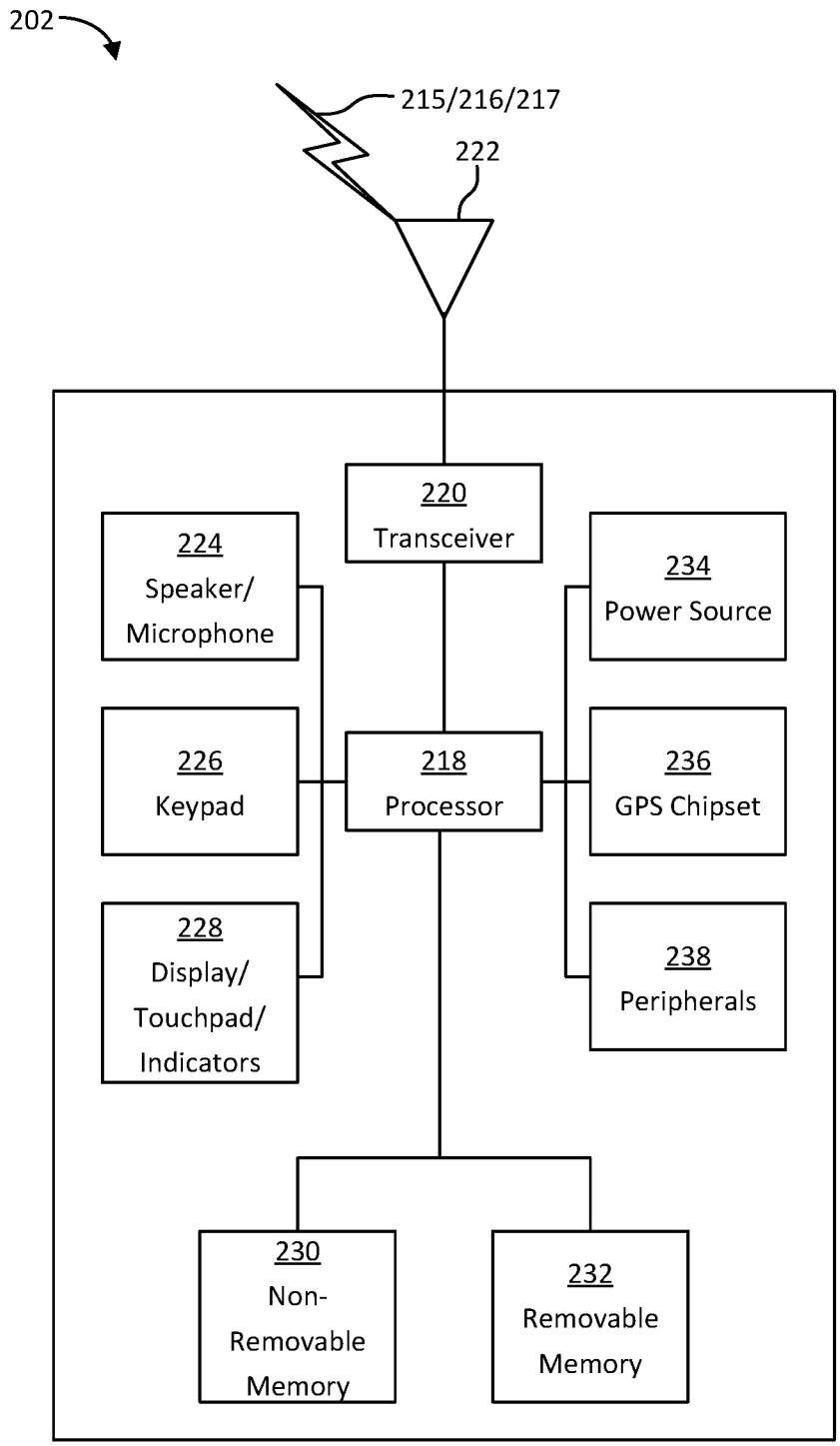
FIG. 37B is a block diagram of an example apparatus or device configured for wireless communications in accordance with the embodiments illustrated herein.

FIG. 37B is a block diagram of an example apparatus or device configured for wireless communications in accordance with the embodiments illustrated herein, such as for example, a WTRU 202. As shown in FIG. 37B, the example WTRU 202 may include a processor 218, a transceiver 220, a transmit/receive element 222, a speaker/microphone 224, a keypad 226, a display/touchpad/indicators 228, non-removable memory 230, removable memory 232, a power source 234, a global positioning system (GPS) chipset 236, and other peripherals 238. It will be appreciated that the WTRU 202 may include any sub-combination of the foregoing elements while remaining consistent with an embodiment. Also, embodiments contemplate that the base stations 214a and 214b, and/or the nodes that base stations 214a and 214b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 37B and described herein.

The processor 218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 218 may perform signal coding, data processing, power control, input/output processing, and/or any other functionality that enables the WTRU 202 to operate in a wireless environment. The processor 218 may be coupled to the transceiver 220, which may be coupled to the transmit/receive element 222. While FIG. 37B depicts the processor 218 and the transceiver 220 as separate components, it will be appreciated that the processor 218 and the transceiver 220 may be integrated together in an electronic package or chip.

The transmit/receive element 222 may be configured to transmit signals to, or receive signals from, a base station (e.g., the base station 214a) over the air interface 215/216/217. For example, in an embodiment, the transmit/receive element 222 may be an antenna configured to transmit and/or receive RF signals. Although not shown in FIG. 37A, it will be appreciated that the RAN 203/204/205 and/or the core network 206/207/209 may be in direct or indirect communication with other RANs that employ the same RAT as the RAN 203/204/205 or a different RAT. For example, in addition to being connected to the RAN 203/204/205, which may be utilizing an E-UTRA radio technology, the core network 206/207/209 may also be in communication with another RAN (not shown) employing a GSM radio technology.

The core network 206/207/209 may also serve as a gateway for the WTRUs 202a, 202b, 202c, 202d to access the PSTN 208, the Internet 210, and/or other networks 212. The PSTN 208 may include circuit-switched telephone networks that provide plain old telephone service (POTS). The Internet 210 may include a global system of interconnected computer networks and devices that use common communication protocols, such as the transmission control protocol (TCP), user datagram protocol (UDP) and the internet protocol (IP) in the TCP/IP internet protocol suite. The networks 212 may include wired or wireless communications networks owned and/or operated by other service providers. For example, the networks 212 may include another core network connected to one or more RANs, which may employ the same RAT as the RAN 203/204/205 or a different RAT.

Some or all of the WTRUs 202a, 202b, 202c, 202d in the communications system 200 may include multi-mode capabilities, e.g., the WTRUs 202a, 202b, 202c, and 202d may include multiple transceivers for communicating with different wireless networks over different wireless links. For example, the WTRU 202c shown in FIG. 37A may be configured to communicate with the base station 214a, which may employ a cellular-based radio technology, and with the base station 214b, which may employ an IEEE 802 radio technology.

FIG. 37B is a block diagram of an example apparatus or device configured for wireless communications in accordance with the embodiments illustrated herein, such as for example, a WTRU 202. As shown in FIG. 37B, the example WTRU 202 may include a processor 218, a transceiver 220, a transmit/receive element 222, a speaker/microphone 224, a keypad 226, a display/touchpad/indicators 228, non-removable memory 230, removable memory 232, a power source 234, a global positioning system (GPS) chipset 236, and other peripherals 238. It will be appreciated that the WTRU 202 may include any sub-combination of the foregoing elements while remaining consistent with an embodiment. Also, embodiments contemplate that the base stations 214a and 214b, and/or the nodes that base stations 214a and 214b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 37B and described herein.

The processor 218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 218 may perform signal coding, data processing, power control, input/output processing, and/or any other functionality that enables the WTRU 202 to operate in a wireless environment. The processor 218 may be coupled to the transceiver 220, which may be coupled to the transmit/receive element 222. While FIG. 37B depicts the processor 218 and the transceiver 220 as separate components, it will be appreciated that the processor 218 and the transceiver 220 may be integrated together in an electronic package or chip.

The transmit/receive element 222 may be configured to transmit signals to, or receive signals from, a base station (e.g., the base station 214a) over the air interface 215/216/217. For example, in an embodiment, the transmit/receive element 222 may be an antenna configured to transmit and/or receive RF signals. In an embodiment, the transmit/receive element 222 may be an emitter/detector configured to transmit and/or receive IR, UV, or visible light signals, for example. In yet an embodiment, the transmit/receive element 222 may be configured to transmit and receive both RF and light signals. It will be appreciated that the transmit/receive element 222 may be configured to transmit and/or receive any combination of wireless signals.

In addition, although the transmit/receive element 222 is depicted in FIG. 37B as a single element, the WTRU 202 may include any number of transmit/receive elements 222. More specifically, the WTRU 202 may employ MIMO technology. Thus, in an embodiment, the WTRU 202 may include two or more transmit/receive elements 222 (e.g., multiple antennas) for transmitting and receiving wireless signals over the air interface 215/216/217.

The transceiver 220 may be configured to modulate the signals that are to be transmitted by the transmit/receive element 222 and to demodulate the signals that are received by the transmit/receive element 222. As noted above, the WTRU 202 may have multi-mode capabilities. Thus, the transceiver 220 may include multiple transceivers for enabling the WTRU 202 to communicate via multiple RATs, such as UTRA and IEEE 802.11, for example.

The processor 218 of the WTRU 202 may be coupled to, and may receive user input data from, the speaker/microphone 224, the keypad 226, and/or the display/touchpad/indicators 228 (e.g., a liquid crystal display (LCD) display unit or organic light-emitting diode (OLED) display unit). The processor 218 may also output user data to the speaker/microphone 224, the keypad 226, and/or the display/touchpad/indicators 228. In addition, the processor 218 may access information from, and store data in, any type of suitable memory, such as the non-removable memory 230 and/or the removable memory 232. The non-removable memory 230 may include random-access memory (RAM), read-only memory (ROM), a hard disk, or any other type of memory storage device. The removable memory 232 may include a subscriber identity module (SIM) card, a memory stick, a secure digital (SD) memory card, and the like. In an embodiment, the processor 218 may access information from, and store data in, memory that is not physically located on the WTRU 202, such as on a server or a home computer (not shown).

The processor 218 may receive power from the power source 234, and may be configured to distribute and/or control the power to the other components in the WTRU 202. The power source 234 may be any suitable device for powering the WTRU 202. For example, the power source 234 may include one or more dry cell batteries, solar cells, fuel cells, and the like.

The processor 218 may also be coupled to the GPS chipset 236, which may be configured to provide location information (e.g., longitude and latitude) regarding the current location of the WTRU 202. In addition to, or in lieu of, the information from the GPS chipset 236, the WTRU 202 may receive location information over the air interface 215/216/217 from a base station (e.g., base stations 214a, 214b) and/or determine its location based on the timing of the signals being received from two or more nearby base stations. It will be appreciated that the WTRU 202 may acquire location information by way of any suitable location-determination method while remaining consistent with an embodiment.

The processor 218 may further be coupled to other peripherals 238, which may include one or more software and/or hardware modules that provide additional features, functionality and/or wired or wireless connectivity. For example, the peripherals 238 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 202 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 202 may connect to other components, modules, or systems of such apparatuses or devices via one or more interconnect interfaces, such as an interconnect interface that may comprise one of the peripherals 238.

Figure 37C:
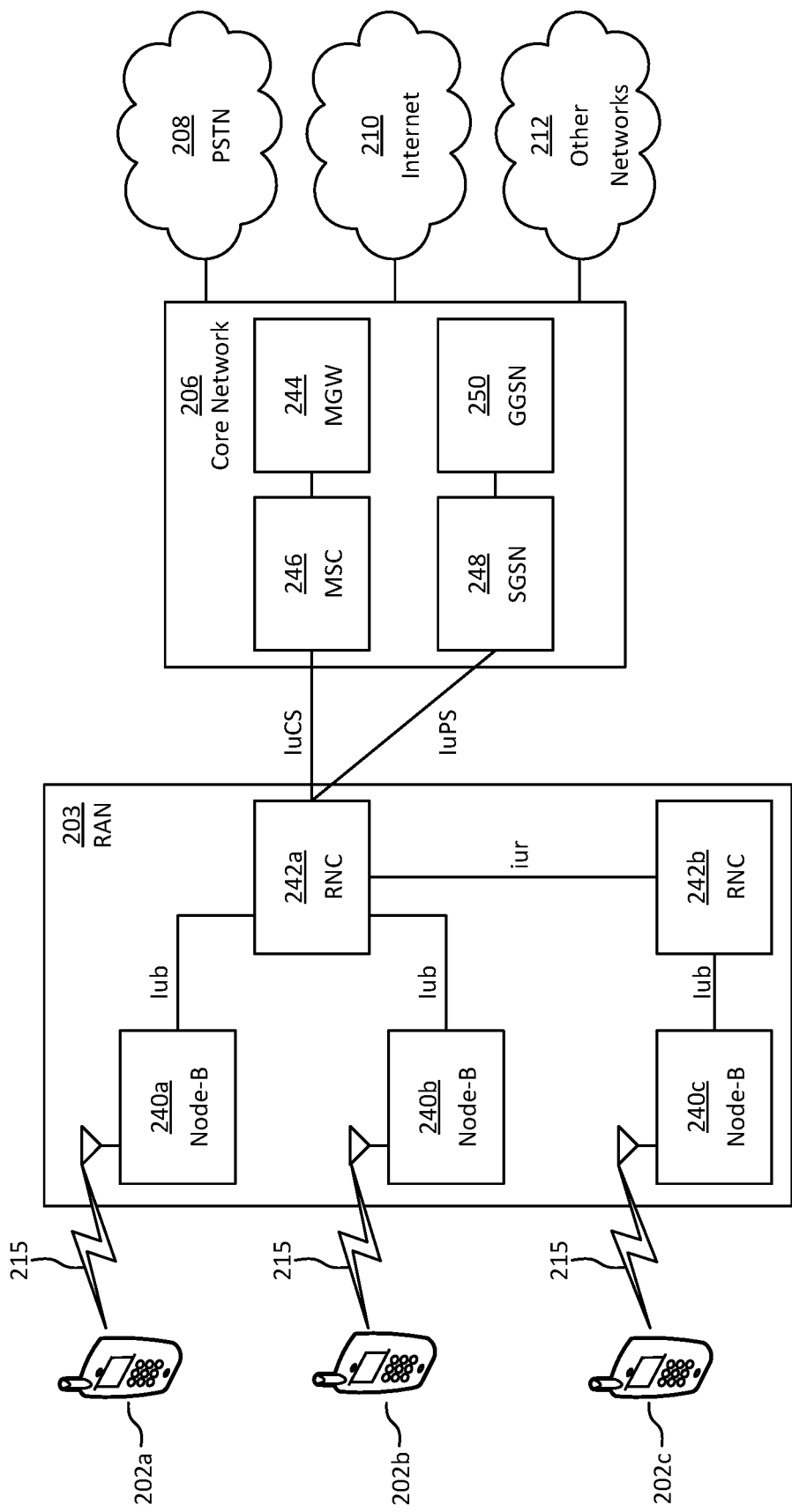
FIG. 37C is a system diagram of the RAN and the core network according to an embodiment.

FIG. 37C is a system diagram of the RAN 203 and the core network 206 according to an embodiment. As noted above, the RAN 203 may employ a UTRA radio technology to communicate with the WTRUs 202a, 202b, and 202c over the air interface 215. The RAN 203 may also be in communication with the core network 206. As shown in FIG. 37C, the RAN 203 may include Node-Bs 240a, 240b, 240c, which may each include one or more transceivers for communicating with the WTRUs 202a, 202b, 202c over the air interface 215. The Node-Bs 240a, 240b, 240c may each be associated with a particular cell (not shown) within the RAN 203. The RAN 203 may also include RNCs 242a, 242b. It will be appreciated that the RAN 203 may include any number of Node-Bs and RNCs while remaining consistent with an embodiment.

As shown in FIG. 37C, the Node-Bs 240a, 240b may be in communication with the RNC 242a. Additionally, the Node-B 240c may be in communication with the RNC 242b. The Node-Bs 240a, 240b, 240c may communicate with the respective RNCs 242a, 242b via an Iub interface. The RNCs 242a, 242b may be in communication with one another via an Iur interface. Each of the RNCs 242a, 242b may be configured to control the respective Node-Bs 240a, 240b, 240c to which it is connected. In addition, each of the RNCs 242a, 242b may be configured to carry out or support other functionality, such as outer loop power control, load control, admission control, packet scheduling, handover control, macro-diversity, security functions, data encryption, and the like.

The core network 206 shown in FIG. 37C may include a media gateway (MGW) 244, a mobile switching center (MSC) 246, a serving GPRS support node (SGSN) 248, and/or a gateway GPRS support node (GGSN) 250. While each of the foregoing elements are depicted as part of the core network 206, it will be appreciated that any one of these elements may be owned and/or operated by an entity other than the core network operator.

The RNC 242a in the RAN 203 may be connected to the MSC 246 in the core network 206 via an IuCS interface. The MSC 246 may be connected to the MGW 244. The MSC 246 and the MGW 244 may provide the WTRUs 202a, 202b, 202c with access to circuit-switched networks, such as the PSTN 208, to facilitate communications between the WTRUs 202a, 202b, 202c and traditional land-line communications devices.

The RNC 242a in the RAN 203 may also be connected to the SGSN 248 in the core network 206 via an IuPS interface. The SGSN 248 may be connected to the GGSN 250. The SGSN 248 and the GGSN 250 may provide the WTRUs 202a, 202b, 202c with access to packet-switched networks, such as the Internet 210, to facilitate communications between and the WTRUs 202a, 202b, 202c and IP-enabled devices.

As noted above, the core network 206 may also be connected to the networks 212, which may include other wired or wireless networks that are owned and/or operated by other service providers.

Figure 37D:
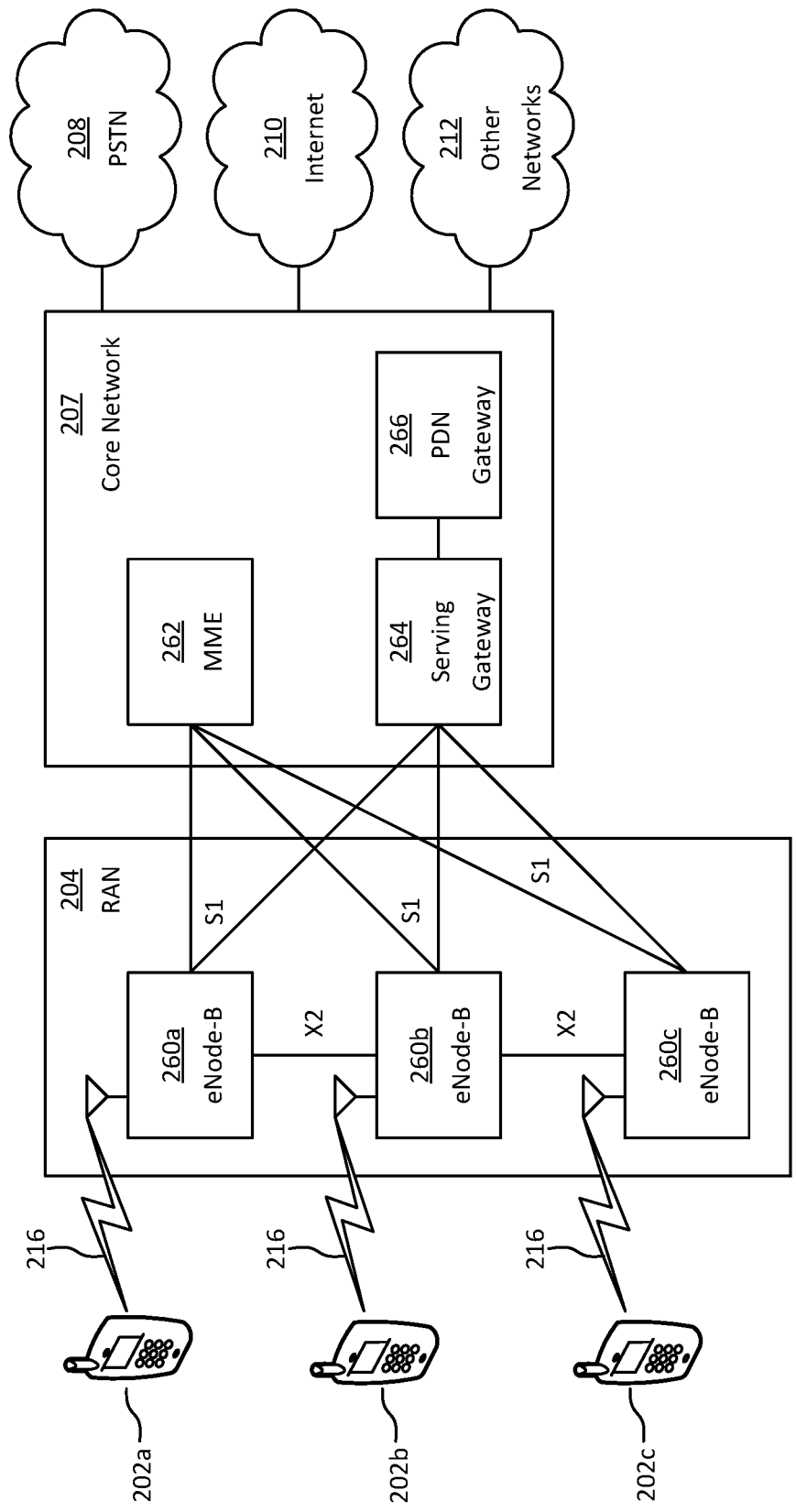
FIG. 37D is a system diagram of the RAN and the core network according to another embodiment.

FIG. 37D is a system diagram of the RAN 204 and the core network 207 according to an embodiment. As noted above, the RAN 204 may employ an E-UTRA radio technology to communicate with the WTRUs 202a, 202b, and 202c over the air interface 216. The RAN 204 may also be in communication with the core network 207.

The RAN 204 may include eNode-Bs 260a, 260b, 260c, though it will be appreciated that the RAN 204 may include any number of eNode-Bs while remaining consistent with an embodiment. The eNode-Bs 260a, 260b, 260c may each include one or more transceivers for communicating with the WTRUs 202a, 202b, 202c over the air interface 216. In an embodiment, the eNode-Bs 260a, 260b, 260c may implement MIMO technology. Thus, the eNode-B 260a, for example, may use multiple antennas to transmit wireless signals to, and receive wireless signals from, the WTRU 202a.

Each of the eNode-Bs 260a, 260b, and 260c may be associated with a particular cell (not shown) and may be configured to handle radio resource management decisions, handover decisions, scheduling of users in the uplink and/or downlink, and the like. As shown in FIG. 37D, the eNode-Bs 260a, 260b, 260c may communicate with one another over an X2 interface.

The core network 207 shown in FIG. 37D may include a mobility management gateway (MME) 262, a serving gateway 264, and a packet data network (PDN) gateway 266. While each of the foregoing elements are depicted as part of the core network 207, it will be appreciated that any one of these elements may be owned and/or operated by an entity other than the core network operator.

The MME 262 may be connected to each of the eNode-Bs 260a, 260b, and 260c in the RAN 204 via an S1 interface and may serve as a control node. For example, the MME 262 may be responsible for authenticating users of the WTRUs 202a, 202b, 202c, bearer activation/deactivation, selecting a particular serving gateway during an initial attach of the WTRUs 202a, 202b, 202c, and the like. The MME 262 may also provide a control plane function for switching between the RAN 204 and other RANs (not shown) that employ other radio technologies, such as GSM or WCDMA.

The serving gateway 264 may be connected to each of the eNode-Bs 260a, 260b, and 260c in the RAN 204 via the S1 interface. The serving gateway 264 may generally route and forward user data packets to/from the WTRUs 202a, 202b, 202c. The serving gateway 264 may also perform other functions, such as anchoring user planes during inter-eNode B handovers, triggering paging when downlink data is available for the WTRUs 202a, 202b, 202c, managing and storing contexts of the WTRUs 202a, 202b, 202c, and the like.

The serving gateway 264 may also be connected to the PDN gateway 266, which may provide the WTRUs 202a, 202b, 202c with access to packet-switched networks, such as the Internet 210, to facilitate communications between the WTRUs 202a, 202b, 202c and IP-enabled devices.

The core network 207 may facilitate communications with other networks. For example, the core network 207 may provide the WTRUs 202a, 202b, 202c with access to circuit-switched networks, such as the PSTN 208, to facilitate communications between the WTRUs 202a, 202b, 202c and traditional land-line communications devices. For example, the core network 207 may include, or may communicate with, an IP gateway (e.g., an IP multimedia subsystem (IMS) server) that serves as an interface between the core network 207 and the PSTN 208. In addition, the core network 207 may provide the WTRUs 202a, 202b, 202c with access to the networks 212, which may include other wired or wireless networks that are owned and/or operated by other service providers.

Figure 37E:
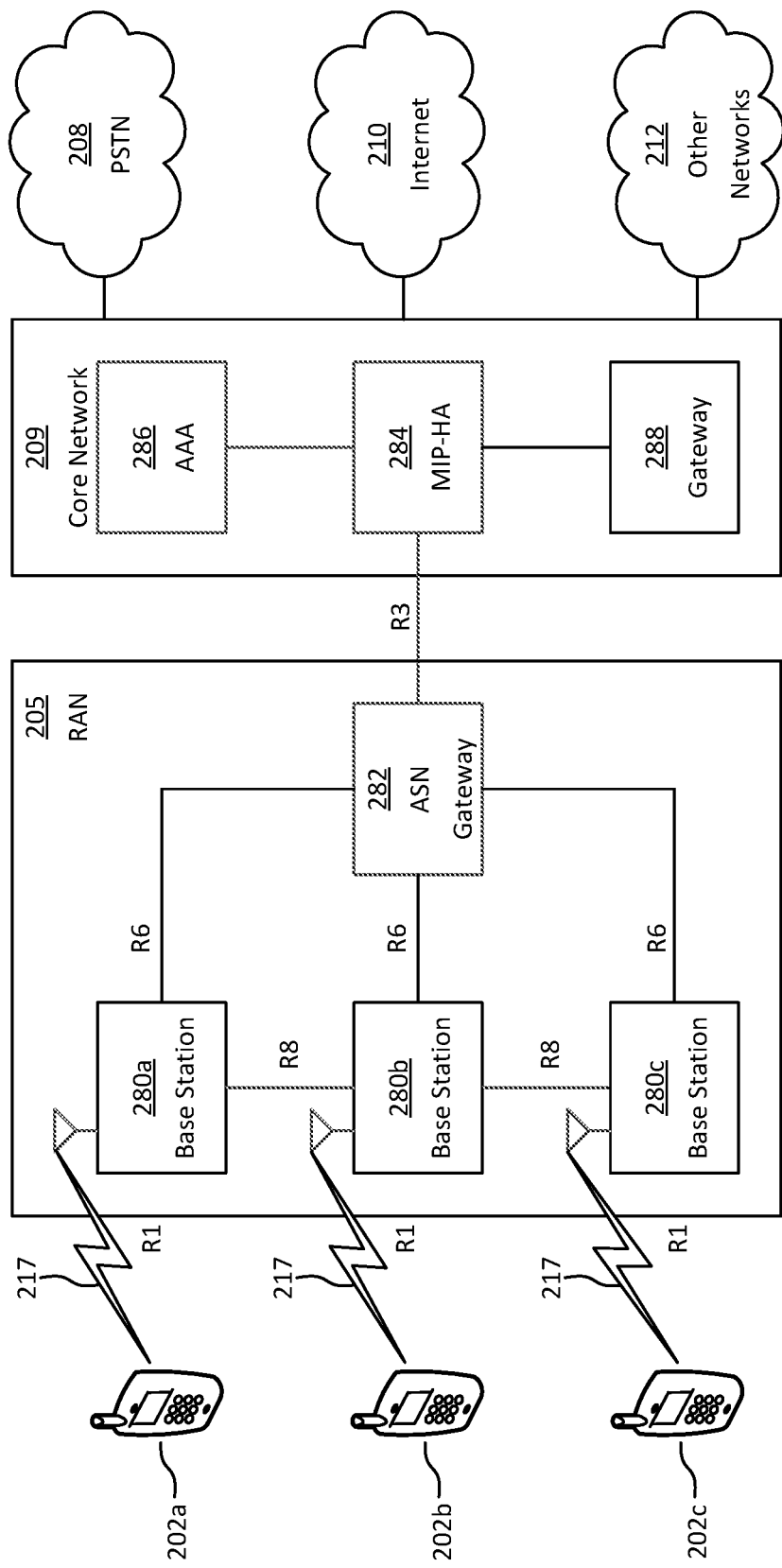
FIG. 37E is a system diagram of the RAN and the core network according to yet another embodiment.

FIG. 37E is a system diagram of the RAN 205 and the core network 209 according to an embodiment. The RAN 205 may be an access service network (ASN) that employs IEEE 802.16 radio technology to communicate with the WTRUs 202a, 202b, and 202c over the air interface 217. As will be further discussed below, the communication links between the different functional entities of the WTRUs 202a, 202b, 202c, the RAN 205, and the core network 209 may be defined as reference points.

As shown in FIG. 37E, the RAN 205 may include base stations 280a, 280b, 280c, and an ASN gateway 282, though it will be appreciated that the RAN 205 may include any number of base stations and ASN gateways while remaining consistent with an embodiment. The base stations 280a, 280b, 280c may each be associated with a particular cell in the RAN 205 and may include one or more transceivers for communicating with the WTRUs 202a, 202b, 202c over the air interface 217. In an embodiment, the base stations 280a, 280b, 280c may implement MIMO technology. Thus, the base station 280a, for example, may use multiple antennas to transmit wireless signals to, and receive wireless signals from, the WTRU 202a. The base stations 280a, 280b, 280c may also provide mobility management functions, such as handoff triggering, tunnel establishment, radio resource management, traffic classification, quality of service (QoS) policy enforcement, and the like. The ASN gateway 282 may serve as a traffic aggregation point and may be responsible for paging, caching of subscriber profiles, routing to the core network 209, and the like.

The air interface 217 between the WTRUs 202a, 202b, 202c and the RAN 205 may be defined as an R1 reference point that implements the IEEE 802.16 specification. In addition, each of the WTRUs 202a, 202b, and 202c may establish a logical interface (not shown) with the core network 209. The logical interface between the WTRUs 202a, 202b, 202c and the core network 209 may be defined as an R2 reference point, which may be used for authentication, authorization, IP host configuration management, and/or mobility management.

The communication link between each of the base stations 280a, 280b, and 280c may be defined as an R8 reference point that includes protocols for facilitating WTRU handovers and the transfer of data between base stations. The communication link between the base stations 280a, 280b, 280c and the ASN gateway 282 may be defined as an R6 reference point. The R6 reference point may include protocols for facilitating mobility management based on mobility events associated with each of the WTRUs 202a, 202b, 202c.

As shown in FIG. 37E, the RAN 205 may be connected to the core network 209. The communication link between the RAN 205 and the core network 209 may defined as an R3 reference point that includes protocols for facilitating data transfer and mobility management capabilities, for example. The core network 209 may include a mobile IP home agent (MIP-HA) 284, an authentication, authorization, accounting (AAA) server 286, and a gateway 288. While each of the foregoing elements are depicted as part of the core network 209, it will be appreciated that any one of these elements may be owned and/or operated by an entity other than the core network operator.

The MIP-HA may be responsible for IP address management, and may enable the WTRUs 202a, 202b, and 202c to roam between different ASNs and/or different core networks. The MIP-HA 284 may provide the WTRUs 202a, 202b, 202c with access to packet-switched networks, such as the Internet 210, to facilitate communications between the WTRUs 202a, 202b, 202c and IP-enabled devices. The AAA server 286 may be responsible for user authentication and for supporting user services. The gateway 288 may facilitate interworking with other networks. For example, the gateway 288 may provide the WTRUs 202a, 202b, 202c with access to circuit-switched networks, such as the PSTN 208, to facilitate communications between the WTRUs 202a, 202b, 202c and traditional land-line communications devices. In addition, the gateway 288 may provide the WTRUs 202a, 202b, 202c with access to the networks 212, which may include other wired or wireless networks that are owned and/or operated by other service providers.

Although not shown in FIG. 37E, it will be appreciated that the RAN 205 may be connected to other ASNs and the core network 209 may be connected to other core networks. The communication link between the RAN 205 the other ASNs may be defined as an R4 reference point, which may include protocols for coordinating the mobility of the WTRUs 202a, 202b, 202c between the RAN 205 and the other ASNs. The communication link between the core network 209 and the other core networks may be defined as an R5 reference, which may include protocols for facilitating interworking between home core networks and visited core networks.

The core network entities described herein and illustrated in FIGS. 37A, 37C, 37D, and 37E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 37A, 37B, 37C, 37D, and 37E are provided by way of example only, and it is understood that the subject matter disclosed and claimed herein may be embodied or implemented in any similar communication system, whether presently defined or defined in the future.

Figure 37F:
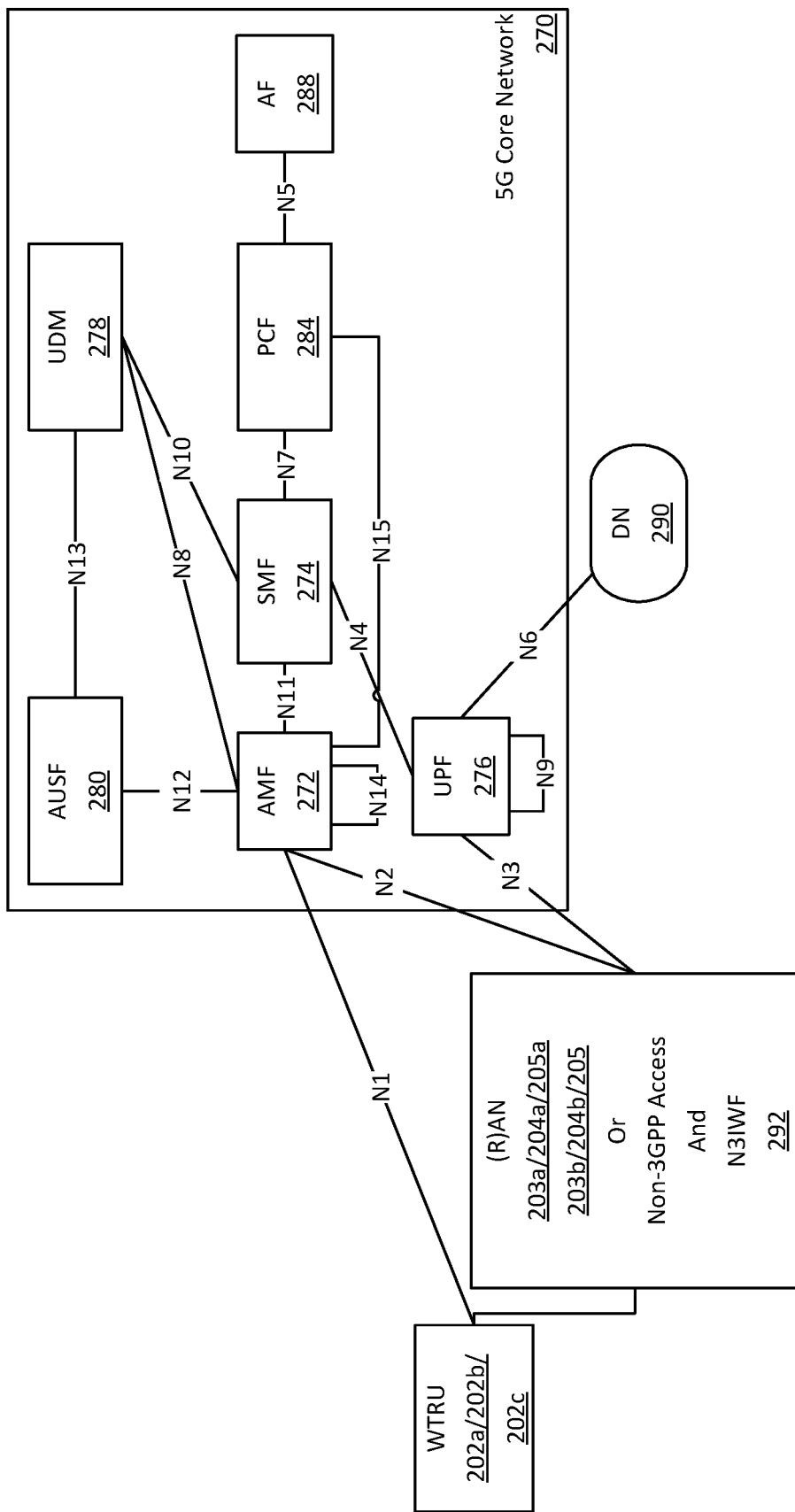
FIG. 37F is a block diagram of 5G core network.

The 5G core network 270 shown in FIG. 37F may include an access and mobility management function (AMF) 272, a session management function (SMF) 274, a user plane function (UPF) 276, a user data management function (UDM) 278, an authentication server function (AUSF) 280, a Network Exposure Function (NEF), a policy control function (PCF) 284, a non-3GPP interworking function (N3IWF) 292 and an application function (AF) 288. While each of the foregoing elements are depicted as part of the 5G core network 270, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 37F shows that network functions directly connect to one another, however, it should be appreciated that they may communicate via routing agents such as diameter routing agents or message buses.

The AMF 272 may be connected to each of the RAN 203/204/205/203b/204b/205b via an N2 interface and may serve as a control node. For example, the AMF 272 may be responsible for registration management, connection management, reachability management, access authentication, access authorization. The AMF 272 may generally route and forward NAS packets to/from the WTRUs 202a, 202b, 202c.

The SMF 274 may be connected to the AMF 272 via an N11 interface, maybe connected to a PCF 284 via an N7 interface, and may be connected to the UPF 276 via an N4 interface. The SMF 274 may serve as a control node. For example, the SMF 274 may be responsible for Session Management, WTRUs 202a, 202b, 202c IP address allocation & management and configuration of traffic steering rules in the UPF 276, and generation of downlink data notifications.

The SMF 274 may also be connected to the UPF 276, which may provide the WTRUs 202a, 202b, 202c with access to a data network (DN) 290, such as the Internet 210, to facilitate communications between the WTRUs 202a, 202b, 202c and IP-enabled devices. The SMF 274 may manage and configure traffic steering rules in the UPF 276 via the N4 interface. The UPF 276 may be responsible for interconnecting a packet data unit (PDU) session with a data network, packet routing and forwarding, policy rule enforcement, quality of service handling for user plane traffic, and downlink packet buffering.

The AMF 272 may also be connected to the N3IWF 292 via an N2 interface. The N3IWF facilities a connection between the WTRUs 202a, 202b, 202c and the 5G core network 270 via radio interface technologies that are not defined by 3GPP.

The PCF 284 may be connected to the SMF 274 via an N7 interface, connected to the AMF 272 via an N15 interface, and connected to an application function (AF) 288 via an N5 interface. The PCF 284 may provide policy rules to control plane nodes such as the AMF 272 and SMF 274, allowing the control plane nodes to enforce these rules.

The UDM 278 acts as a repository for authentication credentials and subscription information. The UDM may connect to other functions such as the AMF 272, SMF 274, and AUSF 280.

The AUSF 280 performs authentication related operations and connects to the UDM 278 via an N13 interface and to the AMF 272 via an N12 interface.

The NEF exposes capabilities and services in the 5G core network 270. The NEF may connect to an AF 288 via an interface and it may connect to other control plane and user plane functions (280, 278, 272, 272, 284, 276, and N3IWF) in order to expose the capabilities and services of the 5G core network 270.

The 5G core network 270 may facilitate communications with other networks. For example, the core network 270 may include, or may communicate with, an IP gateway (e.g., an IP multimedia subsystem (IMS) server) that serves as an interface between the 5G core network 270 and the PSTN 208. For example, the core network 270 may include, or communicate with a short message service (SMS) service center that facilities communication via the short message service. For example, the 5G core network 270 may facilitate the exchange of non-IP data packets between the WTRUs 202a, 202b, 202c and servers. In addition, the core network 270 may provide the WTRUs 202a, 202b, 202c with access to the networks 212, which may include other wired or wireless networks that are owned and/or operated by other service providers.

As discussed above, FIG. 36D is a block diagram of an exemplary computing system 90 in which one or more apparatuses of the communications networks illustrated in FIGS. 36A-C, 36E, 37A, 37C, 37D 37E and 37F may be embodied, such as certain nodes or functional entities in the RAN 203/204/205, Core Network 206/207/209, PSTN 208, Internet 210, or Other Networks 212. Further, computing system 90 may contain communication circuitry, such as for example a network adapter 97, that may be used to connect computing system 90 to an external communications network, such as the RAN 203/204/205, Core Network 206/207/209, PSTN 208, Internet 210, or Other Networks 212 of FIGS. 37A, 37B, 37C, 37D, 37E and 37F, to enable the computing system 90 to communicate with other nodes or functional entities of those networks.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like (or by a processor, such as processors 32, 118, 218 or 91), perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as Subscription Service Function (SSF) 2060, User Data Repository 2032, Policy Maintenance Function (PMF) 2050, Policy Enforcement Function (PEF), Authorization Authentication Accounting (AAA) Function 2028, RAT Interface Function (RIF) 2102, Slice Instance Selection Function (SISF) 2024, Slice Instance Management Function (SIMF) 2026, Core Network Entry Point (CNEP) 2020, Interconnection and Routing Function (IRF) 2058, Mobile Originated Ingress Function (MOI) 2040, Mobile Originated Egress Function (MOE) 2046, Mobile Terminated Ingress Function (MTI) 2044, Mobile Terminated Egress Function (MTE) 2042, Session Management (SM) Function 2048, and Mobility Management (MM) Function 2022 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method comprising:
sending an initial connection message from a user equipment (UE) to a network node, wherein the initial connection message comprises a temporary identifier and one or more network slice selection assistance information (NSSAI), wherein the one or more NSSAI is associated with one or more services and the one or more NSSAI comprise an indication of a request to connect with one or more network slices;
receiving, at the UE from the network node, a response message comprising an indication of whether or not a connection with one or more first network slices of the one or more network slices is permitted;
receiving a request message from the network node, the request message comprising an indication of one or more second network slices that are permitted for use by the UE; and
sending a response to the request change message to the network node.

2. The method of claim 1, wherein the UE first determines to connect to a default slice and includes, in the initial connection message, a default indication that is associated with one or more of the one or more NSSAI.

3. The method of claim 1, wherein the response message comprises a new temporary identifier for the UE.

4. The method of claim 3, wherein the network node interfaces to a plurality of network slices.

5. The method of claim 3, wherein an underlay network routes control plane packets to network functions within the one or more network slices that are permitted for use by the UE.

6. The method of claim 1, wherein the initial connection message comprises an indication of one or more capabilities of the UE.

7. The method of claim 6, wherein the indication of or one or more capabilities of the UE is a control-plane only indication or a low-mobility indication.

8. The method of claim 1, wherein, the UE is provisioned to check if access points of certain frequencies are available before determining to access the one or more network slices.

9. The method of claim 1, wherein the UE receives a broadcast with an identifier that is associated with a service that can be reached via the network before determining to access the one or more network slices.

10. The method of claim 1, wherein one or more identifiers of the one or more second network slices that are available for use by the UE include a default indication.

11. The method of claim 1, wherein the request message is triggered in an underlay network by a subscription change.

12. The method of claim 1, wherein the UE further sends a new slice request to the network node, wherein the new slice request comprises at least one identifiers of the one or more network slices that are available for use by the UE; and the UE further receives a new slice response from the network node, wherein the new slice response comprises a second indication of whether or not the connection to a slice from the one or more network slices identifiers is permitted.

13. The method of claim 12, wherein the new slice request is triggered by a user manually entering a new service profile to the UE or an application level event in the UE.

14. The method of claim 1, wherein the UE further receives a request to change from the network node.

15. An apparatus, the apparatus comprising:
a processor; and
memory coupled with the processor, the memory storing executable instructions that when executed by the processor cause the processor to effectuate operations comprising:
sending an initial connection message from a user equipment (UE) to a network node, wherein the initial connection message comprises a temporary identifier and one or more network slice selection assistance information (NSSAI), wherein one or more NSSAI is associated with one or more services and the one or more NSSAI comprise an indication of a request to connect with one or more network slices; and
receiving, at the UE from the network node, a response message comprising an indication of whether or not the connection with one or more first network slices of the one or more network slices is permitted;
receiving a request message from the network node, the request message comprising an indication of one or more second network slices that are permitted for use by the UE; and
sending a Profile Change response to the network node.

16. The apparatus of claim 15, wherein the UE first determines to connect to a default slice and includes, in the initial connection message, a default indication that is associated with one or more of the NSSAI.

17. The apparatus of claim 15, wherein the response message comprises a new temporary identifier for the UE.

18. The apparatus of claim 15, wherein the initial connection message comprises an indication of one or more capabilities of the UE.

19. The apparatus of claim 18, wherein the indication of or one or more capabilities of the UE is a control-plane only indication or a low-mobility indication.

20. A method comprising:
sending an initial connection message from a User Equipment (UE) to a network node of a network, wherein the initial connection message comprises a temporary identifier and no service descriptor indicating a network service that the UE is expected to access; and
receiving, at the UE from the network node, a response message comprising a new temporary identifier for the UE, and a set of identifiers of at least one or more slices that are available for use by the UE;
wherein the network node is part of an underlay network node determines ther set of identifiers of at least one or more slices that are available for use by the UE from slice descriptors in a subscription information of the UE that are assocated with a default indication.

\* \* \* \* \*

UNITED STATES PATENT AND TRADEMARK OFFICE
CERTIFICATE OF CORRECTION

| | | |
|---|---|---|
| PATENT NO. | : 11,903,048 B2 | Page 1 of 1 |
| APPLICATION NO. | : 17/169819 | |
| DATED | : February 13, 2024 | |
| INVENTOR(S) | : Gregory S. Sternberg et al. | |

It is certified that error appears in the above-identified patent and that said Letters Patent is hereby corrected as shown below:

On the Title Page

Item [72] replace "DiGirolamo" with --Di Girolamo--

In the Claims

At Column 79, Line 41, Claim 1 replace "sending a response to the request change message" with --sending a response to the request message--

At Column 79, Line 66, Claim 9 replace "via the network" with --via a network--

At Column 80, Line 29, Claim 15 replace "wherein one" with --wherein the one--

At Column 80, Line 36, Claim 15 replace "the connection" with --a connection--

At Column 80, Line 42, Claim 15 replace "sending a Profile Change response to the network node" with --sending a response to the request message to the network node--

At Column 80, Line 66, Claim 20 replace "determines ther set of identifiers" with --and the network node determines the set of identifiers--

At Column 81, Line 2, Claim 20 replace "assocated" with --associated--

Signed and Sealed this
Ninth Day of July, 2024

*Katherine Kelly Vidal*
Katherine Kelly Vidal
*Director of the United States Patent and Trademark Office*